US012473588B2

(12) United States Patent
Lipson et al.

(10) Patent No.: US 12,473,588 B2
(45) Date of Patent: Nov. 18, 2025

(54) CHEMICAL AND THERMAL ASSISTED NUCLEIC ACID AMPLIFICATION METHODS

(71) Applicant: Singular Genomics Systems, Inc., San Diego, CA (US)

(72) Inventors: Allen Lipson, San Diego, CA (US); Daan Witters, San Diego, CA (US); Eli N. Glezer, Del Mar, CA (US)

(73) Assignee: Singular Genomics Systems, Inc., San Diego, CA (US)

( * ) Notice: Subject to any disclaimer, the term of this patent is extended or adjusted under 35 U.S.C. 154(b) by 0 days.

(21) Appl. No.: 18/160,829

(22) Filed: Jan. 27, 2023

(65) Prior Publication Data

US 2023/0175049 A1    Jun. 8, 2023

Related U.S. Application Data

(63) Continuation of application No. PCT/US2022/075197, filed on Aug. 19, 2022.

(60) Provisional application No. 63/301,214, filed on Jan. 20, 2022, provisional application No. 63/235,667, filed on Aug. 20, 2021.

(51) Int. Cl.
    *C12Q 1/6848*    (2018.01)

(52) U.S. Cl.
    CPC ................... *C12Q 1/6848* (2013.01)

(58) Field of Classification Search
    None
    See application file for complete search history.

(56) References Cited

U.S. PATENT DOCUMENTS

| | | | |
|---|---|---|---|
| 4,318,846 A | 3/1982 | Khanna et al. | |
| 5,034,506 A | 7/1991 | Summerton et al. | |
| 5,066,580 A | 11/1991 | Lee | |
| 5,235,033 A | 8/1993 | Summerton et al. | |
| 5,366,860 A | 11/1994 | Bergot et al. | |
| 5,554,516 A | 9/1996 | Kacian et al. | |
| 5,599,675 A | 2/1997 | Brenner | |
| 5,641,658 A | 6/1997 | Adams et al. | |
| 5,688,648 A | 11/1997 | Mathies et al. | |
| 5,750,341 A | 5/1998 | Macevicz | |
| 5,763,594 A | 6/1998 | Hiatt et al. | |
| 5,800,996 A | 9/1998 | Lee et al. | |
| 5,808,045 A | 9/1998 | Hiatt et al. | |
| 5,847,162 A | 12/1998 | Lee et al. | |
| 5,872,244 A | 2/1999 | Hiatt et al. | |
| 6,031,091 A | 2/2000 | Arnold et al. | |
| 6,210,891 B1 | 4/2001 | Nyren et al. | |
| 6,232,465 B1 | 5/2001 | Hiatt et al. | |
| 6,258,568 B1 | 7/2001 | Nyren | |
| 6,274,320 B1 | 8/2001 | Rothberg et al. | |
| 6,664,079 B2 | 12/2003 | Ju et al. | |
| 7,057,026 B2 | 6/2006 | Barnes et al. | |
| 7,115,400 B1 | 10/2006 | Adessi et al. | |
| 7,541,444 B2 | 6/2009 | Milton et al. | |
| 8,178,360 B2 | 5/2012 | Barnes et al. | |
| 9,334,531 B2 | 5/2016 | Li et al. | |
| 10,738,072 B1 | 8/2020 | Graham et al. | |
| 11,236,387 B2 | 2/2022 | Glezer et al. | |
| 2007/0218490 A1 | 9/2007 | Laikhter et al. | |
| 2008/0000373 A1 | 1/2008 | Petrucci-Samija et al. | |
| 2008/0009420 A1 | 1/2008 | Schroth et al. | |
| 2010/0160478 A1 | 6/2010 | Nilsson et al. | |
| 2010/0167353 A1 | 7/2010 | Walder et al. | |
| 2011/0059865 A1 | 3/2011 | Smith et al. | |
| 2013/0012399 A1 | 1/2013 | Myers et al. | |
| 2014/0080717 A1 * | 3/2014 | Li ..................... | C12Q 1/686 506/26 |
| 2015/0079351 A1 | 3/2015 | Atasoy et al. | |
| 2016/0256846 A1 | 9/2016 | Smith et al. | |
| 2016/0362725 A1 | 12/2016 | Cai et al. | |
| 2017/0022553 A1 | 1/2017 | Vijayan et al. | |
| 2018/0258472 A1 | 9/2018 | Glezer | |
| 2018/0274024 A1 | 9/2018 | Ju et al. | |
| 2019/0048404 A1 | 2/2019 | Dambacher | |
| 2020/0316606 A1 * | 10/2020 | Soto-Moreno ........ | B01L 9/527 |
| 2021/0190668 A1 | 6/2021 | Kovacs et al. | |

FOREIGN PATENT DOCUMENTS

| | | |
|---|---|---|
| WO | WO-1989/010977 A1 | 11/1989 |
| WO | WO-1996/007669 A1 | 3/1996 |
| WO | WO-2004/018497 A2 | 3/2004 |
| WO | WO-2013/028643 A1 | 2/2013 |
| WO | WO-2017/205336 A1 | 11/2017 |
| WO | WO-2018/148723 A1 | 8/2018 |
| WO | WO-2020/056044 A1 | 3/2020 |
| WO | WO-2022165188 A1 * | 8/2022 |

OTHER PUBLICATIONS

Wang, Characterization of denaturation and renaturation of DNA for DNA hybridization, Environ Health Toxicol, 29: e2014007, 2014. (Year: 2014).*
Bains, W. et al. (Dec. 7, 1988). "A novel method for nucleic acid sequence determination," *Journal of Theoretical Biology* 135(3): 303-307.
Bentley, D. R. et al. (Nov. 6, 2008). "Accurate whole human genome sequencing using reversible terminator chemistry," *Nature* 456(7218):53-59.
Bergen, K. et al. (Jun. 17, 2013, e-published Jun. 3, 2013). "Structures of KOD and 9° N DNA polymerases complexed with primer template duplex," *Chembiochem* 14(9):1058-1062.
Drmanac, S. et al. (Jan. 1998). "Accurate sequencing by hybridization for DNA diagnostics and individual genomics," *Nature Biotechnology* 16(1): 54-58.

(Continued)

*Primary Examiner* — Gary Benzion
*Assistant Examiner* — Carolyn L Greene
(74) *Attorney, Agent, or Firm* — Mintz, Levin, Cohn, Ferris, Glovsky and Popeo, P.C.; Zachary L. Terranova

(57) ABSTRACT

Disclosed herein, inter alia, are novel methods pertaining to nucleic acid amplification and detection. Devices, compositions, and kits for use in such methods are also provided.

22 Claims, 6 Drawing Sheets

(56) References Cited

OTHER PUBLICATIONS

Findlay, J. B. et al. (Sep. 1, 1993). "Automated closed-vessel system for in vitro diagnostics based on polymerase chain reaction," *Clinical chemistry* 39(9): 1927-1933.

Fodor, S. P. et al. (Feb. 15, 1991). "Light-directed, spatially addressable parallel chemical synthesis," *Science* 251(4995):767-773.

Fuller, C. W. et al. (May 10, 2016, e-published Apr. 18, 2016). "Real-time single-molecule electronic DNA sequencing by synthesis using polymer-tagged nucleotides on a nanopore array," *PNAS USA* 113(19):5233-5238.

Guo, J. et al. (Jul. 8, 2008, e-published Jun. 30, 2008). "Four-color DNA sequencing with 3'-O-modified nucleotide reversible terminators and chemically cleavable fluorescent dideoxynucleotides," *PNAS USA* 105(27):9145-9150.

Haas, E. et al. (Jan. 15, 1975). "Distribution of end-to-end distances of oligopeptides in solution as estimated by energy transfer," *PNAS USA* 72(5): 1807-1811.

International Search Report mailed on Nov. 4, 2022, for PCT Application No. PCT/US2022/75197, filed Aug. 19, 2022, 2 pages.

Kumar, S. et al. (2012, e-published Sep. 21, 2012). "PEG-labeled nucleotides and nanopore detection for single molecule DNA sequencing by synthesis," *Sci Rep* 2:684.

Mag, M. et al. (Nov. 24, 1992, e-published Mar. 5, 2001). "Synthesis and selective cleavage of an oligodeoxynucleotide containing a bridged non-chiral internucleotide 3'-phosphoramidate linkage," *Tetrahedron Letters* 33(48): 7319-7322.

Ronaghi, M. et al. (Nov. 1, 1996, e-published May 25, 2002). "Real-time DNA sequencing using detection of pyrophosphate release," *Anal Biochem* 242(1):84-89.

Ronaghi, M. et al. (Jul. 17, 1998). "A sequencing method based on real-time pyrophosphate," *Science* 281(5375):363-365.

Ronaghi, M. (Jan. 2001). "Pyrosequencing sheds light on DNA sequencing," *Genome Res* 11(1):3-11.

Shendure, J. et al. (Sep. 9, 2005, e-published Aug. 4, 2005). "Accurate multiplex polony sequencing of an evolved bacterial genome," *Science* 309(5741):1728-1732.

Southworth, M. W. et al. (May 28, 1996). "Cloning of thermostable DNA polymerases from hyperthermophilic marine Archaea with emphasis on *Thermococcus* sp. 9° N-7 and mutations affecting 3'-5' exonuclease activity," *PNAS USA* 93(11):5281-5285.

Walker, J. W., et al. (Oct. 1, 1998, e-published May 1, 2002). "Photolabile 1-(2-nitrophenyl) ethyl phosphate esters of adenine nucleotide analogs. Synthesis and mechanism of photolysis," *Journal of the American Chemical Society* 110(21): 7170-7177.

Wilding, P. et al. (Sep. 1, 1994). "PCR in a silicon microstructure," *Clinical Chemistry* 40(9): 1815-1818.

Wilk, A. et al. (Apr. 25, 1990). "Backbone-modified oligonucleotides containing a butanediol-1, 3 moiety as a 'vicarious segment' for the deoxyribosyl moiety—synthesis and enzyme studies," *Nucleic acids research* 18(8): 2065-2068.

Written Opinion mailed on Nov. 4, 2022, for PCT Application No. PCT/US2022/75197, filed Aug. 19, 2022, 7 pages.

\* cited by examiner

CHEMICAL AND THERMAL ASSISTED NUCLEIC ACID AMPLIFICATION METHODS

CROSS-REFERENCES TO RELATED APPLICATIONS

This application is a continuation of International Application No. PCT/US22/75197, filed Aug. 19, 2022, and which claims the benefit of U.S. Provisional Application No. 63/235,667, filed Aug. 20, 2021, and U.S. Provisional Application No. 63/301,214, filed Jan. 20, 2022, each of which are incorporated herein by reference in their entirety and for all purposes.

BACKGROUND

Current sequencing platforms require clonal amplification of the initial template library molecules to create clusters (i.e., polonies), each containing 100s to 10,000s of forward and reverse copies of an initial template library molecule. Cluster generation is useful for increasing the signal-to-noise ratio because typical systems are not sensitive enough to detect the extension of one base at the individual DNA template molecule level. Amplification methods employed in commercial sequencing devices typically amplify a template molecule using surface immobilized primers to produce a plurality of double-stranded nucleic acid molecules, wherein at least one strand of each double-stranded nucleic acid molecule is attached to the solid support at its 5' ends. Typical amplification approaches relying on rapid thermal cycling requires expensive instrumentation in order to rapidly heat and cool the reaction mixture, in addition to accurately maintaining solution temperatures and temperature uniformity during incubation steps. Alternatively, isothermal nucleic acid amplification procedures may lead to non-specific amplification artifacts, making the amplicons harder to reliably use in next-generation sequencing applications. Disclosed herein, inter alia, are solutions to these and other problems in the art.

BRIEF SUMMARY

In an aspect is provided novel solid-phase amplification methods, compositions, and kits. In embodiments, the method includes generating a complement template polynucleotide (e.g., an immobilized template polynucleotide and an immobilized complementary template polynucleotide) including: (a) annealing a template polynucleotide to a first immobilized primer on a solid support at a first temperature, wherein the first immobilized primer is complementary to a sequence of the template polynucleotide, wherein the first temperature is about 25° C. to about 45° C.; (b) extending the first primer with a polymerase to generate a complement template polynucleotide; (c) contacting the complement template polynucleotide and the template polynucleotide with a chemical denaturant at a second temperature thereby separating the complement template polynucleotide from the template polynucleotide, wherein the second temperature is greater than the first temperature by 12° C. to 18° C.; (d) removing the denaturant and annealing a complement template polynucleotide to a second immobilized primer on the solid support at the first temperature, wherein the second immobilized primer is complementary to a sequence of the complement template polynucleotide; and (e) extending the second immobilized primer with the polymerase to generate a template polynucleotide (e.g., an immobilized template polynucleotide).

In an aspect is provided a method of amplifying a template polynucleotide including: i) contacting a solid support with an annealing solution at a first temperature, wherein the solid support includes a plurality of immobilized primers wherein one or more of the immobilized primers is annealed to a template polynucleotide; ii) contacting the solid support with an extension solution; iii) contacting the solid support with a chemical denaturant at a second temperature, wherein the second temperature is 12° C. to 18° C. higher than the first temperature; iv) repeating steps i) to iii) to amplify the template polynucleotide.

BRIEF DESCRIPTION OF THE DRAWINGS

FIG. 2 shows the condition of the flow cell (FC State), polymerase (Pol.), denaturant solution (Denat) and hybridization buffer (HB), above the corresponding temperature profile over time. Each solution (i.e., Pol, Denat, or HB) is either staging (i.e., preloading) or flowing through the flow cell and in contact with the immobilized primers. As an example, shown in FIG. 2, each thermally assisted c-bPCR cycle begins with an air segment entering the flow cell as the temperature is increased to the upper temperature setpoint. As the temperature reaches the upper setpoint (e.g., about 58° C.), a polymerase extension solution is flowed into the flow cell. The flow cell is then cooled as an air segment is applied and denaturant solution is introduced into the FC. The temperature is brought to the lower setpoint (e.g., about 40° C.) during denaturation. Optionally, following introduction of the denaturant solution, the temperature can remain elevated briefly (e.g., at about 58° C. for about 5-15 seconds) to achieve more effective denaturation before cooling down in the denaturant. Following the cooling step, an air segment is applied to the flow cell, followed by hybridization buffer (HB). Following the hybridization step, the cycle is then repeated. Also shown in FIG. 2, air gaps (alternatively referred to as air slugs) are present in between the different reagent steps. Introducing air gaps in between reagent steps saves on reagent volume, and additionally allows for sharp reagent transitions. Note, the duration of the events (e.g., the air slugs) are not necessarily to scale.

FIG. 3A presents the called base signal for sequencing clusters generated by 1) heating in extension and cooling in denaturant or 2) heating and cooling in hybridization buffer. FIG. 3B reports on the sequencing quality scores for a 55-cycle sequencing run. Quality scores quantify the degree of confidence that a base within a sequencing read is called correctly. In the first condition, condition 1, the extension reagent introduced to the reaction vessel (i.e., the flow cell) that had been pre-warmed to 42° C., followed by an increase in temperature (i.e., ramp up) to 58° C. After about 45 sec of extension (at 58° C.), a denaturant (e.g., formamide) was flowed in and incubated with the sample for about 45 sec while the temperature was reduced to 42° C. Upon reaching 42° C., the denaturant was exchanged with hybridization buffer, completing the first cycle, and followed by the next iteration. In the second condition, condition 2, the temperature was increased to 58° C. while the sample was in hybridization buffer. Subsequently, the extension reagent was introduced and incubated for 45 sec at 58° C. The denaturant was then applied and incubated with the sample for 45 sec (still at 58° C.). Hybridization buffer was then introduced into the flow cell, followed by a decrease in temperature to 42° C. while in the hybridization buffer. This completed the first cycle, and then the temperature is then increased to 58° C. prior to beginning the next iteration. It was found that when extension buffer and denaturant were incubated solely at the elevated temperature (heating and cooling were completed while in hybridization buffer), i.e. condition 2, there was a dramatic reduction in base signal/quality. In contrast, and more importantly, allowing lanes to incubate in extension buffer and denaturant throughout the course of the temperature transition showed a significant improvement and retention in signal/quality (see, FIG. 3A and FIG. 3B).

FIG. 4 describes Condition A, including incubating a solid support containing immobilized primers and a template polynucleotide in a reaction vessel at about 42° C. in hybridization buffer (HB) before introducing the extension buffer (EB). Upon introduction of the EB the temperature is increased to about 58° C. and maintained for a period of time. While at 58° C., a denaturant (DB) is brought into the reaction vessel and maintained for a period of time followed by reducing the temperature to about 42° C. Upon reaching the temperature setpoint a hybridization buffer is introduced into the reaction vessel, and the cycle is repeated. Hybridization buffer and annealing solution are used herein interchangeably.

FIG. 5 describes Condition B, including incubating a solid support containing immobilized primers and a template polynucleotide in a reaction vessel at about 42° C. in hybridization buffer (HB) for a period of time, before increasing the temperature to about 58° C. Once the upper temperature (i.e., 58° C.) is achieved, an extension buffer (EB) is introduced and the reaction vessel is maintained at a constant temperature for a period of time before introducing a denaturant (DB). Following incubation in the DB, the HB is introduced and the temperature is reduced to about 42° C., and the cycle is repeated. Hybridization buffer and annealing solution are used herein interchangeably.

FIG. 6 describes Condition C, including incubating a solid support containing immobilized primers and a template polynucleotide in a reaction vessel at about 42° C. in hybridization buffer (HB) before introducing the extension buffer (EB). Upon introduction of the EB the temperature is increased to about 58° C. and maintained for a period of time. While at 58° C., a denaturant (DB) is brought into the reaction vessel and maintained for a period of time. Following incubation in the DB, the HB is introduced and the temperature is reduced to about 42° C., and the cycle is repeated. Hybridization buffer and annealing solution are used herein interchangeably.

FIG. 7 describes Condition D, including incubating a solid support containing immobilized primers and a template polynucleotide in a reaction vessel at about 42° C. in hybridization buffer (HB) for a period of time, before increasing the temperature to about 58° C. Once the upper temperature (i.e., 58° C.) is achieved, an extension buffer (EB) is introduced and the reaction vessel is maintained at a constant temperature for a period of time before introducing a denaturant (DB). Following incubation in the DB, the temperature is reduced to about 42° C. Once the lower temperature is achieved, a HB is introduced into the reaction vessel and the cycle is repeated. Hybridization buffer and annealing solution are used herein interchangeably.

DETAILED DESCRIPTION

Figure 1A:
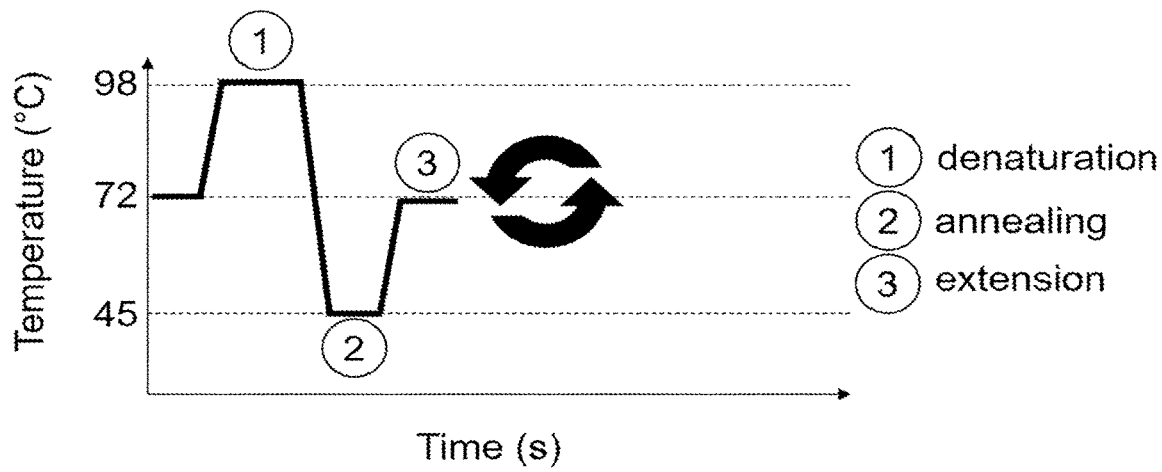
FIGS. 1A-1B. Cycling between denaturation, annealing, and extension conditions typically includes thermal changes (e.g., increasing the temperature to denature double-stranded DNA (dsDNA) and decreasing the temperature to anneal a primer). See FIG. 1A for an illustration of the thermal PCR. First the temperature is increased (e.g., temperature is increased to 98° C.) to denature input dsDNA, indicated as 1 in FIG. 1A, to generate single-stranded DNA (ssDNA). Next, the temperature is reduced (e.g., temperature is reduced to 45° C.) to permit annealing of an amplification primer, indicated as 2 in FIG. 1A. Finally, the temperature is increased to the operating temperature to enable a polymerase (e.g., 72° C.) to extend the annealed primer and generate a copy of the ssDNA, indicated as 3 in FIG. 1A. This process if repeated to generate a sufficient number of copies of the input nucleic acid. An alternative to the method outlined in FIG. 1A, and as further described herein, an embodiment of the invention is presented in FIG. 1B. In contrast to the method outlined in FIG. 1A, the dsDNA is denatured at a lower temperature than the extension temperature, indicated as 1 in FIG. 1B. In embodiments, the dsDNA is denatured while cooling the reaction vessel. Next, a primer is annealed at a first temperature, indicated as 2 in FIG. 1B, followed by increasing the temperature to a second temperature, indicated as 3 in FIG. 1B. This process if repeated to generate a sufficient number of copies of the input nucleic acid.

The aspects and embodiments described herein relate to novel amplification methods utilizing controlled thermal and chemical denaturant amplification cycles.

I. Definitions

All patents, patent applications, articles and publications mentioned herein, both supra and infra, are hereby expressly incorporated herein by reference in their entireties. The practice of the technology described herein will employ, unless indicated specifically to the contrary, conventional methods of chemistry, biochemistry, organic chemistry, molecular biology, bioinformatics, microbiology, recombinant DNA techniques, genetics, immunology, and cell biology that are within the skill of the art, many of which are described below for the purpose of illustration. Examples of such techniques are available in the literature. See, e.g., Singleton et al., DICTIONARY OF MICROBIOLOGY AND MOLECULAR BIOLOGY 2nd ed., J. Wiley & Sons (New York, NY 1994); and Sambrook and Green, Molecular Cloning: A Laboratory Manual, 4th Edition (2012). Methods, devices and materials similar or equivalent to those described herein can be used in the practice of this invention.

Unless defined otherwise herein, all technical and scientific terms used herein have the same meaning as commonly understood by one of ordinary skill in the art to which this disclosure belongs. Various scientific dictionaries that include the terms included herein are well known and available to those in the art. Although any methods and materials similar or equivalent to those described herein find use in the practice or testing of the disclosure, some preferred methods and materials are described. Accordingly, the terms defined immediately below are more fully described by reference to the specification as a whole. It is to be understood that this disclosure is not limited to the particular methodology, protocols, and reagents described, as these may vary, depending upon the context in which they are used by those of skill in the art. The following definitions are provided to facilitate understanding of certain terms used frequently herein and are not meant to limit the scope of the present disclosure.

As used herein, the singular terms "a", "an", and "the" include the plural reference unless the context clearly indicates otherwise. Reference throughout this specification to, for example, "one embodiment", "an embodiment", "another embodiment", "a particular embodiment", "a related embodiment", "a certain embodiment", "an additional embodiment", or "a further embodiment" or combinations thereof means that a particular feature, structure or characteristic described in connection with the embodiment is included in at least one embodiment of the present disclosure. Thus, the appearances of the foregoing phrases in various places throughout this specification are not necessarily all referring to the same embodiment. Furthermore, the particular features, structures, or characteristics may be combined in any suitable manner in one or more embodiments.

As used herein, the term "about" means a range of values including the specified value, which a person of ordinary skill in the art would consider reasonably similar to the specified value. In embodiments, the term "about" means within a standard deviation using measurements generally acceptable in the art. In embodiments, about means a range extending to +/−10% of the specified value. In embodiments, about means the specified value.

Throughout this specification, unless the context requires otherwise, the words "comprise", "comprises" and "comprising" will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

As used herein, the term "control" or "control experiment" is used in accordance with its plain and ordinary meaning and refers to an experiment in which the subjects or reagents of the experiment are treated as in a parallel experiment except for omission of a procedure, reagent, or variable of the experiment. In some instances, the control is used as a standard of comparison in evaluating experimental effects.

As used herein, the term "associated" or "associated with" can mean that two or more species are identifiable as being co-located at a point in time. An association can mean that two or more species are or were within a similar container. An association can be an informatics association, where for example digital information regarding two or more species is stored and can be used to determine that one or more of the species were co-located at a point in time. An association can also be a physical association.

As used herein, the term "complementary" or "substantially complementary" refers to the hybridization, base pairing, or the formation of a duplex between nucleotides or nucleic acids. For example, complementarity exists between the two strands of a double-stranded DNA molecule or between an oligonucleotide primer and a primer binding site on a single-stranded nucleic acid when a nucleotide (e.g., RNA or DNA) or a sequence of nucleotides is capable of base pairing with a respective cognate nucleotide or cognate sequence of nucleotides. As described herein and commonly known in the art the complementary (matching) nucleotide of adenosine (A) is thymidine (T) and the complementary (matching) nucleotide of guanosine (G) is cytosine (C). Thus, a complement may include a sequence of nucleotides that base pair with corresponding complementary nucleotides of a second nucleic acid sequence. The nucleotides of a complement may partially or completely match the nucleotides of the second nucleic acid sequence. Where the nucleotides of the complement completely match each nucleotide of the second nucleic acid sequence, the complement forms base pairs with each nucleotide of the second nucleic acid sequence. Where the nucleotides of the complement partially match the nucleotides of the second nucleic acid sequence only some of the nucleotides of the complement form base pairs with nucleotides of the second nucleic acid sequence. Examples of complementary sequences include coding and non-coding sequences, wherein the non-coding sequence contains complementary nucleotides to the coding sequence and thus forms the complement of the coding sequence. A further example of complementary sequences are sense and antisense sequences, wherein the sense sequence contains complementary nucleotides to the antisense sequence and thus forms the complement of the antisense sequence. "Duplex" means at least two oligonucleotides and/or polynucleotides that are fully or partially complementary undergo Watson-Crick type base pairing among all or most of their nucleotides so that a stable complex is formed.

As used herein, the term "complement," as used herein, refers to a nucleotide (e.g., RNA or DNA) or a sequence of nucleotides capable of base pairing with a complementary nucleotide or sequence of nucleotides.

As described herein, the complementarity of sequences may be partial, in which only some of the nucleic acids match according to base pairing, or complete, where all the nucleic acids match according to base pairing. Thus, two sequences that are complementary to each other, may have a specified percentage of nucleotides that complement one another (e.g., about 60%, preferably 65%, 70%, 75%, 80%, 85%, 90%, 91%, 92%, 93%, 94%, 95%, 96%, 97%, 98%, 99%, or higher complementarity over a specified region). In embodiments, two sequences are complementary when they are completely complementary, having 100% complementarity. In embodiments, sequences in a pair of complementary sequences form portions of a single polynucleotide with non-base-pairing nucleotides (e.g., as in a hairpin or loop structure, with or without an overhang) or portions of separate polynucleotides. In embodiments, one or both sequences in a pair of complementary sequences form portions of longer polynucleotides, which may or may not include additional regions of complementarity.

As used herein, the term "contacting" is used in accordance with its plain ordinary meaning and refers to the process of allowing at least two distinct species (e.g. chemical compounds including biomolecules or cells) to become sufficiently proximal to react, interact or physically touch. However, the resulting reaction product can be produced directly from a reaction between the added reagents or from an intermediate from one or more of the added reagents that can be produced in the reaction mixture. The term "contacting" may include allowing two species to react, interact, or physically touch, wherein the two species may be a compound, nucleic acid, a protein, or enzyme (e.g., a DNA polymerase).

As used herein, the term "nucleic acid" is used in accordance with its plain and ordinary meaning and refers to nucleotides (e.g., deoxyribonucleotides or ribonucleotides) and polymers thereof in either single-, double- or multiple-stranded form, or complements thereof. The terms "polynucleotide," "oligonucleotide," "oligo", "oligomer" or the like refer, in the usual and customary sense, to a sequence of nucleotides. The term "nucleotide" refers, in the usual and customary sense, to a single unit of a polynucleotide, i.e., a monomer. Nucleotides can be ribonucleotides, deoxyribonucleotides, or modified versions thereof. Examples of polynucleotides contemplated herein include single and double stranded DNA, single and double stranded RNA, and hybrid molecules having mixtures of single and double stranded DNA and RNA with linear or circular framework. Non-limiting examples of polynucleotides include a gene, a gene fragment, an exon, an intron, intergenic DNA (including, without limitation, heterochromatic DNA), messenger RNA (mRNA), transfer RNA, ribosomal RNA, a ribozyme, cDNA, a recombinant polynucleotide, a branched polynucleotide, a plasmid, a vector, isolated DNA of a sequence, isolated RNA of a sequence, a nucleic acid probe, and a primer. Polynucleotides useful in the methods of the disclosure may include natural nucleic acid sequences and variants thereof, artificial nucleic acid sequences, or a combination of such sequences. A "nucleoside" is structurally similar to a nucleotide, but is missing the phosphate moieties. An example of a nucleoside analogue would be one in which the label is linked to the base and there is no phosphate group attached to the sugar molecule. As may be used herein, the terms "nucleic acid oligomer" and "oligonucleotide" are used interchangeably and are intended to include, but are not limited to, nucleic acids having a length of 200 nucleotides or less. In some embodiments, an oligonucleotide is a nucleic acid having a length of 2 to 200 nucleotides, 2 to 150 nucleotides, 5 to 150 nucleotides or 5 to 100 nucleotides.

As used herein, the terms "polynucleotide primer" and "primer" refers to any polynucleotide molecule that may hybridize to a polynucleotide template, be bound by a polymerase, and be extended in a template-directed process for nucleic acid synthesis. The primer may be a separate polynucleotide from the polynucleotide template, or both may be portions of the same polynucleotide (e.g., as in a hairpin structure having a 3' end that is extended along another portion of the polynucleotide to extend a double-stranded portion of the hairpin). Primers (e.g., forward or reverse primers) may be attached to a solid support. A primer can be of any length depending on the particular technique it will be used for. For example, PCR primers are generally between 10 and 40 nucleotides in length. The length and complexity of the nucleic acid fixed onto the nucleic acid template may vary. In some embodiments, a primer has a length of 200 nucleotides or less. In certain embodiments, a primer has a length of 10 to 150 nucleotides, 15 to 150 nucleotides, 5 to 100 nucleotides, 5 to 50 nucleotides or 10 to 50 nucleotides. One of skill can adjust these factors to provide optimum hybridization and signal production for a given hybridization procedure. The primer permits the addition of a nucleotide residue thereto, or oligonucleotide or polynucleotide synthesis therefrom, under suitable conditions. In an embodiment the primer is a DNA primer, i.e., a primer consisting of, or largely consisting of, deoxyribonucleotide residues. The primers are designed to have a sequence that is the complement of a region of template/target DNA to which the primer hybridizes. The addition of a nucleotide residue to the 3' end of a primer by formation of a phosphodiester bond results in a DNA extension product. The addition of a nucleotide residue to the 3' end of the DNA extension product by formation of a phosphodiester bond results in a further DNA extension product. In another embodiment the primer is an RNA primer. In embodiments, a primer is hybridized to a target polynucleotide. A "primer" is complementary to a polynucleotide template, and complexes by hydrogen bonding or hybridization with the template to give a primer/template complex for initiation of synthesis by a polymerase, which is extended by the addition of covalently bonded bases linked at its 3' end complementary to the template in the process of DNA synthesis.

As used herein, the term "primer binding sequence" refers to a polynucleotide sequence that is complementary to at least a portion of a primer (e.g., a sequencing primer or an amplification primer). Primer binding sequences can be of any suitable length. In embodiments, a primer binding sequence is about or at least about 10, 15, 20, 25, 30, or more nucleotides in length. In embodiments, a primer binding sequence is 10-50, 15-30, or 20-25 nucleotides in length. The primer binding sequence may be selected such that the primer (e.g., sequencing primer) has the preferred characteristics to minimize secondary structure formation or minimize non-specific amplification, for example having a length of about 20-30 nucleotides; approximately 50% GC content, and a Tm of about 55° C. to about 65° C.

As used herein, a platform primer is a primer oligonucleotide immobilized or otherwise bound to a solid support (i.e. an immobilized oligonucleotide). Examples of platform primers include P7 and P5 primers, or S1 and S2 sequences, or the reverse complements thereof. A "platform primer binding sequence" refers to a sequence or portion of an oligonucleotide that is capable of binding to a platform primer (e.g., the platform primer binding sequence is complementary to the platform primer). In embodiments, a platform primer binding sequence may form part of an adapter. In embodiments, a platform primer binding sequence is complementary to a platform primer sequence. In embodiments, a platform primer binding sequence is complementary to a primer.

The order of elements within a nucleic acid molecule is typically described herein from 5' to 3'. In the case of a double-stranded molecule, the "top" strand is typically shown from 5' to 3', according to convention, and the order of elements is described herein with reference to the top strand.

As used herein, the terms "solid support" and "substrate" and "solid surface" are used interchangeably and refers to discrete solid or semi-solid surfaces to which a plurality of nucleic acid (e.g., primers) may be attached. A solid support may encompass any type of solid, porous, or hollow sphere, ball, cylinder, or other similar configuration composed of plastic, ceramic, metal, or polymeric material (e.g., hydrogel) onto which a nucleic acid may be immobilized (e.g., covalently or non-covalently). A solid support may include a discrete particle that may be spherical (e.g., microspheres) or have a non-spherical or irregular shape, such as cubic, cuboid, pyramidal, cylindrical, conical, oblong, or disc-shaped, and the like. Solid supports in the form of discrete particles may be referred to herein as "beads," which alone does not imply or require any particular shape. A bead can be non-spherical in shape. A solid support may further include a polymer or hydrogel on the surface to which the primers are attached (e.g., the primers are covalently attached to the polymer, wherein the polymer is in direct contact with the solid support). Exemplary solid supports include, but are not limited to, glass and modified or functionalized glass, plastics (including acrylics, polystyrene and copolymers of styrene and other materials, polypropylene, polyethylene, polybutylene, polyurethanes, Teflon™, cyclic olefin copolymers, polyimides etc.), nylon, ceramics, resins, Zeonor, silica or silica-based materials including silicon and modified silicon, carbon, metals, inorganic glasses, optical fiber bundles, photopatternable dry film resists, UV-cured adhesives and polymers. The solid supports for some embodiments have at least one surface located within a flow cell. The solid support, or regions thereof, can be substantially flat. The solid support can have surface features such as wells, pits, channels, ridges, raised regions, pegs, posts or the like. The term solid support is encompassing of a substrate (e.g., a flow cell) having a surface including a polymer coating covalently attached thereto. In embodiments, the solid support is a flow cell. Examples of flow cells and related fluidic systems and detection platforms that can be readily used in the methods of the present disclosure are described, for example, in Bentley et al., Nature 456:53-59 (2008).

Two or more associated species are "tethered", "coated", "attached", or "immobilized" to one another or to a common solid or semisolid support (e.g. a receiving substrate). An association may refer to a relationship, or connection, between two entities. As used herein, an immobilized polynucleotide or an immobilized primer refers to a polynucleotide or a primer that is attached to a solid surface, such as a solid support. The immobilized polynucleotide and/or immobilized primer may be attached covalently (e.g. through a linker) or non-covalently to a solid support. In embodiments, immobilized polynucleotide and/or immobilized primer is covalently attached to a solid support.

In certain embodiments a substrate includes a surface (e.g., a surface of a flow cell, a surface of a tube, a surface of a chip), for example a metal surface (e.g., steel, gold, silver, aluminum, silicon and copper). In embodiments a substrate (e.g., a substrate surface) is coated and/or includes functional groups and/or inert materials. In certain embodiments a substrate includes a bead, a chip, a capillary, a plate, a membrane, a wafer (e.g., silicon wafers), a comb, or a pin for example. In some embodiments a substrate includes a bead and/or a nanoparticle. A substrate can be made of a suitable material, non-limiting examples of which include a plastic or a suitable polymer (e.g., polycarbonate, poly(vinyl alcohol), poly(divinylbenzene), polystyrene, polyamide, polyester, polyvinylidene difluoride (PVDF), polyethylene, polyurethane, polypropylene, and the like), borosilicate glass, nylon, Wang resin, Merrifield resin, metal (e.g., iron, a metal alloy, sepharose, agarose, polyacrylamide, dextran, cellulose and the like or combinations thereof. In embodiments a substrate includes a magnetic material (e.g., iron, nickel, cobalt, platinum, aluminum, and the like). In embodiments a substrate includes a magnetic bead (e.g., DYNABEADS®, hematite, AMPure XP). Magnets can be used to purify and/or capture nucleic acids bound to certain substrates (e.g., substrates including a metal or magnetic material). The flow cell is typically a glass slide containing small fluidic channels (e.g., a glass slide 75 mm×25 mm×1 mm having one or more channels), through which sequencing solutions (e.g., polymerases, nucleotides, and buffers) may traverse. Though typically glass, suitable flow cell materials may include polymeric materials, plastics, silicon, quartz (fused silica), Borofloat® glass, silica, silica-based materials, carbon, metals, an optical fiber or optical fiber bundles, sapphire, or plastic materials such as COCs and epoxies. The particular material can be selected based on properties desired for a particular use. For example, materials that are transparent to a desired wavelength of radiation are useful for analytical techniques that will utilize radiation of the desired wavelength. Conversely, it may be desirable to select a material that does not pass radiation of a certain wavelength (e.g., being opaque, absorptive, or reflective). In embodiments, the material of the flow cell is selected due to the ability to conduct thermal energy. In embodiments, a flow cell includes inlet and outlet ports and a flow channel extending there between.

The term "surface" is intended to mean an external part or external layer of a substrate. The surface can be in contact with another material such as a gas, liquid, gel, polymer, organic polymer, second surface of a similar or different material, metal, or coat. The surface, or regions thereof, can be substantially flat. The substrate and/or the surface can have surface features such as wells, pits, channels, ridges, raised regions, pegs, posts or the like.

As used herein, the term "channel" refers to a passage in or on a substrate material that directs the flow of a fluid. A channel may run along the surface of a substrate, or may run through the substrate between openings in the substrate. A channel can have a cross section that is partially or fully surrounded by substrate material (e.g., a fluid impermeable substrate material). For example, a partially surrounded cross section can be a groove, trough, furrow or gutter that inhibits lateral flow of a fluid. The transverse cross section of an open channel can be, for example, U-shaped, V-shaped, curved, angular, polygonal, or hyperbolic. A channel can have a fully surrounded cross section such as a tunnel, tube, or pipe. A fully surrounded channel can have a rounded, circular, elliptical, square, rectangular, or polygonal cross section. In particular embodiments, a channel can be located in a flow cell, for example, being embedded within the flow cell. A channel in a flow cell can include one or more windows that are transparent to light in a particular region of the wavelength spectrum. In embodiments, the channel contains one or more polymers of the disclosure. In embodiments, the channel is filled by the one or more polymers, and flow through the channel (e.g., as in a sample fluid) is directed through the polymer in the channel. In embodiments, the assay is in a channel of a flow cell.

The terms "particle" and "bead" are used interchangeably and mean a small body made of a rigid or semi-rigid material. The body can have a shape characterized, for example, as a sphere, oval, microsphere, or other recognized particle shape whether having regular or irregular dimensions. As used herein, the term "discrete particles" refers to physically distinct particles having discernible boundaries. The term "particle" does not indicate any particular shape. The shapes and sizes of a collection of particles may be different or about the same (e.g., within a desired range of dimensions, or having a desired average or minimum dimension). A particle may be substantially spherical (e.g., microspheres) or have a non-spherical or irregular shape, such as cubic, cuboid, pyramidal, cylindrical, conical, oblong, or disc-shaped, and the like. In embodiments, the particle has the shape of a sphere, cylinder, spherocylinder, or ellipsoid.

As used herein, the term "discrete particles" refers to physically distinct particles having discernible boundaries. Discrete particles collected in a container and contacting one another will define a bulk volume containing the particles, and will typically leave some internal fraction of that bulk volume unoccupied by the particles, even when packed closely together.

A "nanoparticle," as used herein, is a particle wherein the longest diameter is less than or equal to 1000 nanometers. Nanoparticles may be composed of any appropriate material. Nanoparticles may be composed of at least two distinct materials, one material (e.g., the MOF carrier) forms the core and the other material forms the shell (e.g., copolymer) surrounding the core. In embodiments, the nanoparticle is composed of a copolymer described herein. In embodiments, a nanoparticle has a shortest diameter greater than or equal to 1 nanometer (e.g., diameter from 1 to 1000 nanometers). In contrast to a functionalized particle, an unmodified particle refers to a particle which has not been further functionalized. Thus, for example, an unmodified particle does not include a nitrogen containing moiety (e.g., terminal amine moieties). For example, an unmodified nanoparticle refers to nanoparticle as synthesized without post hoc functionalization. As used herein, the terms "bare particle" and "unmodified particle" are synonymous and interchangeable.

A functionalized particle, as used herein, may refer to the post hoc conjugation (i.e. conjugation after the formation of the particle) of a moiety to a functional group on the surface of a particle. For example, a particle may be further functionalized to include additional atoms (e.g., nitrogen) or chemical entities (e.g., polymeric moieties, polymerization initiators, or bioconjugate group).

Lengths and sizes of nanoparticles and functionalized particles as described herein may be measured using Transmission Electron Microscopy. For example, transmission electron microscopy measurements of the various particle samples may be drop coated (5 μL) onto 200 mesh copper EM grids, air-dried and imaged using a FEI Tecnai 12 TEM equipped with a Gatan Ultrascan 2K CCD camera at an accelerating voltage of 120 kV. The average size distributions of the particles may then be obtained from the TEM images using Image J software that were plotted using software (e.g., Origin Pro 8) to obtain the histogram size distributions of the particles. In embodiment, the length of a nanoparticle refers to the longest dimension of the particle.

As used herein, the term "MOF" is used in accordance with its ordinary meaning in the art and refers to a metal-organic framework. A MOF is a type of porous material comprised of metal containing nodes and organic ligands linked through coordination bonds. The structure and topology of MOFs can be designed and tailored so that the MOF can form one-, two-, or three-dimensional structures. The modular nature of MOFs allows for great synthetic tunability so properties such as porosity, stability, particle morphology and conductivity can be tailored for specific applications including encapsulation or release of guest molecules. The organic ligands used in MOFs are also referred to as "linkers" and are typically mono-, di-, tri-, or tetravalent ligands. The choice of metal and linker dictates the structure and properties of the MOF. For example, the metal's coordination preference can influence the size and shape of the pores in the MOF through the metal's preference for number and orientation of binding ligands. A MOF typically has potential voids between the organic ligands which make them valuable in applications such as drug delivery, biostorage and bio-catalysis. Further MOFs can undergo post-synthetic modification to further tune properties through swapping, altering or removing linker or node components in the framework. The MOF can be modified using a "modulator" or "modulating agent". The modulator competes with the organic linkers to bind to the metal center. In doing so, this prevents formation of impurities and slows down the reaction, allowing for increased reproducibility and crystallinity of the final product. Compounds that can act as modulators include but are not limited to CTAB, 1-methylimidazole, sodium formate and n-butylamine. A MOF can be degraded to release the compound(s) and/or material(s) encapsulated by the MOF. A MOF can be degraded in response to changes in pH, temperature or light. Examples of MOF structures are zinc imidazolate framework (e.g., ZIF-8), Zr based MOFs, mesoporous iron (III) carboxylate MIL-100(Fe).

As used herein, the term "ZIF-8" refers to a zeolitic imidazolate framework, which is a type of MOF. A ZIF-8 is composed of metal cation $Zn^{2+}$ linked to the 2-methylimidazolate ligand species. On-demand release of material (i.e., controlled degradation) from a ZIF-8 carrier occurs in the presence of an external stimulus such as pH and at high efficiency (up to 100%) and/or at high temperature conditions. The ZIF-8 can be degraded by lowering the pH with an acid such as HCl, or by raising the pH with a base such as NaOH, and/or in the presence of degrading compounds such as phosphate, thereby eroding or dissolving the MOF.

As used herein, the term "flow cell" refers to the reaction vessel in a nucleic acid sequencing device. The flow cell is typically a glass slide containing small fluidic channels (e.g., a glass slide 75 mm×25 mm×1 mm having one or more channels), through which sequencing solutions (e.g., polymerases, nucleotides, and buffers) may traverse. Though typically glass, suitable flow cell materials may include polymeric materials, plastics, silicon, quartz (fused silica), Borofloat® glass, silica, silica-based materials, carbon, metals, an optical fiber or optical fiber bundles, sapphire, or plastic materials such as COCs and epoxies. The particular material can be selected based on properties desired for a particular use.

As used herein, the terms "cluster" and "colony" are used interchangeably to refer to a discrete site on a solid support that includes a plurality of immobilized polynucleotides and a plurality of immobilized complementary polynucleotides. The term "clustered array" refers to an array formed from such clusters or colonies. In this context the term "array" is not to be understood as requiring an ordered arrangement of clusters. The term "array" is used in accordance with its ordinary meaning in the art, and refers to a population of different molecules that are attached to one or more solid-phase substrates such that the different molecules can be differentiated from each other according to their relative location. An array can include different molecules that are each located at different addressable features on a solid-phase substrate. The molecules of the array can be nucleic acid primers, nucleic acid probes, nucleic acid templates or nucleic acid enzymes such as polymerases or ligases. Arrays useful in the invention can have densities that ranges from about 2 different features to many millions, billions or higher. The density of an array can be from 2 to as many as a billion or more different features per square cm. For example an array can have at least about 100 features/cm$^2$, at least about 1,000 features/cm$^2$, at least about 10,000 features/cm$^2$, at least about 100,000 features/cm$^2$, at least about 10,000,000 features/cm$^2$, at least about 100,000,000 features/cm$^2$, at least about 1,000,000,000 features/cm$^2$, at least about 2,000,000,000 features/cm$^2$ or higher. In embodiments, the arrays have features at any of a variety of densities including, for example, at least about 10 features/cm$^2$, 100 features/cm$^2$, 500 features/cm$^2$, 1,000 features/cm$^2$, 5,000 features/cm$^2$, 10,000 features/cm$^2$, 50,000 features/cm$^2$, 100,000 features/cm$^2$, 1,000,000 features/cm$^2$, 5,000,000 features/cm$^2$, or higher.

Nucleic acids, including e.g., nucleic acids with a phosphorothioate backbone, can include one or more reactive moieties. As used herein, the term reactive moiety includes any group capable of reacting with another molecule, e.g., a nucleic acid or polypeptide through covalent, non-covalent or other interactions. By way of example, the nucleic acid can include an amino acid reactive moiety that reacts with an amino acid on a protein or polypeptide through a covalent, non-covalent or other interaction.

As used herein, the term "template polynucleotide" refers to any polynucleotide molecule that may be bound by a polymerase and utilized as a template for nucleic acid synthesis. A template polynucleotide may be a target polynucleotide. In general, the term "target polynucleotide" refers to a nucleic acid molecule or polynucleotide in a starting population of nucleic acid molecules having a target sequence whose presence, amount, and/or nucleotide sequence, or changes in one or more of these, are desired to be determined. In general, the term "target sequence" refers to a nucleic acid sequence on a single strand of nucleic acid. The target sequence may be a portion of a gene, a regulatory sequence, genomic DNA, cDNA, RNA including mRNA, miRNA, rRNA, or others. The target sequence may be a target sequence from a sample or a secondary target such as a product of an amplification reaction. A target polynucleotide is not necessarily any single molecule or sequence. For example, a target polynucleotide may be any one of a plurality of target polynucleotides in a reaction, or all polynucleotides in a given reaction, depending on the reaction conditions. For example, in a nucleic acid amplification reaction with random primers, all polynucleotides in a reaction may be amplified. As a further example, a collection of targets may be simultaneously assayed using polynucleotide primers directed to a plurality of targets in a single reaction. As yet another example, all or a subset of polynucleotides in a sample may be modified by the addition of a primer-binding sequence (such as by the ligation of adapters containing the primer binding sequence), rendering each modified polynucleotide a target polynucleotide in a reaction with the corresponding primer polynucleotide(s). In the context of selective sequencing, "target polynucleotide(s)" refers to the subset of polynucleotide(s) to be sequenced from within a starting population of polynucleotides.

In embodiments, a target polynucleotide is a cell-free polynucleotide. In general, the terms "cell-free," "circulating," and "extracellular" as applied to polynucleotides (e.g. "cell-free DNA" (cfDNA) and "cell-free RNA" (cfRNA)) are used interchangeably to refer to polynucleotides present in a sample from a subject or portion thereof that can be isolated or otherwise manipulated without applying a lysis step to the sample as originally collected (e.g., as in extraction from cells or viruses). Cell-free polynucleotides are thus unencapsulated or "free" from the cells or viruses from which they originate, even before a sample of the subject is collected. Cell-free polynucleotides may be produced as a byproduct of cell death (e.g. apoptosis or necrosis) or cell shedding, releasing polynucleotides into surrounding body fluids or into circulation. Accordingly, cell-free polynucleotides may be isolated from a non-cellular fraction of blood (e.g. serum or plasma), from other bodily fluids (e.g. urine), or from non-cellular fractions of other types of samples.

A polynucleotide is typically composed of a specific sequence of four nucleotide bases: adenine (A); cytosine (C); guanine (G); and thymine (T) (uracil (U) for thymine (T) when the polynucleotide is RNA). Thus, the term "polynucleotide sequence" is the alphabetical representation of a polynucleotide molecule; alternatively, the term may be applied to the polynucleotide molecule itself. This alphabetical representation can be input into databases in a computer having a central processing unit and used for bioinformatics applications such as functional genomics and homology searching. Polynucleotides may optionally include one or more non-standard nucleotide(s), nucleotide analog(s) and/or modified nucleotides.

As used herein, the terms "analogue" and "analog", in reference to a chemical compound, refers to compound having a structure similar to that of another one, but differing from it in respect of one or more different atoms, functional groups, or substructures that are replaced with one or more other atoms, functional groups, or substructures. In the context of a nucleotide, a nucleotide analog refers to a compound that, like the nucleotide of which it is an analog, can be incorporated into a nucleic acid molecule (e.g., an extension product) by a suitable polymerase, for example, a DNA polymerase in the context of a nucleotide analogue. The terms also encompass nucleic acids containing known nucleotide analogs or modified backbone residues or linkages, which are synthetic, naturally occurring, or non-naturally occurring, which have similar binding properties as the reference nucleic acid, and which are metabolized in a manner similar to the reference nucleotides. Examples of such analogs include, include, without limitation, phosphodiester derivatives including, e.g., phosphoramidate, phosphorodiamidate, phosphorothioate (also known as phosphorothioate having double bonded sulfur replacing oxygen in the phosphate), phosphorodithioate, phosphonocarboxylic acids, phosphonocarboxylates, phosphonoacetic acid, phosphonoformic acid, methyl phosphonate, boron phosphonate, or O-methylphosphoroamidite linkages (see, e.g., see Eckstein, OLIGONUCLEOTIDES AND ANALOGUES: A PRACTICAL APPROACH, Oxford University Press) as well as modifications to the nucleotide bases such as in 5-methyl cytidine or pseudouridine; and peptide nucleic acid backbones and linkages. Other analog nucleic acids include those with positive backbones; non-ionic backbones, modified sugars, and non-ribose backbones (e.g. phosphorodiamidate morpholino oligos or locked nucleic acids (LNA)), including those described in U.S. Pat. Nos. 5,235,033 and 5,034,506, and Chapters 6 and 7, ASC Symposium Series 580, CARBOHYDRATE MODIFICATIONS IN ANTISENSE RESEARCH, Sanghui & Cook, eds. Nucleic acids containing one or more carbocyclic sugars are also included within one definition of nucleic acids. Modifications of the ribose-phosphate backbone may be done for a variety of reasons, e.g., to increase the stability and half-life of such molecules in physiological environments or as probes on a biochip. Mixtures of naturally occurring nucleic acids and analogs can be made; alternatively, mixtures of different nucleic acid analogs, and mixtures of naturally occurring nucleic acids and analogs may be made. In embodiments, the internucleotide linkages in DNA are phosphodiester, phosphodiester derivatives, or a combination of both.

As used herein, a "native" nucleotide is used in accordance with its plain and ordinary meaning and refers to a naturally occurring nucleotide that does not include an exogenous label (e.g., a fluorescent dye, or other label) or chemical modification such as may characterize a nucleotide analog (e.g., a reversible terminating moiety). Examples of native nucleotides useful for carrying out procedures described herein include: dATP (2'-deoxyadenosine-5'-triphosphate); dGTP (2'-deoxyguanosine-5'-triphosphate); dCTP (2'-deoxycytidine-5'-triphosphate); dTTP (2'-deoxythymidine-5'-triphosphate); and dUTP (2'-deoxyuridine-5'-triphosphate). A "canonical" nucleotide is an unmodified nucleotide.

As used herein, the term "modified nucleotide" refers to nucleotide modified in some manner. Typically, a nucleotide contains a single 5-carbon sugar moiety, a single nitrogenous base moiety and 1 to three phosphate moieties. In embodiments, a nucleotide can include a blocking moiety (alternatively referred to herein as a reversible terminator moiety) and/or a label moiety. A blocking moiety on a nucleotide prevents formation of a covalent bond between the 3' hydroxyl moiety of the nucleotide and the 5' phosphate of another nucleotide. A blocking moiety on a nucleotide can be reversible, whereby the blocking moiety can be removed or modified to allow the 3' hydroxyl to form a covalent bond with the 5' phosphate of another nucleotide. A blocking moiety can be effectively irreversible under particular conditions used in a method set forth herein. In embodiments, the blocking moiety is attached to the 3' oxygen of the nucleotide and is independently —NH$_2$, —CN, —CH$_3$, C$_2$-C$_6$ allyl (e.g., —CH$_2$—CH=CH$_2$), methoxyalkyl (e.g., —CH$_2$—O—CH$_3$), or —CH$_2$N$_3$. In embodiments, the blocking moiety is attached to the 3' oxygen of the nucleotide and is independently

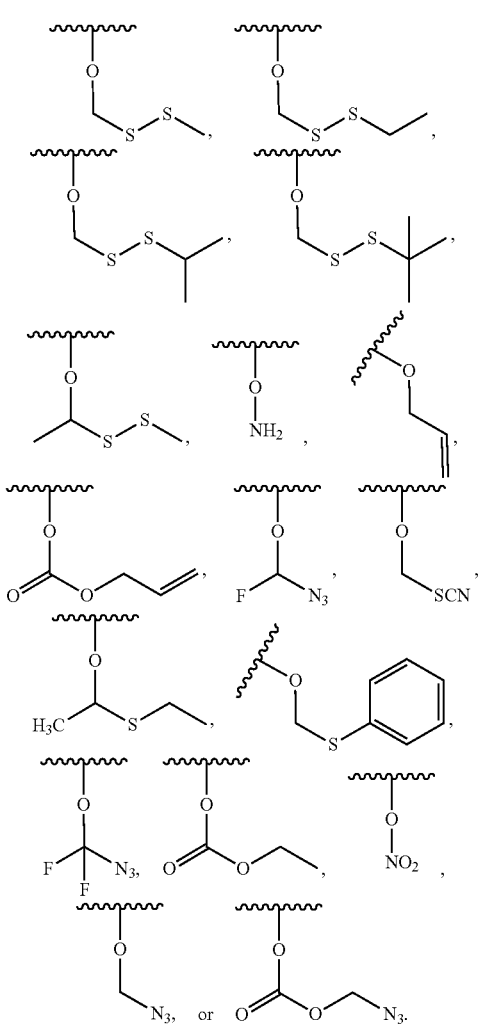

A label moiety of a nucleotide can be any moiety that allows the nucleotide to be detected, for example, using a spectroscopic method. Exemplary label moieties are fluorescent labels, mass labels, chemiluminescent labels, electrochemical labels, detectable labels and the like. One or more of the above moieties can be absent from a nucleotide used in the methods and compositions set forth herein. For example, a nucleotide can lack a label moiety or a blocking moiety or both. Examples of nucleotide analogues include, without limitation, 7-deaza-adenine, 7-deaza-guanine, the analogues of deoxynucleotides shown herein, analogues in which a label is attached through a cleavable linker to the 5-position of cytosine or thymine or to the 7-position of deaza-adenine or deaza-guanine, and analogues in which a small chemical moiety is used to cap the OH group at the 3'-position of deoxyribose. Nucleotide analogues and DNA polymerase-based DNA sequencing are also described in U.S. Pat. No. 6,664,079, which is incorporated herein by reference in its entirety for all purposes.

The term "cleavable linker" or "cleavable moiety" as used herein refers to a divalent or monovalent, respectively, moiety which is capable of being separated (e.g., detached, split, disconnected, hydrolyzed, a stable bond within the moiety is broken) into distinct entities. A cleavable linker is cleavable (e.g., specifically cleavable) in response to external stimuli (e.g., enzymes, nucleophilic/basic reagents, reducing agents, photo-irradiation, electrophilic/acidic reagents, organometallic and metal reagents, or oxidizing reagents). A chemically cleavable linker refers to a linker which is capable of being split in response to the presence of a chemical (e.g., acid, base, oxidizing agent, reducing agent, Pd(0), tris-(2-carboxyethyl)phosphine, dilute nitrous acid, fluoride, tris(3-hydroxypropyl)phosphine), sodium dithionite ($Na_2S_2O_4$), or hydrazine ($N_2H_4$)). A chemically cleavable linker is non-enzymatically cleavable. In embodiments, the cleavable linker is cleaved by contacting the cleavable linker with a cleaving agent. In embodiments, the cleaving agent is a phosphine containing reagent (e.g., TCEP or THPP), sodium dithionite ($Na_2S_2O_4$), weak acid, hydrazine ($N_2H_4$), Pd(0), or light-irradiation (e.g., ultraviolet radiation). In embodiments, cleaving includes removing. A "cleavable site" or "scissile linkage" in the context of a polynucleotide is a site which allows controlled cleavage of the polynucleotide strand (e.g., the linker, the primer, or the polynucleotide) by chemical, enzymatic, or photochemical means known in the art and described herein. A scissile site may refer to the linkage of a nucleotide between two other nucleotides in a nucleotide strand (i.e., an internucleosidic linkage). In embodiments, the scissile linkage can be located at any position within the one or more nucleic acid molecules, including at or near a terminal end (e.g., the 3' end of an oligonucleotide) or in an interior portion of the one or more nucleic acid molecules. In embodiments, conditions suitable for separating a scissile linkage include a modulating the pH and/or the temperature. In embodiments, a scissile site can include at least one acid-labile linkage. For example, an acid-labile linkage may include a phosphoramidate linkage. In embodiments, a phosphoramidate linkage can be hydrolysable under acidic conditions, including mild acidic conditions such as trifluoroacetic acid and a suitable temperature (e.g., 30° C.), or other conditions known in the art, for example Matthias Mag, et al Tetrahedron Letters, Volume 33, Issue 48, 1992, 7319-7322. In embodiments, the scissile site can include at least one photolabile internucleosidic linkage (e.g., o-nitrobenzyl linkages, as described in Walker et al, J. Am. Chem. Soc. 1988, 110, 21, 7170-7177), such as o-nitrobenzyloxymethyl or p-nitrobenzyloxymethyl group(s). In embodiments, the scissile site includes at least one uracil nucleobase. In embodiments, a uracil nucleobase can be cleaved with a uracil DNA glycosylase (UDG) or Formamidopyrimidine DNA Glycosylase Fpg. In embodiments, the scissile linkage site includes a sequence-specific nicking site having a nucleotide sequence that is recognized and nicked by a nicking endonuclease enzyme or a uracil DNA glycosylase.

In embodiments, the nucleotides of the present disclosure use a cleavable linker to attach the label to the nucleotide. The use of a cleavable linker ensures that the label can, if required, be removed after detection, avoiding any interfering signal with any labeled nucleotide incorporated subsequently. The use of the term "cleavable linker" is not meant to imply that the whole linker is required to be removed from the nucleotide base. The cleavage site can be located at a position on the linker that ensures that part of the linker remains attached to the nucleotide base after cleavage. The linker can be attached at any position on the nucleotide base provided that Watson-Crick base pairing can still be carried out. In the context of purine bases, it is preferred if the linker is attached via the 7-position of the purine or the preferred deazapurine analogue, via an 8-modified purine, via an N-6 modified adenosine or an N-2 modified guanine. For pyrimidines, attachment is preferably via the 5-position on cytidine, thymidine or uracil and the N-4 position on cytosine.

In embodiments, the nucleotides of the present disclosure use a cleavable linker to attach the label to the nucleotide. The use of a cleavable linker ensures that the label can, if required, be removed after detection, avoiding any interfering signal with any labeled nucleotide incorporated subsequently. The use of the term "cleavable linker" is not meant to imply that the whole linker is required to be removed from the nucleotide base. The cleavage site can be located at a position on the linker that ensures that part of the linker remains attached to the nucleotide base after cleavage. The linker can be attached at any position on the nucleotide base provided that Watson-Crick base pairing can still be carried out. In the context of purine bases, it is preferred if the linker is attached via the 7-position of the purine or the preferred deazapurine analogue, via an 8-modified purine, via an N-6 modified adenosine or an N-2 modified guanine. For pyrimidines, attachment is preferably via the 5-position on cytidine, thymidine or uracil and the N-4 position on cytosine.

The terms "identical" or percent "identity," in the context of two or more nucleic acids or polypeptide sequences, refer to two or more sequences or subsequences that are the same or have a specified percentage of amino acid residues or nucleotides that are the same (i.e., about 60% identity, preferably 65%, 70%, 75%, 80%, 85%, 90%, 91%, 92%, 93%, 94%, 95%, 96%, 97%, 98%, 99%, or higher identity over a specified region, when compared and aligned for maximum correspondence over a comparison window or designated region) as measured using a BLAST or BLAST 2.0 sequence comparison algorithms with default parameters described below, or by manual alignment and visual inspection (see, e.g., NCBI web site blast.ncbi.nlm.nih.gov/Blast.cgi or the like). Such sequences are then said to be "substantially identical." This definition also refers to, or may be applied to, the complement of a test sequence. The definition also includes sequences that have deletions and/or additions, as well as those that have substitutions. As described below, the preferred algorithms can account for gaps and the like. Preferably, identity exists over a region that is at least about 25 amino acids or nucleotides in length, or more preferably over a region that is 50-100 amino acids or nucleotides in length.

As used herein the term "determine" can be used to refer to the act of ascertaining, establishing or estimating. A determination can be probabilistic. For example, a determination can have an apparent likelihood of at least 50%, 75%, 90%, 95%, 98%, 99%, 99.9% or higher. In some cases, a determination can have an apparent likelihood of 100%. An exemplary determination is a maximum likelihood analysis or report. As used herein, the term "identify," when used in reference to a thing, can be used to refer to recognition of the thing, distinction of the thing from at least one other thing or categorization of the thing with at least one other thing. The recognition, distinction or categorization can be probabilistic. For example, a thing can be identified with an apparent likelihood of at least 50%, 75%, 90%, 95%, 98%, 99%, 99.9% or higher. A thing can be identified based on a result of a maximum likelihood analysis. In some cases, a thing can be identified with an apparent likelihood of 100%.

As used herein, the term "removable" group, e.g., a label or a blocking group or protecting group, is used in accordance with its plain and ordinary meaning and refers to a chemical group that can be removed from a nucleotide analogue such that a DNA polymerase can extend the nucleic acid (e.g., a primer or extension product) by the incorporation of at least one additional nucleotide. Removal may be by any suitable method, including enzymatic, chemical, or photolytic cleavage. Removal of a removable group, e.g., a blocking group, does not require that the entire removable group be removed, only that a sufficient portion of it be removed such that a DNA polymerase can extend a nucleic acid by incorporation of at least one additional nucleotide using a nucleotide or nucleotide analogue. In general, the conditions under which a removable group is removed are compatible with a process employing the removable group (e.g., an amplification process or sequencing process).

As used herein, the terms "reversible blocking groups" and "reversible terminators" are used in accordance with their plain and ordinary meanings and refer to a blocking moiety located, for example, at the 3' position of the nucleotide and may be a chemically cleavable moiety such as an allyl group, an azidomethyl group or a methoxymethyl group, or may be an enzymatically cleavable group such as a phosphate ester. Non-limiting examples of nucleotide blocking moieties are described in applications WO 2004/018497, U.S. Pat. Nos. 7,057,026, 7,541,444, WO 96/07669, U.S. Pat. Nos. 5,763,594, 5,808,045, 5,872,244 and 6,232,465 the contents of which are incorporated herein by reference in their entirety. The nucleotides may be labeled or unlabeled. They may be modified with reversible terminators useful in methods provided herein and may be 3'-O-blocked reversible or 3'-unblocked reversible terminators. In nucleotides with 3'-O-blocked reversible terminators, the blocking group —OR [reversible terminating (capping) group] is linked to the oxygen atom of the 3'-OH of the pentose, while the label is linked to the base, which acts as a reporter and can be cleaved. The 3'-O-blocked reversible terminators are known in the art, and may be, for instance, a 3'-ONH$_2$ reversible terminator, a 3'-O-allyl reversible terminator, or a 3'-O-azidomethyl reversible terminator. In embodiments, the reversible terminator moiety is

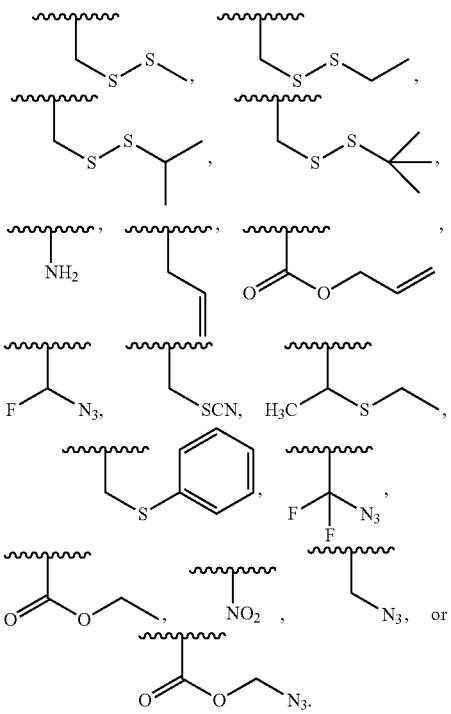

The term "allyl" as described herein refers to an unsubstituted methylene attached to a vinyl group (i.e., —CH=CH$_2$), having the formula

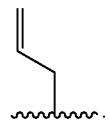

In embodiments, the reversible terminator moiety is

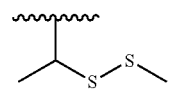 [SMILES: *C(C)SSC]

as described in U.S. Pat. No. 10,738,072, which is incorporated herein by reference for all purposes. For example, a nucleotide including a reversible terminator moiety may be represented by the formula:

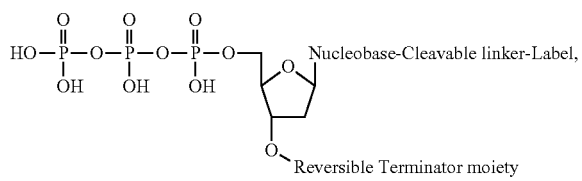

where the nucleobase is adenine or adenine analogue, thymine or thymine analogue, guanine or guanine analogue, or cytosine or cytosine analogue.

As used herein, the term "barcode" or "index" or "unique molecular identifier (UMI)" refers to a known nucleic acid sequence that allows some feature with which the barcode is associated to be identified. Typically, a barcode is unique to a particular feature in a pool of barcodes that differ from one another in sequence, and each of which is associated with a different feature. In embodiments, barcodes are about or at least about 5, 6, 7, 8, 9, 10, 15, 20, 25, 30, 40, 50, 75 or more nucleotides in length. In embodiments, barcodes are shorter than 20, 15, 10, 9, 8, 7, 6, or 5 nucleotides in length. In embodiments, barcodes are 10-50 nucleotides in length, such as 15-40 or 20-30 nucleotides in length. In a pool of different barcodes, barcodes may have the same or different lengths. In general, barcodes are of sufficient length and include sequences that are sufficiently different to allow the identification of associated features (e.g., a binding moiety or analyte) based on barcodes with which they are associated. In embodiments, a barcode can be identified accurately after the mutation, insertion, or deletion of one or more nucleotides in the barcode sequence, such as the mutation, insertion, or deletion of 1, 2, 3, 4, 5, or more nucleotides. In embodiments, each barcode in a plurality of barcodes differs from every other barcode in the plurality by at least three nucleotide positions, such as at least 3, 4, 5, 6, 7, 8, 9, 10, or more nucleotide positions.

In some embodiments, the reaction conditions for a plurality of invasion-primer extension cycles includes incubation in a denaturant. As used herein, the terms "denaturant" or plural "denaturants" are used in accordance with their plain and ordinary meanings and refer to an additive or condition that disrupts the base pairing between nucleotides within opposing strands of a double-stranded polynucleotide molecule. The term "denature" and its variants, when used in reference to any double-stranded polynucleotide molecule, or double-stranded polynucleotide sequence, includes any process whereby the base pairing between nucleotides within opposing strands of the double-stranded molecule, or double-stranded sequence, is disrupted. Typically, denaturation includes rendering at least some portion or region of two strands of the double-stranded polynucleotide molecule or sequence single-stranded or partially single-stranded. In some embodiments, denaturation includes separation of at least some portion or region of two strands of the double-stranded polynucleotide molecule or sequence from each other. Typically, the denatured region or portion is then capable of hybridizing to another polynucleotide molecule or sequence. Optionally, there can be "complete" or "total" denaturation of a double-stranded polynucleotide molecule or sequence. Complete denaturation conditions are, for example, conditions that would result in complete separation of a significant fraction (e.g., more than 10%, 20%, 30%, 40% or 50%) of a large plurality of strands from their extended and/or full-length complements. Typically, complete or total denaturation disrupts all of the base pairing between the nucleotides of the two strands with each other. Similarly, a nucleic acid sample is optionally considered fully denatured when more than 80% or 90% of individual molecules of the sample lack any double-strandedness (or lack any hybridization to a complementary strand).

Alternatively, the double-stranded polynucleotide molecule or sequence can be partially or incompletely denatured. A given nucleic acid molecule can be considered partially denatured when a portion of at least one strand of the nucleic acid remains hybridized to a complementary strand, while another portion is in an unhybridized state (even if it is in the presence of a complementary sequence). The unhybridized portion is optionally at least 5, 10, 15, 20, 50, or more nucleotides in length. The hybridized portion is optionally at least 5, 10, 15, 20, 50, or more nucleotides in length. Partial denaturation includes situations where some, but not all, of the nucleotides of one strand or sequence, are based paired with some nucleotides of the other strand or sequence within a double-stranded polynucleotide. In some embodiments, at least 20% but less than 100% of the nucleotide residues of one strand of the partially denatured polynucleotide (or sequence) are not base paired to nucleotide residues within the opposing strand. In embodiments, at least 50% of nucleotide residues within the double-stranded polynucleotide molecule (or double-stranded polynucleotide sequence) are in single-stranded (or unhybridized) from, but less than 20% or 10% of the residues are double-stranded.

Optionally, a nucleic acid sample can be considered to be partially denatured when a substantial fraction of individual nucleic acid molecules of the sample (e.g., above 20%, 30%, 50%, or 70%) are in a partially denatured state. Optionally less than a substantial amount of individual nucleic acid molecules in the sample are fully denatured, e.g., not more than 5%, 10%, 20%, 30% or 50% of the nucleic acid molecules in the sample. Under exemplary conditions at least 50% of the nucleic acid molecules of the sample are partly denatured, but less than 20% or 10% are fully denatured. In other situations, at least 30% of the nucleic acid molecules of the sample are partly denatured, but less than 10% or 5% are fully denatured. Similarly, a nucleic acid sample can be non-denatured when a minority of individual nucleic acid molecules in the sample are partially or completely denatured.

In an embodiment, partially denaturing conditions are achieved by maintaining the duplexes as a suitable temperature range. For example, the nucleic acid is maintained at temperature sufficiently elevated to achieve some heat-denaturation (e.g., above 45° C., 50° C., 55° C., 60° C., 65° C., or 70° C.) but not high enough to achieve complete heat-denaturation (e.g., below 95° C. or 90° C. or 85° C. or 80° C. or 75° C.). In an embodiment the nucleic acid is partially denatured using substantially isothermal conditions. Alternatively, chemical denaturation can be accomplished by contacting the double-stranded polynucleotide to be denatured with appropriate chemical denaturants, such as strong alkalis, strong acids, chaotropic agents, and the like and can include, for example, NaOH, urea, or guanidine-containing compounds. In some embodiments, partial or complete denaturation is achieved by exposure to chemical denaturants such as urea or formamide, with concentrations suitably adjusted, or using high or low pH (e.g., pH between 4-6 or 8-9). In embodiments, the denaturant is a buffered solution including betaine, dimethyl sulfoxide (DMSO), ethylene glycol, formamide, glycerol, guanidine thiocyanate, 4-methylmorpholine 4-oxide (NMO), or a mixture thereof. In embodiments, the first denaturant is a buffered solution including about 0% to about 50% dimethyl sulfoxide (DMSO); about 0% to about 50% ethylene glycol; about 0% to about 20% formamide; or about 0 to about 3M betaine, or a mixture thereof. In an embodiment herein, partial denaturation and/or amplification, including any one or more steps or methods described herein, can be achieved using a recombinase and/or single-stranded binding protein.

In some embodiments, complete or partial denaturation of a double-stranded polynucleotide sequence is accomplished by contacting the double-stranded polynucleotide sequence using appropriate denaturing agents. For example, the double-stranded polynucleotide can be subjected to heat-denaturation (also referred to interchangeably as thermal denaturation) by raising the temperature to a point where the desired level of denaturation is accomplished. In some embodiments, thermal denaturation of a double-stranded polynucleotide, includes adjusting the temperature to achieve complete separation of the two strands of the polynucleotide, such that 90% or greater of the strands are in single-stranded form across their entire length. In some embodiments, complete thermal denaturation of a polynucleotide molecule (or polynucleotide sequence) is accomplished by exposing the polynucleotide molecule (or sequence) to a temperature that is at least 5° C., 10° C., 15° C., 20° C., 25° C., 30° C., 50° C., or 100° C., above the calculated or predict melting temperature (Tm) of the polynucleotide molecule or sequence.

In some embodiments, complete or partial denaturation is accomplished by treating the double-stranded polynucleotide sequence to be denatured using a denaturant mixture including an SSB protein (e.g., T4 gp32 protein, T7 gene 2.5 SSB protein, or phi29 SSB protein, *Thermococcus kodakarensis* (KOD) SSB, *Therms thermophilus* (TTH) SSB, *Sulfolobus solfataricus* (SSO) SSB, or Extreme Thermostable Single-Stranded DNA Binding Protein (ET-SSB)), a strand-displacing polymerase (e.g., Bst large fragment (Bst LF) polymerase, Bst 3.0 polymerase, Bst 2.0 polymerase, Bsu polymerase, SD polymerase, Vent exo-polymerase, Phi29 polymerase, or a mutant thereof), and one or more crowding agents (poly(ethylene glycol) (PEG), polyvinylpyrrolidone (PVP), bovine serum albumin (BSA), dextran, Ficoll (e.g., Ficoll 70 or Ficoll 400), glycerol, or a combination thereof). In embodiments, the crowding agent is poly(ethylene glycol) (e.g., PEG 200, PEG 600, PEG 800, PEG 2,050, PEG 4,600, PEG 6,000, PEG 8,000, PEG 10,000, PEG 20,000, or PEG 35,000), dextran sulfate, bovine pancreatic trypsin inhibitor (BPTI), ribonuclease A, lysozyme, β-lactoglobulin, hemoglobin, bovine serum albumin (BSA), or poly(sodium 4-styrene sulfonate) (PSS). In embodiments, the denaturant mixture including an SSB, a strand-displacing polymerase, and one or more crowding agents does not include a chemical denaturant (e.g., betaine, DMSO, ethylene glycol, formamide, guanidine thiocyanate, NMO, TMAC, or a mixture thereof).

In some embodiments, a nucleic acid includes a label. As used herein, the term "label" or "labels" are used in accordance with their plain and ordinary meanings and refer to molecules that can directly or indirectly produce or result in a detectable signal either by themselves or upon interaction with another molecule. Non-limiting examples of detectable labels include fluorescent dyes, biotin, digoxin, haptens, and epitopes. In general, a dye is a molecule, compound, or substance that can provide an optically detectable signal, such as a colorimetric, luminescent, bioluminescent, chemiluminescent, phosphorescent, or fluorescent signal. In embodiments, the label is a dye. In embodiments, the dye is a fluorescent dye. Non-limiting examples of dyes, some of which are commercially available, include CF dyes (Biotium, Inc.), Alexa Fluor dyes (Thermo Fisher), DyLight dyes (Thermo Fisher), Cy dyes (GE Healthscience), IRDyes (Li-Cor Biosciences, Inc.), and HiLyte dyes (Anaspec, Inc.). In embodiments, a particular nucleotide type is associated with a particular label, such that identifying the label identifies the nucleotide with which it is associated. In embodiments, the label is luciferin that reacts with luciferase to produce a detectable signal in response to one or more bases being incorporated into an elongated complementary strand, such as in pyrosequencing. In embodiment, a nucleotide includes a label (such as a dye). In embodiments, the label is not associated with any particular nucleotide, but detection of the label identifies whether one or more nucleotides having a known identity were added during an extension step (such as in the case of pyrosequencing).

In embodiments, the detectable label is a fluorescent dye. In embodiments, the detectable label is a fluorescent dye capable of exchanging energy with another fluorescent dye (e.g., fluorescence resonance energy transfer (FRET) chromophores). Examples of detectable agents include imaging agents, including fluorescent and luminescent substances, including, but not limited to, a variety of organic or inorganic small molecules commonly referred to as "dyes," "labels," or "indicators." Examples include fluorescein, rhodamine, acridine dyes, Alexa dyes, and cyanine dyes. In embodiments, the detectable moiety is a fluorescent molecule (e.g., acridine dye, cyanine, dye, fluorine dye, oxazine dye, phenanthridine dye, or rhodamine dye). In embodiments, the detectable moiety is a fluorescent molecule (e.g., acridine dye, cyanine, dye, fluorine dye, oxazine dye, phenanthridine dye, or rhodamine dye). In embodiments, the detectable moiety is a moiety of a derivative of one of the detectable moieties described immediately above, wherein the derivative differs from one of the detectable moieties immediately above by a modification resulting from the conjugation of the detectable moiety to a compound described herein.

The term "cyanine" or "cyanine moiety" as described herein refers to a detectable moiety containing two nitrogen groups separated by a polymethine chain. In embodiments, the cyanine moiety has 3 methine structures (i.e., cyanine 3 or Cy3). In embodiments, the cyanine moiety has 5 methine structures (i.e., cyanine 5 or Cy5). In embodiments, the cyanine moiety has 7 methine structures (i.e., cyanine 7 or Cy7).

As used herein, the term "DNA polymerase" and "nucleic acid polymerase" are used in accordance with their plain ordinary meanings and refer to enzymes capable of synthesizing nucleic acid molecules from nucleotides (e.g., deoxyribonucleotides). Typically, a DNA polymerase adds nucleotides to the 3'-end of a DNA strand, one nucleotide at a time. In embodiments, the DNA polymerase is a Pol I DNA polymerase, Pol II DNA polymerase, Pol III DNA polymerase, Pol IV DNA polymerase, Pol V DNA polymerase, Pol β DNA polymerase, Pol μ DNA polymerase, Pol λ DNA polymerase, Pol σ DNA polymerase, Pol α DNA polymerase, Pol δ DNA polymerase, Pol ε DNA polymerase, Pol η DNA polymerase, Pol ι DNA polymerase, Pol κ DNA polymerase, Pol ζ DNA polymerase, Pol γ DNA polymerase, Pol θ DNA polymerase, Pol υ DNA polymerase, or a thermophilic nucleic acid polymerase (e.g. Therminator γ, 9° N polymerase (exo-), Therminator II, Therminator III, or Therminator IX). In embodiments, the DNA polymerase is a modified archaeal DNA polymerase. In embodiments, the polymerase is a reverse transcriptase. In embodiments, the polymerase is a mutant *P. abyssi* polymerase (e.g., such as a mutant *P. abyssi* polymerase described in WO 2018/148723 or WO 2020/056044).

As used herein, the term "thermophilic nucleic acid polymerase" refers to a family of DNA polymerases (e.g., 9° N™) and mutants thereof derived from the DNA polymerase originally isolated from the hyperthermophilic archaea, *Thermococcus* sp. 9 degrees N-7, found in hydrothermal vents at that latitude (East Pacific Rise) (Southworth M W, et al. PNAS. 1996; 93(11):5281-5285). A thermophilic nucleic acid polymerase is a member of the family B DNA polymerases. Site-directed mutagenesis of the 3'-5' exo motif I (Asp-Ile-Glu or DIE) to AIA, AIE, EIE, EID or DIA yielded polymerase with no detectable 3' exonuclease activity. Mutation to Asp-Ile-Asp (DID) resulted in reduction of 3'-5' exonuclease specific activity to <1% of wild type, while maintaining other properties of the polymerase including its high strand displacement activity. The sequence AIA (D141A, E143A) was chosen for reducing exonuclease. Subsequent mutagenesis of key amino acids results in an increased ability of the enzyme to incorporate dideoxynucleotides, ribonucleotides and acyclonucleotides (e.g., Therminator II enzyme from New England Biolabs with D141A/E143A/Y409V/A485L mutations); 3'-amino-dNTPs, 3'-azido-dNTPs and other 3'-modified nucleotides (e.g., NEB Therminator III DNA Polymerase with D141A/E143A/L408S/Y409A/P410V mutations, NEB Therminator IX DNA polymerase), or γ-phosphate labeled nucleotides (e.g., Therminator γ: D141A/E143A/W355A/L408W/R460A/Q461S/K464E/D480V/R484W/A485L). Typically, these enzymes do not have 5'-3' exonuclease activity. Additional information about thermophilic nucleic acid polymerases may be found in (Southworth M W, et al. PNAS. 1996; 93(11):5281-5285; Bergen K, et al. ChemBioChem. 2013; 14(9):1058-1062; Kumar S, et al. Scientific Reports. 2012; 2:684; Fuller C W, et al. 2016; 113(19):5233-5238; Guo J, et al. Proceedings of the National Academy of Sciences of the United States of America. 2008; 105(27): 9145-9150), which are incorporated herein in their entirety for all purposes.

As used herein, the term "exonuclease activity" is used in accordance with its ordinary meaning in the art, and refers to the removal of a nucleotide from a nucleic acid by an enzyme (e.g. DNA polymerase, a lambda exonuclease, Exo I, Exo III, T5, Exo V, Exo VII or the like). For example, during polymerization, nucleotides are added to the 3' end of the primer strand. Occasionally a DNA polymerase incorporates an incorrect nucleotide to the 3'-OH terminus of the primer strand, wherein the incorrect nucleotide cannot form a hydrogen bond to the corresponding base in the template strand. Such a nucleotide, added in error, is removed from the primer as a result of the 3' to 5' exonuclease activity of the DNA polymerase. In embodiments, exonuclease activity may be referred to as "proofreading." When referring to 3'-5' exonuclease activity, it is understood that the DNA polymerase facilitates a hydrolyzing reaction that breaks phosphodiester bonds at the 3' end of a polynucleotide chain to excise the nucleotide. In embodiments, 3'-5' exonuclease activity refers to the successive removal of nucleotides in single-stranded DNA in a 3'→5' direction, releasing deoxyribonucleoside 5'-monophosphates one after another. Methods for quantifying exonuclease activity are known in the art, see for example Southworth et al, PNAS Vol 93, 8281-8285 (1996). In embodiments, 5'-3' exonuclease activity refers to the successive removal of nucleotides in double-stranded DNA in a 5'→3' direction. In embodiments, the 5'-3' exonuclease is lambda exonuclease. For example, lambda exonuclease catalyzes the removal of 5' mononucleotides from duplex DNA, with a preference for 5' phosphorylated double-stranded DNA. In other embodiments, the 5'-3' exonuclease is E. coli DNA Polymerase I.

As used herein, the term "incorporating" or "chemically incorporating," when used in reference to a primer and cognate nucleotide, refers to the process of joining the cognate nucleotide to the primer or extension product thereof by formation of a phosphodiester bond.

As used herein, the term "selective" or "selectivity" or the like of a compound refers to the compound's ability to discriminate between molecular targets. When used in the context of sequencing, such as in "selectively sequencing," this term refers to sequencing one or more target polynucleotides from an original starting population of polynucleotides, and not sequencing non-target polynucleotides from the starting population. Typically, selectively sequencing one or more target polynucleotides involves differentially manipulating the target polynucleotides based on known sequence. For example, target polynucleotides may be hybridized to a probe oligonucleotide that may be labeled (such as with a member of a binding pair) or bound to a surface. In embodiments, hybridizing a target polynucleotide to a probe oligonucleotide includes the step of displacing one strand of a double-stranded nucleic acid. Probe-hybridized target polynucleotides may then be separated from non-hybridized polynucleotides, such as by removing probe-bound polynucleotides from the starting population or by washing away polynucleotides that are not bound to a probe. The result is a selected subset of the starting population of polynucleotides, which is then subjected to sequencing, thereby selectively sequencing the one or more target polynucleotides.

As used herein, the terms "specific", "specifically", "specificity", or the like of a compound refers to the agent's ability to cause a particular action, such as binding, to a particular molecular target with minimal or no action to other proteins in the cell.

As used herein, the terms "bind" and "bound" are used in accordance with their plain and ordinary meanings and refer to an association between atoms or molecules. The association can be direct or indirect. For example, bound atoms or molecules may be directly bound to one another, e.g., by a covalent bond or non-covalent bond (e.g., electrostatic interactions (e.g., ionic bond, hydrogen bond, halogen bond), van der Waals interactions (e.g., dipole-dipole, dipole-induced dipole, London dispersion), ring stacking (pi effects), hydrophobic interactions and the like). As a further example, two molecules may be bound indirectly to one another by way of direct binding to one or more intermediate molecules, thereby forming a complex.

"Specific binding" is where the binding is selective between two molecules. A particular example of specific binding is that which occurs between an antibody and an antigen. Typically, specific binding can be distinguished from non-specific when the dissociation constant (KD) is less than about $1\times10^{-5}$ M or less than about $1\times10^{-6}$ M or $1\times10^{-7}$ M. Specific binding can be detected, for example, by ELISA, immunoprecipitation, coprecipitation, with or without chemical crosslinking, two-hybrid assays and the like. In embodiments, the $K_D$ (equilibrium dissociation constant) between two specific binding molecules is less than $10^{-6}$ M, less than $10^{-7}$ M, less than $10^{-8}$ M, less than $10^{-9}$ M, less than $10^{-9}$ M, less than $10^{-11}$ M, or less than about $10^{-12}$ M or less.

As used herein, the term "rolling circle amplification (RCA)" refers to a nucleic acid amplification reaction that amplifies a circular nucleic acid template (e.g., single-stranded DNA circles) via a rolling circle mechanism. Rolling circle amplification reaction is initiated by the hybridization of a primer to a circular, often single-stranded, nucleic acid template. The nucleic acid polymerase then extends the primer that is hybridized to the circular nucleic acid template by continuously progressing around the circular nucleic acid template to replicate the sequence of the nucleic acid template over and over again (rolling circle mechanism). The rolling circle amplification typically produces concatemers including tandem repeat units of the circular nucleic acid template sequence. The rolling circle amplification may be a linear RCA (LRCA), exhibiting linear amplification kinetics (e.g., RCA using a single specific primer), or may be an exponential RCA (ERCA) exhibiting exponential amplification kinetics. Rolling circle amplification may also be performed using multiple primers (multiply primed rolling circle amplification or MPRCA) leading to hyper-branched concatemers. For example, in a double-primed RCA, one primer may be complementary, as in the linear RCA, to the circular nucleic acid template, whereas the other may be complementary to the tandem repeat unit nucleic acid sequences of the RCA product. Consequently, the double-primed RCA may proceed as a chain reaction with exponential (geometric) amplification kinetics featuring a ramifying cascade of multiple-hybridization, primer-extension, and strand-displacement events involving both the primers. This often generates a discrete set of concatemeric, double-stranded nucleic acid amplification products. The rolling circle amplification may be performed in-vitro under isothermal conditions using a suitable nucleic acid polymerase such as Phi29 DNA polymerase. RCA may be performed by using any of the DNA polymerases that are known in the art (e.g., a Phi29 DNA polymerase, a Bst DNA polymerase, or SD polymerase).

A nucleic acid can be amplified by a thermocycling method or by an isothermal amplification method. In some embodiments a rolling circle amplification method is used. In some embodiments amplification takes place on a solid support (e.g., within a flow cell) where a nucleic acid, nucleic acid library or portion thereof is immobilized. In certain sequencing methods, a nucleic acid library is added to a flow cell and immobilized by hybridization to anchors under suitable conditions. This type of nucleic acid amplification is often referred to as solid phase amplification. In some embodiments of solid phase amplification, all or a portion of the amplified products are synthesized by an extension initiating from an immobilized primer. Solid phase amplification reactions are analogous to standard solution phase amplifications except that at least one of the amplification oligonucleotides (e.g., primers) is immobilized on a solid support.

As used herein, the terms "sequencing", "sequence determination", "determining a nucleotide sequence", and the like include determination of a partial or complete sequence information, including the identification, ordering, or locations of the nucleotides that include the polynucleotide being sequenced, and inclusive of the physical processes for generating such sequence information. That is, the term includes sequence comparisons, consensus sequence determination, contig assembly, fingerprinting, and like levels of information about a target polynucleotide, as well as the express identification and ordering of nucleotides in a target polynucleotide. The term also includes the determination of the identification, ordering, and locations of one, two, or three of the four types of nucleotides within a target polynucleotide. In some embodiments, a sequencing process described herein includes contacting a template and an annealed primer with a suitable polymerase under conditions suitable for polymerase extension and/or sequencing. The sequencing methods are preferably carried out with the target polynucleotide arrayed on a solid substrate. Multiple target polynucleotides can be immobilized on the solid support through linker molecules, or can be attached to particles, e.g., microspheres, which can also be attached to a solid substrate. In embodiments, the solid substrate is in the form of a chip, a bead, a well, a capillary tube, a slide, a wafer, a filter, a fiber, a porous media, or a column. In embodiments, the solid substrate is gold, quartz, silica, plastic, glass, diamond, silver, metal, or polypropylene. In embodiments, the solid substrate is porous.

As used herein, the term "sequencing reaction mixture" is used in accordance with its plain and ordinary meaning and refers to an aqueous mixture that contains the reagents necessary to allow a nucleotide or nucleotide analogue to be added to a DNA strand by a DNA polymerase. In embodiments, the sequencing reaction mixture includes modified nucleotide analogues and an enzyme in a buffer. In embodiments, the buffer includes an acetate buffer, 3-(N-morpholino)propanesulfonic acid (MOPS) buffer, N-(2-Acetamido)-2-aminoethanesulfonic acid (ACES) buffer, phosphate-buffered saline (PBS) buffer, 4-(2-hydroxyethyl)-1-piperazineethanesulfonic acid (HEPES) buffer, N-(1,1-Dimethyl-2-hydroxyethyl)-3-amino-2-hydroxypropanesulfonic acid (AMPSO) buffer, borate buffer (e.g., borate buffered saline, sodium borate buffer, boric acid buffer), 2-Amino-2-methyl-1,3-propanediol (AMPD) buffer, N-cyclohexyl-2-hydroxyl-3-aminopropanesulfonic acid (CAPSO) buffer, 2-Amino-2-methyl-1-propanol (AMP) buffer, 4-(Cyclohexylamino)-1-butanesulfonic acid (CABS) buffer, glycine-NaOH buffer, N-Cyclohexyl-2-aminoethanesulfonic acid (CHES) buffer, tris(hydroxymethyl)aminomethane (Tris) buffer, or a N-cyclohexyl-3-aminopropanesulfonic acid (CAPS) buffer. In embodiments, the buffer is a borate buffer. In embodiments, the buffer is a CHES buffer. In embodiments, the sequencing reaction mixture includes nucleotides, wherein the nucleotides include a reversible terminating moiety and a label covalently linked to the nucleotide via a cleavable linker. In embodiments, the sequencing reaction mixture includes a buffer, DNA polymerase, detergent (e.g., Triton X or Tween-20), a chelator (e.g., EDTA), and/or salts (e.g., ammonium sulfate, magnesium chloride, sodium chloride, or potassium chloride).

As used herein, the term "sequencing cycle" is used in accordance with its plain and ordinary meaning and refers to incorporating one or more nucleotides (e.g., nucleotide analogues) to the 3' end of a polynucleotide with a polymerase, and detecting one or more labels that identify the one or more nucleotides incorporated. The sequencing may be accomplished by, for example, sequencing by synthesis, pyrosequencing, and the like. In embodiments, a sequencing cycle includes extending a complementary polynucleotide by incorporating a first nucleotide using a polymerase, wherein the polynucleotide is hybridized to a template nucleic acid, detecting the first nucleotide, and identifying the first nucleotide. In embodiments, to begin a sequencing cycle, one or more differently labeled nucleotides and a DNA polymerase can be introduced. Following nucleotide addition, signals produced (e.g., via excitation and emission of a detectable label) can be detected to determine the identity of the incorporated nucleotide (based on the labels on the nucleotides). Reagents can then be added to remove the 3' reversible terminator and to remove labels from each incorporated base. Reagents, enzymes and other substances can be removed between steps by washing. Cycles may include repeating these steps, and the sequence of each cluster is read over the multiple repetitions.

As used herein, the term "extension" or "elongation" is used in accordance with their plain and ordinary meanings and refer to synthesis by a polymerase of a new polynucleotide strand complementary to a template strand by adding free nucleotides from a reaction mixture that are complementary to the template in a 5'-to-3' direction, including condensing a 5'-phosphate group of a dNTPs with a 3'-hydroxy group at the end of the nascent (elongating) DNA strand.

As used herein, the term "sequencing read" is used in accordance with its plain and ordinary meaning and refers to an inferred sequence of nucleotide bases (or nucleotide base probabilities) corresponding to all or part of a single polynucleotide fragment. A sequencing read may include 10, 20, 30, 40, 50, 60, 70, 80, 90, 100, 150, 200, 250, or more nucleotide bases. In embodiments, a sequencing read includes reading a barcode and a template nucleotide sequence. In embodiments, a sequencing read includes reading a template nucleotide sequence. In embodiments, a sequencing read includes reading a barcode and not a template nucleotide sequence. In some embodiments, a sequencing read may include 500, 600, 700, 800, 900, 1000, 1100, 1200, 1300, 1400, 1500, or more nucleotide bases. In embodiments, a sequencing read includes generating a computationally derived string corresponding to the detected label. The sequence reads are optionally stored in an appropriate data structure for further evaluation. In embodiments, a first sequencing reaction can generate a first sequencing read. The first sequencing read can provide the sequence of a first region of the polynucleotide fragment. In embodiments, a second sequencing primer can initiate sequencing at a second location on the nucleic acid template. The second location can be distinct from the first location. In embodiments, a 3' terminal nucleotide of the second primer can hybridize to a location that is more than 5 nucleotides away from a binding site of a 3' terminal nucleotide of the first primer. The second sequencing reaction can generate a second sequencing read. The second sequencing read can provide the sequence of a second region of the nucleic acid template which is distinct from the first region of the nucleic acid template. In embodiments, the nucleic acid template is optionally subjected to one or more additional rounds of sequencing using additional sequencing primers, thereby generating additional sequencing reads.

As used herein, the term "hybridize" or "specifically hybridize" refers to a process where two complementary nucleic acid strands anneal to each other under appropriately stringent conditions. Hybridizations are typically and preferably conducted with oligonucleotides. The terms "annealing" and "hybridization" are used interchangeably to mean the formation of a stable duplex. Non-limiting examples of nucleic acid hybridization techniques are described in, for example, Sambrook, et al., Molecular Cloning: A Laboratory Manual (2nd Edition, 1989). Those skilled in the art understand how to estimate and adjust the stringency of hybridization conditions such that sequences having at least a desired level of complementarity will stably hybridize, while those having lower complementarity will not. As used herein, the term "stringent condition" refers to condition(s) under which a polynucleotide probe or primer will hybridize preferentially to its target sequence, and to a lesser extent to, or not at all to, other sequences. In some embodiments nucleic acids, or portions thereof, that are configured to specifically hybridize are often about 80% or more, 81% or more, 82% or more, 83% or more, 84% or more, 85% or more, 86% or more, 87% or more, 88% or more, 89% or more, 90% or more, 91% or more, 92% or more, 93% or more, 94% or more, 95% or more, 96% or more, 97% or more, 98% or more, 99% or more or 100% complementary to each other over a contiguous portion of nucleic acid sequence. A specific hybridization discriminates over non-specific hybridization interactions (e.g., two nucleic acids that a not configured to specifically hybridize, e.g., two nucleic acids that are 80% or less, 70% or less, 60% or less or 50% or less complementary) by about 2-fold or more, often about 10-fold or more, and sometimes about 100-fold or more, 1000-fold or more, 10,000-fold or more, 100,000-fold or more, or 1,000,000-fold or more. Two nucleic acid strands that are hybridized to each other can form a duplex which includes a double-stranded portion of nucleic acid. The phrase "stringent hybridization conditions" refers to conditions under which a primer will hybridize to its target subsequence, typically in a complex mixture of nucleic acids, but to no other sequences. Stringent conditions are sequence-dependent and will be different in different circumstances. Longer sequences hybridize specifically at higher temperatures. An extensive guide to the hybridization of nucleic acids is found in Tijssen, *Techniques in Biochemistry and Molecular Biology—Hybridization with Nucleic Probes*, "Overview of principles of hybridization and the strategy of nucleic acid assays" (1993). Generally, stringent conditions are selected to be about 5-10° C. lower than the thermal melting point ($T_m$) for the specific sequence at a defined ionic strength pH. The $T_m$ is the temperature (under defined ionic strength, pH, and nucleic concentration) at which 50% of the probes complementary to the target hybridize to the target sequence at equilibrium (as the target sequences are present in excess, at $T_m$, 50% of the probes are occupied at equilibrium). Stringent conditions may also be achieved with the addition of destabilizing agents such as formamide. For selective or specific hybridization, a positive signal is at least two times background, preferably 10 times background hybridization. Exemplary stringent hybridization conditions can be as following: 50% formamide, 5×SSC, and 1% SDS, incubating at 42° C., or, 5×SSC, 1% SDS, incubating at 65° C., with wash in 0.2×SSC, and 0.1% SDS at 65° C.

A nucleic acid can be amplified by a suitable method. The term "amplified" as used herein refers to subjecting a target nucleic acid in a sample to a process that linearly or exponentially generates amplicon nucleic acids having the same or substantially the same (e.g., substantially identical) nucleotide sequence as the target nucleic acid, or segment thereof, and/or a complement thereof. In some embodiments an amplification reaction includes a suitable thermal stable polymerase. Thermal stable polymerases are known in the art and are stable for prolonged periods of time, at temperature greater than 80° C. when compared to common polymerases found in most mammals. In certain embodiments the term "amplified" refers to a method that includes a polymerase chain reaction (PCR). Conditions conducive to amplification (i.e., amplification conditions) are known and often include at least a suitable polymerase, a suitable template, a suitable primer or set of primers, suitable nucleotides (e.g., dNTPs), a suitable buffer, and application of suitable annealing, hybridization and/or extension times and temperatures. In certain embodiments an amplified product (e.g., an amplicon) can contain one or more additional and/or different nucleotides than the template sequence, or portion thereof, from which the amplicon was generated (e.g., a primer can contain "extra" nucleotides (such as a 5' portion that does not hybridize to the template), or one or more mismatched bases within a hybridizing portion of the primer).

As used herein, bridge-PCR (bPCR) amplification is a method for solid-phase amplification as exemplified by the disclosures of U.S. Pat. Nos. 5,641,658; 7,115,400; and U.S. Patent Publ. No. 2008/0009420, each of which is incorporated herein by reference in its entirety. Bridge-PCR involves repeated polymerase chain reaction cycles, cycling between denaturation, annealing, and extension conditions and enables controlled, spatially-localized, amplification, to generate amplification products (e.g., amplicons) immobilized on a solid support in order to form arrays comprised of colonies (or "clusters") of immobilized nucleic acid molecule.

A nucleic acid can be amplified by a thermocycling method. In some embodiments, amplification takes place on a solid support (e.g., within a flow cell) where a nucleic acid, nucleic acid library or portion thereof is immobilized. In certain sequencing methods, a nucleic acid library is added to a flow cell and immobilized by hybridization to anchors under suitable conditions. This type of nucleic acid amplification is often referred to as solid phase amplification. In some embodiments of solid phase amplification, all or a portion of the amplified products are synthesized by an extension initiating from an immobilized primer. Solid phase amplification reactions are analogous to standard solution phase amplifications except that at least one of the amplification oligonucleotides (e.g., primers) is immobilized on a solid support.

In some embodiments solid phase amplification includes a nucleic acid amplification reaction including only one species of oligonucleotide primer immobilized to a surface or substrate. In certain embodiments solid phase amplification includes a plurality of different immobilized oligonucleotide primer species. In some embodiments solid phase amplification may include a nucleic acid amplification reaction including one species of oligonucleotide primer immobilized on a solid surface and a second different oligonucleotide primer species in solution. Multiple different species of immobilized or solution-based primers can be used. Non-limiting examples of solid phase nucleic acid amplification reactions include interfacial amplification, bridge amplification, emulsion PCR, WildFire amplification (e.g., US patent publication US20130012399), the like or combinations thereof.

Provided herein are methods and compositions for analyzing a sample (e.g., sequencing nucleic acids within a sample). A sample (e.g., a sample including nucleic acid) can be obtained from a suitable subject. A sample can be isolated or obtained directly from a subject or part thereof. In some embodiments, a sample is obtained indirectly from an individual or medical professional. A sample can be any specimen that is isolated or obtained from a subject or part thereof. A sample can be any specimen that is isolated or obtained from multiple subjects. Non-limiting examples of specimens include fluid or tissue from a subject, including, without limitation, blood or a blood product (e.g., serum, plasma, platelets, buffy coats, or the like), umbilical cord blood, chorionic villi, amniotic fluid, cerebrospinal fluid, spinal fluid, lavage fluid (e.g., lung, gastric, peritoneal, ductal, ear, arthroscopic), a biopsy sample, celocentesis sample, cells (blood cells, lymphocytes, placental cells, stem cells, bone marrow derived cells, embryo or fetal cells) or parts thereof (e.g., mitochondrial, nucleus, extracts, or the like), urine, feces, sputum, saliva, nasal mucous, prostate fluid, lavage, semen, lymphatic fluid, bile, tears, sweat, breast milk, breast fluid, the like or combinations thereof. A fluid or tissue sample from which nucleic acid is extracted may be acellular (e.g., cell-free). Non-limiting examples of tissues include organ tissues (e.g., liver, kidney, lung, thymus, adrenals, skin, bladder, reproductive organs, intestine, colon, spleen, brain, the like or parts thereof), epithelial tissue, hair, hair follicles, ducts, canals, bone, eye, nose, mouth, throat, ear, nails, the like, parts thereof or combinations thereof. A sample may include cells or tissues that are normal, healthy, diseased (e.g., infected), and/or cancerous (e.g., cancer cells). A sample obtained from a subject may include cells or cellular material (e.g., nucleic acids) of multiple organisms (e.g., virus nucleic acid, fetal nucleic acid, bacterial nucleic acid, parasite nucleic acid).

In some embodiments, a sample includes nucleic acid, or fragments thereof. A sample can include nucleic acids obtained from one or more subjects. In some embodiments a sample includes nucleic acid obtained from a single subject. In some embodiments, a sample includes a mixture of nucleic acids. A mixture of nucleic acids can include two or more nucleic acid species having different nucleotide sequences, different fragment lengths, different origins (e.g., genomic origins, cell or tissue origins, subject origins, the like or combinations thereof), or combinations thereof. A sample may include synthetic nucleic acid.

A subject can be any living or non-living organism, including but not limited to a human, non-human animal, plant, bacterium, fungus, virus or protist. A subject may be any age (e.g., an embryo, a fetus, infant, child, adult). A subject can be of any sex (e.g., male, female, or combination thereof). A subject may be pregnant. In some embodiments, a subject is a mammal. In some embodiments, a subject is a human subject. A subject can be a patient (e.g., a human patient). In some embodiments a subject is suspected of having a genetic variation or a disease or condition associated with a genetic variation.

Where a range of values is provided, it is understood that each intervening value, to the tenth of the unit of the lower limit unless the context clearly indicates otherwise, between the upper and lower limit of that range, and any other stated or unstated intervening value in, or smaller range of values within, that stated range is encompassed within the invention. The upper and lower limits of any such smaller range (within a more broadly recited range) may independently be included in the smaller ranges, or as particular values themselves, and are also encompassed within the invention, subject to any specifically excluded limit in the stated range. Where the stated range includes one or both of the limits, ranges excluding either or both of those included limits are also included in the invention.

"Synthetic" agents refer to non-naturally occurring agents, such as enzymes or nucleotides. The term "synthetic target" as used herein refers to a modified protein or nucleic acid such as those constructed by synthetic methods. In embodiments, a synthetic target is artificial or engineered, or derived from or contains an artificial or engineered protein or nucleic acid (e.g., non-natural or not wild type). For example, a polynucleotide that is inserted or removed such that it is not associated with nucleotide sequences that normally flank the polynucleotide as it is found in nature is a synthetic target polynucleotide.

"GC bias" describes the relationship between GC content and read coverage across a genome. For example, a genomic region of a higher GC content tends to have more (or less) sequencing reads covering that region. As described herein, GC bias can be introduced during amplification of library, cluster amplification, and/or the sequencing reactions.

The term "reaction vessel" is used in accordance with its ordinary meaning in chemistry or chemical engineering, and refers to a container having an inner volume in which a reaction takes place. In embodiments, the reaction vessel may be designed to provide suitable reaction conditions such as reaction volume, reaction temperature or pressure, and stirring or agitation, which may be adjusted to ensure that the reaction proceeds with a desired, sufficient or highest efficiency for producing a product from the chemical reaction. In embodiments, the reaction vessel is a container for liquid, gas or solid. In embodiments, the reaction vessel may include an inlet, an outlet, a reservoir and the like. In embodiments, the reaction vessel is connected to a pump (e.g., vacuum pump), a controller (e.g., CPU), or a monitoring device (e.g., UV detector or spectrophotometer). In embodiments, the reaction vessel is a flow cell. In embodiments, the reaction vessel is within a sequencing device.

As used herein, the term "kit" refers to any delivery system for delivering materials. In the context of reaction assays, such delivery systems include systems that allow for the storage, transport, or delivery of reaction reagents (e.g., oligonucleotides, enzymes, etc. in the appropriate containers) and/or supporting materials (e.g., packaging, buffers, written instructions for performing a method, etc.) from one location to another. For example, kits include one or more enclosures (e.g., boxes) containing the relevant reaction reagents and/or supporting materials. As used herein, the term "fragmented kit" refers to a delivery system including two or more separate containers that each contain a subportion of the total kit components. The containers may be delivered to the intended recipient together or separately. For example, a first container may contain an enzyme for use in an assay, while a second container contains oligonucleotides. In contrast, a "combined kit" refers to a delivery system containing all of the components of a reaction assay in a single container (e.g., in a single box housing each of the desired components). The term "kit" includes both fragmented and combined kits. In embodiments, the kit includes, without limitation, nucleic acid primers, probes, adapters, enzymes, and the like, and are each packaged in a container, such as, without limitation, a vial, tube or bottle, in a package suitable for commercial distribution, such as, without limitation, a box, a sealed pouch, a blister pack and a carton. The package typically contains a label or packaging insert indicating the uses of the packaged materials. As used herein, "packaging materials" includes any article used in the packaging for distribution of reagents in a kit, including without limitation containers, vials, tubes, bottles, pouches, blister packaging, labels, tags, instruction sheets and package inserts.

The methods and kits of the present disclosure may be applied, mutatis mutandis, to the sequencing of RNA, or to determining the identity of a ribonucleotide.

By aqueous solution herein is meant a liquid including at least 20 vol % water. In embodiments, aqueous solution includes at least 50%, for example at least 75 vol %, at least 95 vol %, above 98 vol %, or 100 vol % of water as the continuous phase.

The term "nucleic acid sequencing device" and the like means an integrated system of one or more chambers, ports, and channels that are interconnected and in fluid communication and designed for carrying out an analytical reaction or process, either alone or in cooperation with an appliance or instrument that provides support functions, such as sample introduction, fluid and/or reagent driving means, temperature control, detection systems, data collection and/or integration systems, for the purpose of determining the nucleic acid sequence of a template polynucleotide. Nucleic acid sequencing devices may further include valves, pumps, and specialized functional coatings on interior walls. Nucleic acid sequencing devices may include a receiving unit, or platen, that orients the flow cell such that a maximal surface area of the flow cell is available to be exposed to an optical lens. Other nucleic acid sequencing devices include those provided by Singular Genomics™ such as the G4™ sequencing platform, Illumina™, Inc. (e.g., HiSeq™, MiSeq™, NextSeq™, or NovaSeq™ systems), Life Technologies™ (e.g., ABI PRISM™, or SOLiD™ systems), Pacific Biosciences (e.g., systems using SMRT™ Technology such as the Sequel™ or RS II™ systems), or Qiagen (e.g., Genereader™ system).

As used herein, a "plurality" refers to two or more.

As used herein the terms "automated" and "semi-automated" mean that the operations are performed by system programming or configuration with little or no human interaction once the operations are initiated, or once processes including the operations are initiated.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

II. Methods

In an aspect is provided a method for solid-phase nucleic acid amplification. In embodiments, the methods described herein provide detectable amplification products (e.g., detectable by Quantitative PCR (qPCR) or nucleic acid sequencing). In embodiments, the methods described herein generate amplification products (e.g., amplicons) immobilized on a solid support thereby forming arrays comprised of colonies. In embodiments, the amplification product is provided in a clustered array. In embodiments, the clustered array includes a plurality of double-stranded amplification products localized to discrete sites on a solid support. In embodiments, the solid support is a bead. In embodiments, the solid support is substantially planar. In embodiments, the solid support is contained within a flow cell. In embodiments, the solid support is a multiwell container.

In embodiments, the method includes generating a complement template polynucleotide (e.g., an immobilized template polynucleotide and an immobilized complementary template polynucleotide) including (a) annealing a template polynucleotide to a first immobilized primer on a solid support at a first temperature, wherein the first immobilized primer is complementary to a sequence of the template polynucleotide; (b) extending the first primer with a polymerase to generate a complement template polynucleotide; (c) contacting the complement template polynucleotide and the template polynucleotide with a chemical denaturant at a second temperature thereby separating the complement template polynucleotide from the template polynucleotide; (d) removing the denaturant and annealing a complement template polynucleotide to a second immobilized primer on the solid support at the first temperature, wherein the second immobilized primer is complementary to a sequence of the complement template polynucleotide and wherein the second temperature is higher than the first temperature; and (e) extending the second immobilized primer with the polymerase to generate a template polynucleotide (e.g., an immobilized template polynucleotide). In embodiments, the method includes repeating steps (a)-(e) to amplify the polynucleotides. In embodiments, the method includes cycling between a first temperature and a second temperature, wherein the difference between the first temperature and the second temperature is no greater than 20° C. In embodiments, the method includes cycling between a first temperature and a second temperature, wherein the difference between the first temperature and the second temperature is no greater than 19° C. In embodiments, the method includes cycling between a first temperature and a second temperature, wherein the difference between the first temperature and the second temperature is no greater than 18° C. In embodiments, the method includes cycling between a first temperature and a second temperature, wherein the difference between the first temperature and the second temperature is no greater than 16° C. In embodiments, the method includes cycling between a first temperature and a second temperature, wherein the difference between the first temperature and the second temperature is 10° C. to 18° C. In embodiments, the method includes cycling between a first temperature and a second temperature, wherein the difference between the first temperature and the second temperature is 12° C. to 18° C. In embodiments, the method includes cycling between a first temperature and a second temperature, wherein the difference between the first temperature and the second temperature is 18° C. In embodiments, the method includes cycling between a first temperature and a second temperature, wherein the difference between the first temperature and the second temperature is 19° C. In embodiments, the method includes cycling between a first temperature and a second temperature, wherein the difference between the first temperature and the second temperature is 1° C. to 19° C. In embodiments, the method includes cycling between a first temperature and a second temperature, wherein the difference between the first temperature and the second temperature is 10° C. to 19° C. In embodiments, the method includes cycling between a first temperature and a second temperature, wherein the difference between the first temperature and the second temperature is 12° C. to 18° C.

In embodiments, the method includes generating a complement template polynucleotide (e.g., an immobilized template polynucleotide and an immobilized complementary template polynucleotide) including: (a) annealing a template polynucleotide to a first immobilized primer on a solid support at a first temperature, wherein the first immobilized primer is complementary to a sequence of the template polynucleotide, wherein the first temperature is about 25° C. to about 45° C.; (b) extending the first primer with a polymerase to generate a complement template polynucleotide; (c) contacting the complement template polynucleotide and the template polynucleotide with a chemical denaturant at a second temperature thereby separating the complement template polynucleotide from the template polynucleotide, wherein the second temperature is greater than the first temperature by 12° C. to 18° C.; (d) removing the denaturant and annealing a complement template polynucleotide to a second immobilized primer on the solid support at the first temperature, wherein the second immobilized primer is complementary to a sequence of the complement template polynucleotide; and (e) extending the second immobilized primer with the polymerase to generate a template polynucleotide (e.g., an immobilized template polynucleotide).

In embodiments, annealing the polynucleotides (e.g., the template and/or the complement template polynucleotide) to the immobilized primer occurs under suitable hybridization conditions (e.g., saline-sodium citrate (SSC) buffer (pH 7.0), is commonly used in nucleic acid hybridization techniques at concentrations from 0.1× to 20×. For example, annealing may occur in the presence of an annealing solution as described herein. For example, the annealing solution may include 40% (v/v) formamide, 5×SSC, 5×Denhardt's solution, 0.1% (w/v) SDS, and dextran sulfate.

In an aspect is provided a method for amplifying a polynucleotide, the method including (a) annealing a template polynucleotide to a first immobilized primer on a solid support at a first temperature, wherein the first immobilized primer is complementary to a sequence of the template polynucleotide; (b) extending the first primer with a polymerase to generate a complement template polynucleotide; (c) contacting the complement template polynucleotide and the template polynucleotide with a chemical denaturant at a second temperature thereby separating the complement template polynucleotide from the template polynucleotide; (d) removing the denaturant and annealing a complement template polynucleotide to a second immobilized primer on the solid support at the first temperature, wherein the second immobilized primer is complementary to a sequence of the complement template polynucleotide and wherein the second temperature is higher than the first temperature; and (e) extending the second immobilized primer with the polymerase to generate a template polynucleotide (e.g., an immobilized template polynucleotide), wherein the first temperature and the second temperature are different by about 5° C. to about 20° C. In embodiments, the second temperature is between 12° C. to 20° C. (i.e., the second temperature is at least 12.1° C. or 19.9° C.) higher than the first temperature.

In embodiments, the first primer is covalently attached to the solid support via a first linker and the second primer is covalently attached to the solid support via a second linker. The linker tethering the polynucleotides may be any linker capable of localizing nucleic acids to arrays. The linkers may be the same, or the linkers may be different. Solid-supported molecular arrays have been generated previously in a variety of ways, for example, the attachment of biomolecules (e.g., proteins and nucleic acids) to a variety of substrates (e.g., glass, plastics, or metals) underpins modern microarray and biosensor technologies employed for genotyping, gene expression analysis and biological detection. Silica-based substrates are often employed as supports on which molecular arrays are constructed, and functionalized silanes are commonly used to modify glass to permit a click-chemistry enabled linker to tether the biomolecule. In embodiments, the solid support includes a polymer coating wherein the immobilized primers are covalently linked to the polymer. In embodiments, the immobilized primers include primer binding sequences (i.e., regions of complementarity for a primer) which enable specific annealing of primers when the template polynucleotides are in used in the solid-phase amplification reaction.

In embodiments, extending the first primer occurs at the first temperature. In embodiments, the first temperature ranges from about 25° C. to about 45° C. In embodiments, the first temperature ranges from about 40° C. to about 45° C. In embodiments, the first temperature is about 25° C. to about 45° C. In embodiments, the first temperature is about 40° C. to about 45° C. In embodiments, the first temperature is 30° C., 31° C., 32° C., 33° C., 34° C., 35° C., 36° C., 37° C., 38° C., 39° C., 40° C., 41° C., 42° C., 43° C., 44° C., or 45° C. In embodiments, the first temperature is 40° C., 41° C., 42° C., 43° C., 44° C., or 45° C. In embodiments, the first temperature is 40° C. In embodiments, the first temperature is 41° C. In embodiments, the first temperature is 42° C. In embodiments, the first temperature is 43° C. In embodiments, the first temperature is 44° C. In embodiments, the first temperature is 45° C.

In embodiments, extending the first primer occurs at the second temperature. In embodiments, the second temperature ranges from about 45° C. to about 70° C. In embodiments, the second temperature ranges from about 55° C. to about 62° C. In embodiments, the second temperature ranges from about 45° C. to about 70° C. In embodiments, the second temperature ranges from about 55° C. to about 62° C. In embodiments, the second temperature is about 55° C., 56° C., 57° C., 58° C., 59° C., 60° C., 61° C., 62° C., 63° C., 64° C., or about 65° C. In embodiments, the first temperature and the second temperature differ by about 5° C. In embodiments, the first temperature and the second temperature differ by about 10° C. In embodiments, the first temperature and the second temperature differ by about 15° C. In embodiments, the first temperature and the second temperature differ by about 20° C. In embodiments, the first temperature and the second temperature differ by about 25° C. In embodiments, the first temperature and the second temperature differ by 5° C. In embodiments, the first temperature and the second temperature differ by 10° C. In embodiments, the first temperature and the second temperature differ by 15° C. In embodiments, the first temperature and the second temperature differ by 20° C. In embodiments, the first temperature and the second temperature differ by 25° C. In embodiments, the first temperature and the second temperature differ by no greater than 25° C. In embodiments, the first temperature and the second temperature differ by no greater than 20° C. In embodiments, the first temperature and the second temperature differ by no greater than 19° C. In embodiments, the first temperature and the second temperature differ by no greater than 18° C. In embodiments, the first temperature and the second temperature differ 12-18° C.

In embodiments, extending the first primer occurs at a temperature between the first temperature and the second temperature. In embodiments, extending the first primer occurs at a third temperature, $T_{12}$, wherein $T_{12}$ is between the first temperature and the second temperature. In embodiments, $T_{12}$ is a transition temperature, i.e., the reaction is not maintained at that temperature for a significant amount of time (e.g., less than 1 min, less than 10 seconds). In embodiments, the increase from the first temperature to the second temperature occurs at a controlled rate (i.e., or ΔT/Δt). For example, temperature may be increased at a rate of about 0.1° C./s to about 5° C./s. In embodiments, temperature may be increased at a rate of about 0.2° C./s. In embodiments, temperature may be increased at a rate of about 0.3° C./s. In embodiments, temperature may be increased at a rate of about 0.4° C./s. In embodiments, temperature may be increased at a rate of about 0.5° C./s. In embodiments, temperature may be increased at a rate of about 0.5° C./s. In embodiments, temperature may be increased at a rate of about 0.75° C./s. In embodiments, temperature may be increased at a rate of about 1° C./s. In embodiments, temperature may be increased at a rate of about 1.25° C./s. In embodiments, temperature may be increased at a rate of about 1.5° C./s. In embodiments, temperature may be increased at a rate of about 1.75° C./s. In embodiments, temperature may be increased at a rate of about 2° C./s. In embodiments, temperature may be increased at a rate of about 2.25° C./s. In embodiments, temperature may be increased at a rate of about 2.5° C./s. In embodiments, temperature may be increased at a rate of about 2.75° C./s. In embodiments, temperature may be increased at a rate of about 3° C./s. In embodiments, temperature may be increased at a rate of about 3.25° C./s. In embodiments, temperature may be increased at a rate of about 3.5° C./s. In embodiments, temperature may be increased at a rate of about 3.75° C./s. In embodiments, temperature may be increased at a rate of about 4° C./s. In embodiments, temperature may be increased at a rate of about 4.25° C./s. In embodiments, temperature may be increased at a rate of about 4.5° C./s. In embodiments, temperature may be increased at a rate of about 4.75° C./s.

In embodiments, extending the first primer includes incorporating one or more nucleotides (e.g., dNTPs) using a polymerase (e.g., Bst large fragment (Bst LF) polymerase, Bst2.0 polymerase, Bsu polymerase, SD polymerase, Vent exo-polymerase, Phi29 polymerase, or a mutant thereof). In embodiments, the polymerase is a strand-displacing polymerase. In embodiments, the strand-displacing polymerase is Bst large fragment (Bst LF) polymerase, Bst 3.0 polymerase, Bst2.0 polymerase, Bsu polymerase, SD polymerase, Vent exo-polymerase, Phi29 polymerase, or a mutant thereof. In embodiments, the polymerase is Bst DNA Polymerase, Vent (exo-) DNA Polymerase, Pfu DNA polymerase, Taq polymerase, Phusion High-Fidelity DNA Polymerase, Q5 High-Fidelity DNA Polymerase, or mutant of any one of the foregoing. In embodiments, the polymerase is Bst DNA Polymerase, Vent (exo-) DNA Polymerase, Phusion High-Fidelity DNA Polymerase, or Q5 High-Fidelity DNA Polymerase. In embodiments, the polymerase is a *Pyrococcus polymerase* (e.g., a polymerase described in WO 2018/148723 or WO 2020/056044, each of which are incorporated herein by reference for all purposes). In embodiments, the polymerase is a Bst DNA polymerase (e.g., exonuclease minus Bst), phi29 DNA polymerase, large fragment of Bsu DNA polymerase, and Bca (exo-) DNA polymerase, Klenow fragment of *E. coli* DNA polymerase, T5 polymerase, M-MuLV reverse transcriptase, HIV viral reverse transcriptase, or Deep Vent DNA polymerase. In embodiments, the polymerase is a phi29 DNA polymerase wild type phi29 DNA polymerase (e.g., MagniPhi from Expedeon), or variant EquiPhi29 DNA polymerase (e.g., from Thermo Fisher Scientific), or chimeric QualiPhi DNA polymerase (e.g., from 4basebio).

In embodiments, the method further includes contacting the complement template polynucleotide and the template polynucleotide with a denaturant at a temperature between the second temperature and the first temperature. In embodiments, contacting the complement template polynucleotide and the template polynucleotide with a denaturant at a fourth temperature, $T_{21}$, wherein $T_{21}$ is a temperature between the second temperature and the second temperature. In embodiments, $T_{21}$ is a transition temperature, i.e., the reaction is not maintained at that temperature for a significant amount of time (e.g., less than 1 min, less than 10 seconds). In embodiments, the decrease from the second temperature to the first temperature occurs at a controlled rate (i.e., or ΔT/Δt). For example, temperature may be decreased at a rate of about 0.1° C./s to about 5° C./s. In embodiments, temperature may be decreased at a rate of about 0.2° C./s. In embodiments, temperature may be decreased at a rate of about 0.3° C./s. In embodiments, temperature may be decreased at a rate of about 0.4° C./s. In embodiments, temperature may be decreased at a rate of about 0.5° C./s. In embodiments, temperature may be decreased at a rate of about 0.5° C./s. In embodiments, temperature may be decreased at a rate of about 0.75° C./s. In embodiments, temperature may be decreased at a rate of about 1° C./s. In embodiments, temperature may be decreased at a rate of about 1.25° C./s. In embodiments, temperature may be decreased at a rate of about 1.5° C./s. In embodiments, temperature may be decreased at a rate of about 1.75° C./s. In embodiments, temperature may be decreased at a rate of about 2° C./s. In embodiments, temperature may be decreased at a rate of about 2.25° C./s. In embodiments, temperature may be decreased at a rate of about 2.5° C./s. In embodiments, temperature may be decreased at a rate of about 2.75° C./s. In embodiments, temperature may be decreased at a rate of about 3° C./s. In embodiments, temperature may be decreased at a rate of about 3.25° C./s. In embodiments, temperature may be decreased at a rate of about 3.5° C./s. In embodiments, temperature may be decreased at a rate of about 3.75° C./s. In embodiments, temperature may be decreased at a rate of about 4° C./s. In embodiments, temperature may be decreased at a rate of about 4.25° C./s. In embodiments, temperature may be decreased at a rate of about 4.5° C./s. In embodiments, temperature may be decreased at a rate of about 4.75° C./s. In embodiments, the change in temperature occurs over 5-15 seconds, or about 15-30 seconds, or about 30-45 seconds, or about 45-60 seconds, or longer. In embodiments, the change in temperature occurs over 30-45 seconds, or about 45-60 seconds, or about 60-75 seconds, or about 75-90 seconds, or longer.

In embodiments, the method further includes prior to step a) contacting the solid support with a sample including a template polynucleotide (e.g., a template polynucleotide as described herein). In embodiments, one or more initial steps are different from the remaining steps of the method. For example, the initial denaturation step is maintained at different conditions from the remaining denaturation step. In embodiments, the initial extension step is maintained at different conditions from the remaining extension steps. In embodiments, the initial extension includes an initial extension solution that is different from the remaining extension solutions. In embodiments, the initial extension solution includes $MgCl_2$, SD polymerase, dNTPs, and betaine.

In embodiments, the method further includes repeating steps (a) to (e), thereby amplifying the template polynucleotide to generate amplification products. In embodiments, amplifying includes a plurality of cycles of strand denaturation, primer hybridization, and primer extension. In embodiments, amplifying includes a plurality of cycles of strand denaturation, primer hybridization, and primer extension. Although each cycle will include each of these three events (denaturation, hybridization, and extension), events within a cycle may or may not be discrete. For example, each step may have different reagents and/or reaction conditions (e.g., temperatures). Alternatively, some steps may proceed without a change in reaction conditions. For example, extension may proceed under the same conditions (e.g., same temperature) as hybridization. After extension, the conditions are changed to start a new cycle with a new denaturation step, thereby amplifying the amplicons. Primer extension products from an earlier cycle may serve as templates for a later amplification cycle. In embodiments, the plurality of cycles is about 5 to about 50 cycles. In embodiments, the plurality of cycles is about 10 to about 45 cycles. In embodiments, the plurality of cycles is about 10 to about 20 cycles. In embodiments, the plurality of cycles is about 20 to about 30 cycles. In embodiments, the plurality of cycles is 10 to 45 cycles. In embodiments, the plurality of cycles is 10 to 20 cycles. In embodiments, the plurality of cycles is 20 to 30 cycles. In embodiments, the plurality of cycles is about 10 to about 45 cycles. In embodiments, the plurality of cycles is about 20 to about 30 cycles.

In embodiments, annealing is performed in the presence of an annealing solution. In embodiments, the annealing solution includes a buffered solution including salts (e.g., NaCl or KCl), a surfactant (e.g., Triton X-100 or Tween-20), and, optionally, a chelator. In embodiments, the annealing solution has a pH of about 7.5, 8.0, 8.2, 8.4, 8.6, 8.8, or 9.0. In embodiments, the annealing solution includes NaCl or KCl, Tris (e.g., pH 8.0), Triton X-100, and a chelator (e.g., EDTA). In embodiments, the annealing solution includes NaCl, Tris (e.g., pH 8.5), Triton X-100, and a chelator (e.g., EDTA). In embodiments, the annealing solution includes NaCl, Tris (e.g., pH 8.8), Triton X-100, and a chelator (e.g., EDTA). In embodiments, the annealing solution includes NaCl, Tris (e.g., pH 8.5), Tween-20, and a chelator (e.g., EDTA). In embodiments, the annealing solution includes NaCl, Tris (e.g., pH 8.8), Tween-20, and a chelator (e.g., EDTA). In embodiments, the annealing solution includes 3 M NaCl, 0.1 M Tris-HCl (pH 6.8), 0.1 M NaPO$_4$ buffer (pH 6.8), and 50 mM EDTA. In embodiments, the annealing solution includes formamide. In embodiments, the annealing solution includes dextran sulfate. In embodiments, the annealing solution includes 140 mM HEPES, pH 8,0, containing 1% SDS, 1.7 M NaCl, 7×Denhardt's solution, 0.2 mM EDTA, and 3% PEG. In embodiments, the annealing solution includes acetonitrile at 25-50% by volume, formamide at 5-10% by volume; 2-(N-morpholino)ethanesulfonic acid (MES); and polyethylene glycol (PEG) at 5-35%. In some embodiments, the annealing solution further includes betaine.

In embodiments, extending is performed in the presence of an extension solution. In embodiments, the extension solution includes a buffered solution including salts (e.g., NaCl or KCl), a surfactant (e.g., Triton X-100 or Tween-20), and a chelator. In embodiments, the extension solution includes nucleotides and a polymerase (e.g., a polymerase as described herein). In embodiments, the polymerase is a strand-displacing polymerase as described herein. In embodiments, the extension solution includes about 0.5, about 1, about 2, about 3, about 4, about 5, about 6, about 7, about 8, about 9, about 10, about 11, about 12, about 13, about 14, or about 15 mM Mg$^{2+}$. In embodiments, the extension solution includes a dNTP mixture including dATP, dCTP, dGTP and dTTP (for DNA amplification) or dATP, dCTP, dGTP and dUTP (for RNA amplification). In embodiments, the extension solution has a pH of about 7.5, 8.0, 8.2, 8.4, 8.6, 8.8, or 9.0. In embodiments, the extension solution includes Tris-HCl (e.g., pH 8.0), salt (e.g, NaCl or KCl), MgSO4, a surfactant (e.g., Tween-20 or Triton X-100), dNTPs, BstLF, betaine (e.g., between about 0 to about 3.5M betaine), and/or DMSO (e.g., between about 0% to about 12% DMSO). In embodiments, the extension solution includes bicine (e.g., pH 8.5), salt (e.g., NaCl or KCl), MgSO4, a surfactant (e.g., Tween-20 or Triton X-100), dNTPs, BstLF, (e.g., between about 0 to about 3.5M betaine), and/or DMSO (e.g., between about 0% to about 12% DMSO).

In embodiments, the annealing solution and/or the extension solution includes a buffer such as, phosphate buffered saline (PBS), succinate, citrate, histidine, acetate, Tris, TAPS, MOPS, PIPES, HEPES, MES, and the like. The choice of appropriate buffer will generally be dependent on the target pH of the annealing solution and/or the extension solution. In general, the desired pH of the buffer solution will range from about pH 4 to about pH 8.4. In some embodiments, the buffer pH may be at least 4.0, at least 4.5, at least 5.0, at least 5.5, at least 6.0, at least 6.2, at least 6.4, at least 6.6, at least 6.8, at least 7.0, at least 7.2, at least 7.4, at least 7.6, at least 7.8, at least 8.0, at least 8.2, or at least 8.4. In some embodiments, the buffer pH may be at most 8.4, at most 8.2, at most 8.0, at most 7.8, at most 7.6, at most 7.4, at most 7.2, at most 7.0, at most 6.8, at most 6.6, at most 6.4, at most 6.2, at most 6.0, at most 5.5, at most 5.0, at most 4.5, or at most 4.0. Any of the lower and upper values described in this paragraph may be combined to form a range included within the present disclosure, for example, in some instances, the desired pH may range from about 6.4 to about 7.2. Those of skill in the art will recognize that the buffer pH may have any value within this range, for example, about 7.25.

Suitable detergents for use in the annealing solution and/or the extension solution include, but are not limited to, zwitterionic detergents (e.g., 1-Dodecanoyl-sn-glycero-3-phosphocholine, 3-(4-tert-Butyl-1-pyridinio)-1-propane-sulfonate, 3-(N,N-Dimethylmyristylammonio)propane-sulfonate, 3-(N,NDimethylmyristylammonio) propanesulfonate, ASB-C80, C7BzO, CHAPS, CHAPS hydrate, CHAPSO, DDMAB, Dimethylethylammonium-propane sulfonate, N,N-Dimethyldodecylamine Noxide, N-Dodecyl-N,N-dimethyl-3-ammonio-1-propanesulfonate, or N-Dodecyl-N,N-dimethyl ammonio-1-propanesulfonate) and anionic, cationic, and non-ionic detergents. Examples of nonionic detergents include poly(oxyethylene) ethers and related polymers (e.g. Brij®, TWEEN®, TWEEN®-20, TRITON®, TRITON X-100 and IGEPAL® CA-630), bile salts, and glycosidic detergents. In embodiments, the annealing solution and/or the extension solution include antioxidants and reducing agents, carbohydrates, BSA, polyethylene glycol, dextran sulfate, betaine, other additives.

In embodiments, the chemical denaturant includes formamide, ethylene glycol, sodium hydroxide, or a mixture thereof. In embodiments, the chemical denaturant includes formamide, ethylene glycol, or sodium hydroxide. In embodiments, the chemical denaturant includes formamide. In embodiments, the chemical denaturant is pure formamide. In embodiments, the denaturant is acetic acid, ethylene glycol, hydrochloric acid, nitric acid, formamide, guanidine, sodium salicylate, sodium hydroxide, dimethyl sulfoxide (DMSO), propylene glycol, urea, or a mixture thereof. In embodiments, the denaturant is an additive that lowers a DNA denaturation temperature. In embodiments, the denaturant is betaine, dimethyl sulfoxide (DMSO), ethylene glycol, formamide, glycerol, guanidine thiocyanate, 4-methylmorpholine 4-oxide (NMO), or a mixture thereof. In embodiments, the denaturant is betaine, dimethyl sulfoxide (DMSO), ethylene glycol, formamide, glycerol, guanidine thiocyanate, or 4-methylmorpholine 4-oxide (NMO). In embodiments, the denaturant is betaine. In embodiments, the denaturant is dimethyl sulfoxide (DMSO). In embodiments, the denaturant is ethylene glycol. In embodiments, the denaturant is formamide. In embodiments, the denaturant is glycerol. In embodiments, the denaturant is guanidine thiocyanate. In embodiments, the denaturant is 4-methylmorpholine 4-oxide (NMO). In embodiments, the denaturant is betaine, dimethyl sulfoxide (DMSO), ethylene glycol, formamide, glycerol, guanidine thiocyanate, or 4-methylmorpholine 4-oxide (NMO). In embodiments, the denaturant includes an organic diol (e.g., 1,3 propanediol, 1,2-butanediol, 1,3-butanediol, 1,6-hexanediol, 1,2-hexanediol, 2-methyl-2,4-pentanediol), for example 0.01M to about 2.5M organic diol. In embodiments, the denaturant is ethylene glycol, polyethylene glycol, 1,2-propanediol, dimethyl sulfoxide (DMSO), glycerol, formamide, 7-deaza-dGTP, acetamide, betaine or tetramethylammonium chloride (TMAC). The addition of chemical denaturants such as betaine, DMSO, and formamide can be helpful when amplifying GC-rich templates and templates that form strong secondary structures, which can cause DNA polymerases to stall. For example, DMSO and formamide independently are understood to interfere with the formation of hydrogen bonds between the two DNA strands.

In embodiments, the denaturant includes additives such as ethylene glycol, polyethylene glycol, 1,2-propanediol, dimethyl sulfoxide (DMSO), glycerol, formamide, 7-deaza-dGTP, acetamide, betaine, or tetramethylammonium chloride (TMAC). In embodiments, the denaturant is a buffered solution including about 0% to about 50% dimethyl sulfoxide (DMSO); about 0% to about 50% ethylene glycol; about 0% to about 20% formamide; or about 0 to about 3.5M betaine, or a mixture thereof. In embodiments, the denaturant is a buffered solution including about 50% to about 100% formamide. In embodiments, the denaturant is a buffered solution including about 100% formamide. In embodiments, the denaturant is a buffered solution including 100% formamide.

In embodiments, the denaturant includes ethylene glycol. Ethylene glycol destabilizes duplex DNA, and the melting point of DNA decreases by about 0.5° C. for each 1% (vol/vol) concentration of glycerol or ethylene glycol. The denaturation temperature may be finely tuned according to the concentration of denaturants.

In embodiments, the denaturant, the extension solution, and/or the annealing solution includes one or more crowding agents. In embodiments, the crowding agent is poly(ethylene glycol) (e.g., PEG 200, PEG 600, PEG 800, PEG 2,050, PEG 4,600, PEG 6,000, PEG 8,000, PEG 10,000, PEG 20,000, or PEG 35,000). In embodiments, PEG is present in the denaturant at a concentration of 1% to 25%. In embodiments, PEG is present in the denaturant at a concentration of about 1%, about 5%, about 10%, about 15%, about 20%, or about 25%.

In embodiments, each transition between a different solution includes applying oxygen (e.g., air) to the solid support. In embodiments, the method further includes applying oxygen to the solid support prior to removing the denaturant. In embodiments, the method further includes applying air to the solid support prior to removing the denaturant. In embodiments, one or more pulses of air are provided to the solid support. In embodiments, each transition between a different solution includes flushing out the solution. In embodiments, each transition between a different solution includes flushing out the solution and applying oxygen (e.g., air) to the solid support.

In embodiments, removing the denaturant includes application of a wash solution. In embodiments, at least one washing step can be conducted after any of steps described herein. In embodiments, the wash solution is at a pH from pH 7.5 to pH 9.0. In embodiments, the wash solution includes a chelator. In embodiments, the wash solution includes a surfactant. In embodiments, the wash includes Tris-HCl, pH 8.5, containing SDS, EDTA, and NaCl. The wash solution can include SSC (e.g., at any concentration of about 1-5×) and a detergent (e.g., Tween-20 or Triton X-100).

In embodiments, the wash solution includes Tris, Tris-HCl, Tricine, Bicine, Bis-Tris propane, HEPES, MES, MOPS, MOPSO, BES, TES, CAPS, TAPS, TAPSO, ACES, PIPES, ethanolamine (2-amino methanol; MEA), a citrate compound, a citrate mixture, NaOH and/or KOH. In embodiments, the pH buffering agent can be present in the wash solution at a concentration of about 1-100 mM, or about 10-50 mM, or about 10-25 mM. In embodiments, the pH of solutions described here in can be adjusted to a pH of about 4-9, or a pH of about 5-9, or a pH of about 5-8.

In embodiments, the metal chelating agent (i.e., a chelator) in the wash solution includes EDTA (ethylenediaminetetraacetic acid), EGTA (ethylene glycol tetraacetic acid), HEDTA (hydroxyethylethylenediaminetriacetic acid), DPTA (diethylene triamine pentaacetic acid), NTA (N,N-bis(carboxymethyl)glycine), citrate anhydrous, sodium citrate, calcium citrate, ammonium citrate, ammonium bicitrate, citric acid, potassium citrate, or magnesium citrate. In some embodiments, the wash solution includes a chelating agent at a concentration of about 0.01-50 mM, or about 0.1-20 mM, or about 0.2-10 mM.

In some embodiments, the salt in the wash solution includes NaCl, KCl, $NH_2SO_4$ or potassium glutamate. In some embodiments, the detergent includes an ionic detergent such as SDS (sodium dodecyl sulfate). The wash solution can include a monovalent salt at a concentration of about 25-500 mM, or about 50-250 mM, or about 100-200 mM. In embodiments, the detergent in the wash solution includes a non-ionic detergent such as Triton X-100, Tween 20, Tween 80 or Nonidet P-40. In embodiments, the detergent includes a zwitterionic detergent such as CHAPS (3-[(3-cholamidopropyl)dimethylammonio]-1-propanesulfonate) or N-Dodecyl-N,N-dimethyl-3-amonio-1-propanesulfate (DetX). In some embodiments, the detergent comprises LDS (lithium dodecyl sulfate), sodium taurodeoxycholate, sodium taurocholate, sodium glycocholate, sodium deoxycholate or sodium cholate. In some embodiments, the detergent is included in the wash solution at a concentration of about 0.01-0.05%, or about 0.05-0.1%, or about 0.1-0.15%, or about 0.15-0.2%, or about 0.2-0.25%. In embodiments, the wash solution includes SSC (e.g., at any concentration of about 1-5×) and a detergent (e.g., Tween-20 or Triton X-100).

In embodiments, the solid support includes a plurality of immobilized oligonucleotides (e.g., immobilized primers, such as immobilized forward and immobilized reverse primers) attached to the solid support via a linker. In embodiments, the first and second polynucleotides are covalently attached to the solid support. In embodiments, the 5' end of the first and second polynucleotides contains a functional group that serves to tether the first and second polynucleotides to the solid support (e.g., a bioconjugate linker).

Non-limiting examples of covalent attachment include amine-modified polynucleotides reacting with epoxy or isothiocyanate groups on the solid support, succinylated polynucleotides reacting with aminophenyl or aminopropyl functional groups on the solid support, dibenzocycloctyne-modified polynucleotides reacting with azide functional groups on the solid support (or vice versa), trans-cyclooctyne-modified polynucleotides reacting with tetrazine or methyl tetrazine groups on the solid support (or vice versa), disulfide modified polynucleotides reacting with mercapto-functional groups on the solid support, amine-functionalized polynucleotides reacting with carboxylic acid groups on the core via 1-ethyl-3-(3-dimethylaminopropyl)-carbodiimide hydrochloride (EDC) chemistry, thiol-modified polynucleotides attaching to a solid support via a disulfide bond or maleimide linkage, alkyne-modified polynucleotides attaching to a solid support via copper-catalyzed click reactions to azide functional groups on the solid support, and acrydite-modified polynucleotides polymerizing with free acrylic acid monomers on the solid support to form polyacrylamide or reacting with thiol groups on the solid support. In embodiments, the primer is attached to the solid support polymer through electrostatic binding. For example, the negatively charged phosphate backbone of the primer may be bound electrostatically to positively charged monomers in the solid support.

In embodiments, the solid support (alternatively referred to as a substrate) includes a glass surface including a polymer coating. In embodiments, the substrate is glass or quartz, such as a microscope slide, having a surface that is uniformly silanized. This may be accomplished using conventional protocols, such as those described in Beattie et al (1995), Molecular Biotechnology, 4: 213. Such a surface is readily treated to permit end-attachment of oligonucleotides (e.g., forward and reverse primers) prior to amplification. In embodiments the substrate surface further includes a polymer coating, which contains functional groups capable of immobilizing primers. In some embodiments, the substrate includes a patterned surface suitable for immobilization of primers in an ordered pattern. A patterned surface refers to an arrangement of different regions in or on an exposed layer of a substrate. For example, one or more of the regions can be features where one or more primers are present. The features can be separated by interstitial regions where capture primers are not present. In some embodiments, the pattern can be an x-y format of features that are in rows and columns. In some embodiments, the pattern can be a repeating arrangement of features and/or interstitial regions. In some embodiments, the pattern can be a random arrangement of features and/or interstitial regions. In some embodiments, the primers are randomly distributed upon the substrate (e.g., forming an unpatterned array). In some embodiments, the primers are distributed on a patterned surface. In embodiments, the solid support includes a particle having a surface that includes a polymer coating. In embodiments, the immobilized primers are immobilized to the polymer coated particle. In embodiments, the polymer coated particles are themselves immobilized on a planar substrate. In embodiments, the solid support includes a discrete particle. In embodiments, the solid support includes a nanoparticle.

In embodiments, the solid support is a multiwell container including a plurality of wells, each well including a polymer as described herein. In embodiments, the polymer includes polymerized units of polyacrylamide (AAm), poly-N-isopropylacrylamide, poly N-isopropylpolyacrylamide, sulfobetaine acrylate (SBA), carboxybetaine acrylate (CBA), phosphorylcholine acrylate (PCA), sulfobetaine methacrylate (SBMA), carboxybetaine methacrylate (CBMA), phosphorylcholine methacrylate (PCMA), polyethylene glycol acrylate, methacrylate, polyethylene glycol (PEG)-thiol/PEG-acrylate, acrylamide/N,N'-bis(acryloyl)cystamine (BACy), PEG/polypropylene oxide (PPO), polyacrylic acid, poly(hydroxyethyl methacrylate) (PHEMA), poly(methyl methacrylate) (PMMA), poly(N-isopropylacrylamide) (PNIPAAm), poly(lactic acid) (PLA), poly(lactic-co-glycolic acid) (PLGA), polycaprolactone (PCL), poly(vinylsulfonic acid) (PVSA), poly(L-aspartic acid), poly(L-glutamic acid), polylysine, agar, agarose, alginate, heparin, alginate sulfate, dextran sulfate, hyaluronan, pectin, carrageenan, gelatin, chitosan, cellulose, collagen, glicydyl methacrylate (GMA), glicydyl methacrylate (GMA) azide, hydroxyethylmethacrylate (HEMA), hydroxyethylacrylate (HEA), hydroxypropylmethacrylate (HPMA), polyethylene glycol methacrylate (PEGMA), polyethylene glycol acrylate (PEGA), isocyanatoethyl methacrylate (IEM), or a copolymer thereof. In embodiments, the polymer includes polymerized units of polyethylene glycol methacrylate (PEGMA) and glicydyl methacrylate (GMA). In embodiments, the polymer includes polymerized units of polyethylene glycol methacrylate (PEGMA) and isocyanatoethyl methacrylate (IEM). In embodiments, the polymer includes polymerized units of glicydyl methacrylate azide (GMA azide) and polyethylene glycol methacrylate (PEGMA). In embodiments, the polymer includes a plurality of oligonucleotides (e.g., immobilized primers as described herein) covalently attached to the polymer. In embodiments, the polymer coating includes polymerized units of polyacrylamide (AAm), glicydyl methacrylate (GMA), glicydyl methacrylate (GMA) azide, polyethylene glycol methacrylate (PEGMA), polyethylene glycol methacrylate (PEGMA), isocyanatoethyl methacrylate (IEM), or a copolymer thereof. In embodiments, the polymer layer includes the particle polymer includes polymerized units of a) polyethylene glycol methacrylate (PEGMA) and glicydyl methacrylate (GMA), b) polyethylene glycol methacrylate (PEGMA) and isocyanatoethyl methacrylate (IEM), or c) polyethylene glycol methacrylate (PEGMA) and glicydyl methacrylate (GMA) azide.

In embodiments, the solid support includes a polymer layer. In embodiments, the polymer layer includes polymerized units of alkoxysilyl methacrylate, alkoxysilyl acrylate, alkoxysilyl methylacrylamide, alkoxysilyl methylacrylamide, or a copolymer thereof. In embodiments, the polymer layer includes polymerized units of alkoxysilyl methacrylate. In embodiments, the polymer layer includes polymerized units of alkoxysilyl acrylate. In embodiments, the polymer layer includes polymerized units of alkoxysilyl methylacrylamide. In embodiments, the polymer layer includes polymerized units of alkoxysilyl methylacrylamide. In embodiments, the polymer layer includes glicidyloxypropyl-trimethyloxysilane. In embodiments, the polymer layer includes methacryloxypropyl-trimethoxysilane. In embodiments, the polymer layer includes polymerized units of

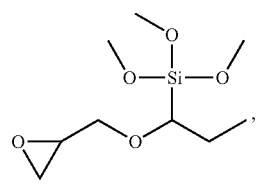

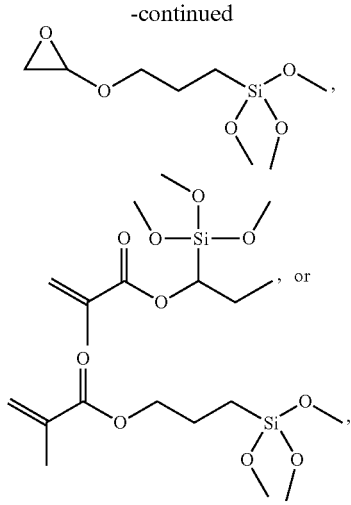

or a copolymer thereof.

In embodiments, the solid support includes a photoresist, alternatively referred to herein as a resist. A "resist" as used herein is used in accordance with its ordinary meaning in the art of lithography and refers to a polymer matrix (e.g., a polymer network). In embodiments, the photoresist is a silsesquioxane resist, an epoxy-based polymer resist, poly (vinylpyrrolidone-vinyl acrylic acid) copolymer resist, an Off-stoichiometry thiol-enes (OSTE) resist, amorphous fluoropolymer resist, a crystalline fluoropolymer resist, polysiloxane resist, or a organically modified ceramic polymer resist. In embodiments, the photoresist is a silsesquioxane resist. In embodiments, the photoresist is an epoxy-based polymer resist. In embodiments, the photoresist is a poly(vinylpyrrolidone-vinyl acrylic acid) copolymer resist. In embodiments, the photoresist is an Off-stoichiometry thiol-enes (OSTE) resist. In embodiments, the photoresist is an amorphous fluoropolymer resist. In embodiments, the photoresist is a crystalline fluoropolymer resist. In embodiments, the photoresist is a polysiloxane resist. In embodiments, the photoresist is an organically modified ceramic polymer resist. In embodiments, the photoresist includes polymerized alkoxysilyl methacrylate polymers and metal oxides (e.g., $SiO_2$, $ZrO$, $MgO$, $Al_2O_3$, $TiO_2$ or $Ta_2O_5$). In embodiments, the photoresist includes polymerized alkoxysilyl acrylate polymers and metal oxides (e.g., $SiO_2$, $ZrO$, $MgO$, $Al_2O_3$, $TiO_2$ or $Ta_2O_5$). In embodiments, the photoresist includes metal atoms, such as Si, Zr, Mg, Al, Ti or Ta atoms.

In embodiments, the solid support is subjected to lithographic patterning methods (e.g., nanolithographic to microlithographic patterning). In embodiments, prior to contacting the solid support with a plurality of particles, the solid support is subjected to lithographic patterning methods (e.g., nanolithographic to microlithographic patterning). Typically, features smaller than 10 micrometers are considered microlithographic, and features smaller than 100 nanometers are considered nanolithographic. Lithographic techniques make use of masks or templates to transfer patterns over a large area simultaneously. A powerful microfabrication technique is photolithography, i.e. the lithography using a UV light source and a photosensitive material as resist. As the name suggests, the photoresist (alternatively referred to as a resist) is an active material layer that can be patterned by selective exposure and must "resist" chemical/physical attach of the underlying substrate. In embodiments, the resist is a crosslinked polymer matrix.

In embodiments, the solid support includes a resist (e.g., a nanoimprint lithography (NIL) resist). Nanoimprint resists can include thermal curable materials (e.g., thermoplastic polymers), and/or UV-curable polymers. In embodiments, the solid support is generated by pressing a transparent mold possessing the pattern of interest (e.g., the pattern of wells) into photo-curable liquid film, followed by solidifying the liquid materials via a UV light irradiation. Typical UV-curable resists have low viscosity, low surface tension, and suitable adhesion to the glass substrate. For example, the solid support surface, but not the surface of the wells, is coated in an organically modified ceramic polymer (ORMO-CER®, registered trademark of Fraunhofer-Gesellschaft zur Förderung der angewandten Forschung e. V. in Germany). Organically modified ceramics contain organic side chains attached to an inorganic siloxane backbone. Several ORMO-CER® polymers are now provided under names such as "Ormocore", "Ormoclad" and "Ormocomp" by Micro Resist Technology GmbH. In embodiments, the solid support includes a resist as described in Haas et al Volume 351, Issues 1-2, 30 Aug. 1999, Pages 198-203, US 2015/0079351A1, US 2008/0000373, or US 2010/0160478, each of which is incorporated herein by reference. In embodiments, the solid support surface, and the surface of the wells, is coated in an organically modified ceramic polymer (OR-MOCER®, registered trademark of Fraunhofer-Gesellschaft zur Förderung der angewandten Forschung e. V. in Germany). In embodiments, the resist (e.g., the organically modified ceramic polymer) is not removed prior to particle deposition. In embodiments, the wells are within the resist polymer and not the solid support. In embodiments, the solid support includes a plurality of wells (e.g., a billion or more wells). In embodiments, the wells (e.g., each well) is separated by about 0.1 μm to about 5.0 μm. In embodiments, the wells (e.g., each well) is separated by about 0.2 μm to about 2.0 μm. In embodiments, the wells (e.g., each well) is separated by about 0.5 μm to about 1.5 μm. In embodiments, the wells of the solid support are all the same size. In embodiments, one or more wells are different sizes (e.g., one population of wells are 1.0 μm in diameter, and a second population are 0.5 μm in diameter). In embodiments, the solid support is a glass slide about 75 mm by about 25 mm.

In embodiments, density of wells on the solid support may be tuned. For example, in embodiments, the multiwell container includes a density of at least about 100 wells per $mm^2$, about 1,000 wells per $mm^2$, about 0.1 million wells per $mm^2$, about 1 million wells per $mm^2$, about 2 million wells per $mm^2$, about 5 million wells per $mm^2$, about 10 million wells per $mm^2$, about 50 million wells per $mm^2$, or more. In embodiments, the multiwell container includes no more than about 50 million wells per $mm^2$, about 10 million wells per $mm^2$, about 5 million wells per $mm^2$, about 2 million wells per $mm^2$, about 1 million wells per $mm^2$, about 0.1 million wells per $mm^2$, about 1,000 wells per $mm^2$, about 100 wells per $mm^2$, or less. In embodiments, the solid support includes about 500, 1,000, 2,500, 5,000, or about 25,000 wells per $mm^2$. In embodiments, the solid support includes about $1\times10^6$ to about $1\times10^{12}$ wells. In embodiments, the solid support includes about $1\times10^7$ to about $1\times10^{12}$ wells. In embodiments, the solid support includes about $1\times10^8$ to about $1\times10^{12}$ wells. In embodiments, the solid support includes about $1\times10^6$ to about $1\times10^9$ wells. In embodiments, the solid support includes about $1\times10^9$ to about $1\times10^{10}$ wells. In embodiments, the solid support includes about $1\times10^7$ to about $1\times10^9$ wells. In embodiments, the solid support includes about $1\times10^8$ to about $1\times10^8$ wells. In embodiments, the solid support includes about $1\times10^6$ to about $1\times10^8$ wells. In embodiments, the solid support includes about $1\times10^6$, $1\times10^7$, $1\times10^8$, $1\times10^9$, $1\times10^{10}$, $1\times10^{11}$, $1\times10^{12}$, $5\times10^{12}$, or more wells. In embodiments, the solid support includes about $1.8\times10^9$, $3.7\times10^9$, $9.4\times10^9$, $1.9\times10^{10}$, or about $9.4\times10^{10}$ wells. In embodiments, the solid support includes about $1\times10^6$ or more wells. In embodiments, the solid support includes about $1\times10^7$ or more wells. In embodiments, the solid support includes about $1\times10^8$ or more wells. In embodiments, the solid support includes about $1\times10^9$ or more wells. In embodiments, the solid support includes about $1\times10^{10}$ or more wells. In embodiments, the solid support includes about $1\times10^{11}$ or more wells. In embodiments, the solid support includes about $1\times10^{12}$ or more wells. In embodiments, the solid support is a glass slide. In embodiments, the solid support is a about 75 mm by about 25 mm. In embodiments, the solid support includes one, two, three, or four channels.

In embodiments, the particle is a functionalized particle including a particle core (e.g., a silica particle core) and a polymer shell, wherein the polymer shell is covalently attached to the particle core and includes a plurality of polymerized units of shell monomers and one or more shell monomers includes an oligonucleotide moiety covalently linked to the shell monomer (e.g., an immobilized primer, as described herein). In embodiments, the oligonucleotide moiety is covalently linked to the shell monomer via a bioconjugate linker.

In embodiments, each particle includes a plurality of oligonucleotide moieties covalently attached to the particle via a polymeric bioconjugate linker. In embodiments, the polymeric bioconjugate linker is a polymer (i.e., a molecule including structurally unique repeating units) including one or more reacted bioconjugate reactive moieties that formed a bioconjugate linker. For example, a bioconjugate linker is illustrated in Scheme 1. In embodiments, the polymeric bioconjugate linker is a polymer including a subunit of formula Ia, Ib, II, or III as described in U.S. Pat. No. 11,236,387, which is incorporated herein by reference in its entirety and for all purposes.

In embodiments, the oligonucleotide moiety includes a DBCO bioconjugate reactive moiety that reacts with an azide bioconjugate reactive moiety on the polymer and forms a bioconjugate linker that covalently links the oligonucleotide moiety to the polymer, for example according to the following scheme:

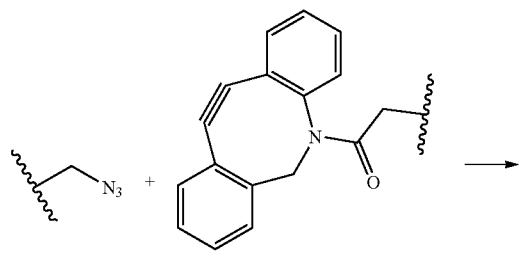

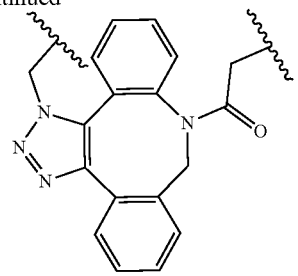

Scheme 1. An example mechanism of the bioconjugate covalent linker formed by reacting a DBCO containing oligonucleotide with a particle containing an azide moiety, wherein the "⌇" refers to the attachment point to the oligonucleotide moiety and the polymer, respectively.

In embodiments, the particle has a polymer shell surrounding the particle core. In embodiments, the polymer shell includes polymerized units of polyacrylamide (AAm), poly-N-isopropylacrylamide, poly N-isopropylpolyacrylamide, sulfobetaine acrylate (SBA), carboxybetaine acrylate (CBA), phosphorylcholine acrylate (PCA), sulfobetaine methacrylate (SBMA), carboxybetaine methacrylate (CBMA), phosphorylcholine methacrylate (PCMA), polyethylene glycol acrylate, methacrylate, polyethylene glycol (PEG)-thiol/PEG-acrylate, acrylamide/N,N'-bis(acryloyl) cystamine (BACy), PEG/polypropylene oxide (PPO), polyacrylic acid, poly(hydroxyethyl methacrylate) (PHEMA), poly(methyl methacrylate) (PMMA), poly(N-isopropylacrylamide) (PNIPAAm), poly(lactic acid) (PLA), poly(lactic-co-glycolic acid) (PLGA), polycaprolactone (PCL), poly (vinylsulfonic acid) (PVSA), poly(L-aspartic acid), poly(L-glutamic acid), polylysine, agar, agarose, alginate, heparin, alginate sulfate, dextran sulfate, hyaluronan, pectin, carrageenan, gelatin, chitosan, cellulose, collagen, glicydyl methacrylate (GMA), glicydyl methacrylate (GMA) azide, hydroxyethylmethacrylate (HEMA), hydroxyethylacrylate (HEA), hydroxypropylmethacrylate (HPMA), polyethylene glycol methacrylate (PEGMA), polyethylene glycol acrylate (PEGA), isocyanatoethyl methacrylate (IEM), or a copolymer thereof. In embodiments, the polymer shell includes polymerized units of polyethylene glycol methacrylate (PEGMA) and glicydyl methacrylate (GMA). In embodiments, the polymer shell includes polymerized units of polyethylene glycol methacrylate (PEGMA) and isocyanatoethyl methacrylate (IEM). In embodiments, the polymer shell includes polymerized units of glicydyl methacrylate azide (GMA azide) and polyethylene glycol methacrylate (PEGMA).

In embodiments, the polymer shell includes polymerized units of 3-azido-2-hydroxypropyl methacrylate, 2-azido-3-hydroxypropyl methacrylate, 2-(((2-azidoethoxy)carbonyl) amino)ethyl methacrylate, 3-azido-2-hydroxypropyl acrylate, 2-azido-3-hydroxypropyl acrylate, or 2-(((2-azidoethoxy)carbonyl)amino)ethyl acrylate. In embodiments, the polymer shell includes polymerized units of 3-azido-2-hydroxypropyl methacrylate, 2-azido-3-hydroxypropyl methacrylate, or 2-(((2-azidoethoxy)carbonyl) amino)ethyl methacrylate. In embodiments, the polymer shell includes polymerized units of 3-azido-2-hydroxypropyl methacrylate. In embodiments, the polymer shell includes polymerized units of 3-azido-2-hydroxypropyl methacrylate 2-azido-3-hydroxypropyl methacrylate. In embodiments, the polymer shell includes polymerized units of 3-azido-2-hydroxypropyl methacrylate 2-(((2-azidoethoxy)carbonyl)amino)ethyl methacrylate. In embodiments, the polymer shell includes polymerized units of a) polyethylene glycol methacrylate (PEGMA) and glicydyl methacrylate (GMA), b) polyethylene glycol methacrylate (PEGMA) and isocyanatoethyl methacrylate (IEM), or c) polyethylene glycol methacrylate (PEGMA) and glicydyl methacrylate (GMA) azide. In embodiments, the polymer shell is permeable to a polymerase.

In embodiments, the polymer (e.g., the polymer coating or the polymer shell) includes polymerized units of glicydyl methacrylate azide (GMA azide) and polyethylene glycol methacrylate (PEGMA) in the ratio of 1:1. In embodiments, the ratio of GMA azide to PEGMA is 1:2. In embodiments, the ratio of GMA azide to PEGMA is 1:3. In embodiments, the ratio of GMA azide to PEGMA is 1:4. In embodiments, the ratio of GMA azide to PEGMA is 1:5. In embodiments, the ratio of GMA azide to PEGMA is 1:6. In embodiments, the ratio of GMA azide to PEGMA is 1:7. In embodiments, the ratio of GMA azide to PEGMA is 1:8.

The polymer may be polymerized from a mixture of functionalized and non-functionalized monomers, such that at least some functionalized monomers that provide attachment points (e.g., azide moieties) for primers (e.g., DBCO-containing oligonucleotide primers) are spaced from one another by one or more monomers lacking such attachment points (e.g., PEG or AAm). The frequency of monomer units attached to primers within a polymer can be adjusted by changing the concentration of the corresponding functionalized monomer in the mixture of monomers. In embodiments, monomer units of the polymer that are attached to a polynucleotide primer (referred to herein as oligonucleotide moieties) are separated by, on average, about or at least about 1, 2, 3, 4, 5, 6, 7, 8, 9, 10, 15, 20, 25, 30, 40, 50, or more monomer units that are not attached to a primer, referred to herein as (ng). In embodiments, monomer units of the polymer that are attached to a polynucleotide primer are separated by, on average, about or at least about 4 to 8 monomer units that are not attached to a primer. In embodiments, monomer units of the polymer that are attached to a polynucleotide primer are separated by, on average, about or at least about 6, 7, or 8 monomer units that are not attached to a primer. In embodiments, primer-attached monomers are separated by, on average, about 1-50, 2-40, 3-30, 4-25, or 5-20 monomers not attached to primers. In embodiments, monomer units of the polymer that are attached to a polynucleotide primer are separated by 3 monomer units that are not attached to a primer (aka 3 ng). In embodiments, monomer units of the polymer that are attached to a polynucleotide primer are separated by 6 ng. In embodiments, monomer units the polymer that are attached to a polynucleotide primer are separated by 9 ng. The mixture can include monomers with different functional groups (e.g., azides, alkynes, DBCO, etc.) as described herein.

In embodiments, the average longest dimension of the particle is from about 100 nm to about 3000 nm. In embodiments, the average longest dimension of the particle is from about 200 nm to about 2900 nm. In embodiments, the average longest dimension of the particle is from about 300 nm to about 2800 nm. In embodiments, the average longest dimension of the particle is from about 400 nm to about 2700 nm. In embodiments, the average longest dimension of the particle is from about 500 nm to about 2600 nm. In embodiments, the average longest dimension of the particle is from about 600 nm to about 2500 nm. In embodiments, the average longest dimension of the particle is from about 700 nm to about 2400 nm. In embodiments, the average longest dimension of the particle is from about 800 nm to about 2300 nm. In embodiments, the average longest dimension of the particle is from about 900 nm to about 2200 nm. In embodiments, the average longest dimension of the particle is from about 1000 nm to about 2100 nm. In embodiments, the average longest dimension of the particle is from about 900 nm to about 2000 nm. In embodiments, the average longest dimension of the particle is from about 150 nm to about 600 nm. In some embodiments, the average longest dimension of the particle is from about 350 nm to about 600 nm. In some embodiments, the average longest dimension of the particle is from about 400 nm to about 500 nm. In some embodiments, the average longest dimension of the particle is about 500 nm. In some embodiments, the average longest dimension of the particle is about 400 nm. In some embodiments, the average longest dimension of the particle is about 400 nm, 450 nm, 500 nm, or 550 nm. In some embodiments, the average longest dimension of the particle is about 410 nm, 420 nm, 430 nm, 440 nm or 450 nm. In some embodiments, the average longest dimension of the particle is about 460 nm, 470 nm, 480 nm, 490 nm or 500 nm. In embodiments, the average longest dimension of the particle is at least, about, or at most 100, 200, 300, 400, 500, 600, 700, 800, 900, 1000 nm or a number or a range between any two of these values. In embodiments, the particle shell diameter is at least, about, or at most 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0 µm or a number or a range between any two of these values. In embodiments, the core diameter is about 150-700 nanometers, and/or the shell diameter is about 0.25-5 µm (microns).

In embodiments, the average longest dimension of the nanoparticle is from about 100 nm to about 400 nm. In embodiments, the average longest dimension of the nanoparticle is about 75 nm, 80 nm, 85 nm, 90 nm, 95 nm, 100 nm, 105 nm, 110 nm, 115 nm, 120 nm, 125 nm, 130 nm, 135 nm, 140 nm, 145 nm, 150 nm, 155 nm, 160 nm, 165 nm, 170 nm, 175 nm, 180 nm, 185 nm, 190 nm, 195 nm, 200 nm, 205 nm, 210 nm, 215 nm, 220 nm, 225 nm, 230 nm, 235 nm, 240 nm, 245 nm, 250 nm, 255 nm, 260 nm, 265 nm, 270 nm, 275 nm, 280 nm, 285 nm, 290 nm, 295 nm, 300 nm, 305 nm, 310 nm, 315 nm, 320 nm, 325 nm, 330 nm, 335 nm, 340 nm, 345 nm, 350 nm, 355 nm, 360 nm, 365 nm, 370 nm, 375 nm, 380 nm, 385 nm, 390 nm, 395 nm, 400 nm, 405 nm, 410 nm, 415 nm, 420 nm, 425 nm, 430 nm, 435 nm, 440 nm, 445 nm, 450 nm, 455 nm, 460 nm, 465 nm, 470 nm, 475 nm, 480 nm, 485 nm, 490 nm, 495 nm, 500 nm, 505 nm, 510 nm, 515 nm, 520 nm, 525 nm, 530 nm, 535 nm, 540 nm, 545 nm, 550 nm, 555 nm, 560 nm, 565 nm, 570 nm, 575 nm, 580 nm, 585 nm, 590 nm, 595 nm, or 600 nm. In embodiments, the average longest dimension of the nanoparticle is from about 600 nm, 605 nm, 610 nm, 615 nm, 620 nm, 625 nm, 630 nm, 635 nm, 640 nm, 645 nm, 650 nm, 655 nm, 660 nm, 665 nm, 670 nm, 675 nm, 680 nm, 685 nm, 690 nm, 695 nm, 700 nm, 705 nm, 710 nm, 715 nm, 720 nm, 725 nm, 730 nm, 735 nm, 740 nm, 745 nm, 750 nm, 755 nm, 760 nm, 765 nm, 770 nm, 775 nm, 780 nm, 785 nm, 790 nm, 795 nm, 800 nm, 805 nm, 810 nm, 815 nm, 820 nm, 825 nm, 830 nm, 835 nm, 840 nm, 845 nm, 850 nm, 855 nm, 860 nm, 865 nm, 870 nm, 875 nm, 880 nm, 885 nm, 890 nm, 895 nm, 900 nm, 905 nm, 910 nm, 915 nm, 920 nm, 925 nm, 930 nm, 935 nm, 940 nm, 945 nm, 950 nm, 955 nm, 960 nm, 965 nm, 970 nm, 975 nm, 980 nm, 985 nm, 990 nm, 995 nm or about 1000 nm. In embodiments, the average longest dimension of the nanoparticle is less than about 1000 nm. In embodiments, the average longest dimension of the nanoparticle is less than about 900 nm. In embodiments, the average longest dimension of the nanoparticle is less than about 800 nm. In embodiments, the average longest dimension of the nanoparticle is less than about 700 nm. In embodiments, the average longest dimension of the nanoparticle is less than about 600 nm. In embodiments, the average longest dimension of the nanoparticle is less than about 500 nm. In embodiments, the average longest dimension of the nanoparticle is less than about 400 nm. In embodiments, the average longest dimension of the nanoparticle is less than about 300 nm. In embodiments, the average longest dimension of the nanoparticle is less than about 200 nm. In embodiments, the average longest dimension of the nanoparticle is less than about 100 nm. In embodiments, the average longest dimension of the nanoparticle is 400 nm without the particle shell.

In embodiments, the solid support includes a plurality of bioconjugate reactive moieties. In embodiments, a bioconjugate reactive moiety includes an amine moiety, aldehyde moiety, alkyne moiety, azide moiety, carboxylic acid moiety, dibenzocyclooctyne (DBCO) moiety, norbornene moiety, tetrazine moiety, epoxy moiety, isocyanate moiety, furan moiety, maleimide moiety, thiol moiety, or transcyclooctene (TCO) moiety. In embodiments, the particle includes a plurality of azide moieties, alkyne moieties, dibenzocyclooctyne (DBCO) moieties, norbornene moieties, epoxy moieties, or isocyanate moieties. In some embodiments, the solid support includes a plurality of oligonucleotide moieties (e.g., ssDNA moieties) covalently attached via a bioconjugate linker to the solid support (e.g., via a polymeric bioconjugate linker or via the polymer shell). The bioconjugate linker is the product of a reaction between the two bioconjugate group (e.g. click chemistry group). In embodiments, each of the plurality of bioconjugate reactive moieties includes an amine moiety, aldehyde moiety, alkyne moiety, azide moiety, carboxylic acid moiety, dibenzocyclooctyne (DBCO) moiety, norbornene moiety, tetrazine moiety, epoxy moiety, isocyanate moiety, furan moiety, maleimide moiety, thiol moiety, or transcyclooctene (TCO) moiety. In embodiments, each of the plurality of bioconjugate reactive moieties include an amine moiety, azide moiety, dibenzocyclooctyne (DBCO) moiety, epoxy moiety, or isocyanate moiety. In embodiments, each of the plurality of bioconjugate reactive moieties include an amine moiety, azide moiety, alkyne moiety, dibenzocyclooctyne (DBCO) moiety, epoxy moiety, or isocyanate moiety. In embodiments, the bioconjugate reactive moiety is an azido moiety.

In embodiments, each particle includes multiple copies of one or more oligonucleotide moieties. In embodiments, the one or more oligonucleotide moieties include at least two different primers attached to the polymer (e.g., a forward and a reverse primer), each of which may be present in multiple copies. In embodiments, about or at most at most about 50%, 40%, 30%, 25%, 20%, 15%, 10%, 5%, or less of the monomers in the polymer of each particle are attached to a copy of the oligonucleotide moiety. In embodiments, about 1-25%, about 2-20%, about 3-15%, about 4-14%, or about 5-12% of the monomers in the polymer of each particle are attached to a copy of the oligonucleotide moiety, or a number or a range between any two of these values. In embodiments, about 5-10% of the monomers in the polymer of each particle are attached to a copy of the oligonucleotide moiety. In embodiments, two different oligonucleotide moieties are attached to the particle (e.g., a forward and a reverse primer), which facilitates generating multiple amplification products from the first extension product or a complement thereof.

In embodiments, the first primer is immobilized on the substrate via a first linker and the second primer is immobilized to the substrate via a second linker. The linkers may also include spacer nucleotides. Including spacer nucleotides in the linker puts the polynucleotide in an environment having a greater resemblance to free solution. This can be beneficial, for example, in enzyme-mediated reactions such as sequencing-by-synthesis. It is believed that such reactions suffer less steric hindrance issues that can occur when the polynucleotide is directly attached to the solid support or is attached through a very short linker (e.g., a linker including about 1 to 3 carbon atoms). Spacer nucleotides form part of the polynucleotide but do not participate in any reaction carried out on or with the polynucleotide (e.g., a hybridization or amplification reaction). In embodiments, the spacer nucleotides include 1 to 20 nucleotides. In embodiments, the linker includes 10 spacer nucleotides. In embodiments, the linker includes 12 spacer nucleotides. In embodiments, the linker includes 15 spacer nucleotides. It is preferred to use polyT spacers, although other nucleotides and combinations thereof can be used. In embodiments, the linker includes 10, 11, 12, 13, 14, or 15 T spacer nucleotides. In embodiments, the linker includes 12 T spacer nucleotides. Spacer nucleotides are typically included at the 5' ends of polynucleotides which are attached to a suitable support. Attachment can be achieved via a phosphorothioate present at the 5' end of the polynucleotide, an azide moiety, a dibenzocyclooctyne (DBCO) moiety, or any other bioconjugate reactive moiety. The linker may be a carbon-containing chain such as those of formula —$(CH_2)_n$- wherein "n" is from 1 to about 1000. However, a variety of other linkers may be used so long as the linkers are stable under conditions used in DNA sequencing. In embodiments, the linker includes polyethylene glycol (PEG) having a general formula of —$(CH_2$—$CH_2$—$O)_m$-, wherein m is from about 1 to 500. In embodiments, the linker, or the immobilized oligonucleotides (e.g., primers) include a cleavable site. In embodiments, a cleavable site is a location which allows controlled cleavage of the immobilized polynucleotide strand (e.g., the linker, the primer, or the polynucleotide) by chemical, enzymatic or photochemical means. In embodiments, the cleavable site includes one or more deoxyuracil nucleobases (dUs). Any suitable enzymatic, chemical, or photochemical cleavage reaction may be used to cleave the cleavable site. The cleavage reaction may result in removal of a part or the whole of the strand being cleaved. Suitable cleavage means include, for example, restriction enzyme digestion, in which case the cleavable site is an appropriate restriction site for the enzyme which directs cleavage of one or both strands of a duplex template; RNase digestion or chemical cleavage of a bond between a deoxyribonucleotide and a ribonucleotide, in which case the cleavable site may include one or more ribonucleotides; chemical reduction of a disulfide linkage with a reducing agent (e.g., THPP or TCEP), in which case the cleavable site should include an appropriate disulfide linkage; chemical cleavage of a diol linkage with periodate, in which case the cleavable site should include a diol linkage; generation of an abasic site and subsequent hydrolysis, etc. In embodiments, the cleavable site is included in the surface immobilized primer (e.g., within the polynucleotide sequence of the primer). In embodiments, the linker, the primer, or the first or second polynucleotide includes a diol linkage which permits cleavage by treatment with periodate (e.g., sodium periodate). It will be appreciated that more than one diol can be included at the cleavable site. One or more diol units may be incorporated into a polynucleotide using standard methods for automated chemical DNA synthesis. Polynucleotide primers including one or more diol linkers can be conveniently prepared by chemical synthesis. The diol linker is cleaved by treatment with any substance which promotes cleavage of the diol (e.g., a diol-cleaving agent). In embodiments, the diol-cleaving agent is periodate, e.g., aqueous sodium periodate ($NaIO_4$). Following treatment with the diol-cleaving agent (e.g., periodate) to cleave the diol, the cleaved product may be treated with a "capping agent" in order to neutralize reactive species generated in the cleavage reaction. Suitable capping agents for this purpose include amines, e.g., ethanolamine or propanolamine. In embodiments, cleavage may be accomplished by using a modified nucleotide as the cleavable site (e.g., uracil, 8oxoG, 5-mC, 5-hmC) that is removed or nicked via a corresponding DNA glycosylase, endonuclease, or combination thereof.

In embodiments, each of the plurality of immobilized oligonucleotides (e.g., immobilized primers or immobilized oligonucleotide moieties) is about 5 to about 25 nucleotides in length. In embodiments, each of the plurality of immobilized oligonucleotides (e.g., immobilized primers) is about 20 to about 50 nucleotides in length. In embodiments, each of the plurality of immobilized oligonucleotides (e.g., immobilized primers) is about 10 to about 40 nucleotides in length. In embodiments, each of the plurality of immobilized oligonucleotides (e.g., immobilized primers) is about 5 to about 100 nucleotides in length. In embodiments, each of the plurality of immobilized oligonucleotides (e.g., immobilized primers) is about 20 to 200 nucleotides in length. In embodiments, each of the plurality of immobilized oligonucleotides (e.g., immobilized primers) about or at least about 5, 6, 7, 8, 9, 10, 12, 15, 18, 20, 25, 30, 35, 40, 50 or more nucleotides in length. In other embodiments, each of the plurality of immobilized oligonucleotides (e.g., immobilized primers) is about 100 to about 200 nucleotides in length. In other embodiments, each of the plurality of immobilized oligonucleotides (e.g., immobilized primers) is about 125 to about 175 nucleotides in length. In other embodiments, each of the plurality of immobilized oligonucleotides (e.g., immobilized primers) is about 150 nucleotides in length. In some embodiments, the oligonucleotide moiety is about 5 to about 50 nucleotides in length. In some embodiments, the oligonucleotide moiety is about 5 to about 40 nucleotides in length. In some embodiments, the oligonucleotide moiety is about 10 to about 45 nucleotides in length. In some embodiments, the oligonucleotide moiety is about 15 to about 40 nucleotides in length. In some embodiments, the oligonucleotide moiety is about 20 to about 35 nucleotides in length. In some embodiments, the oligonucleotide moiety is about 20 to about 30 nucleotides in length. In some embodiments, the oligonucleotide moiety is about 25 to about 30 nucleotides in length. In embodiments, the oligonucleotide moiety is about 25 to about 35 nucleotides in length. In embodiments, the oligonucleotide moiety is about 30 to about 50 nucleotides in length. In embodiments, the oligonucleotide moiety is about 30 to about 75 nucleotides in length. In embodiments, the oligonucleotide moiety is about 50 to about 150 nucleotides in length. In embodiments, the oligonucleotide moiety is about 75 to about 200 nucleotides in length. In embodiments, the oligonucleotide moiety is a capture oligonucleotide, wherein the oligonucleotide is capable of hybridizing to a common sequence in a library of nucleic acid molecules In embodiments, each site (e.g., well of a multiwell container, amplification site, or particle) includes oligonucleotide moieties substantially identical to all the other sites. In embodiments, each of the sites include at least two species (i.e., two populations) of oligonucleotide moieties that are substantially identical to all the sites. In embodiments, each site includes substantially the same oligonucleotide moieties (e.g., a first population of oligonucleotide moieties and a second population of oligonucleotide moieties). In embodiments, each site includes least two species of substantially the same oligonucleotide moieties (i.e., the same sequences). In embodiments, the oligonucleotide is capable of hybridizing to a common sequence (e.g., a sequence described in U.S. Patent Publication 2016/0256846, which is incorporated herein by reference, for example SEQ ID NO: 3, SEQ ID NO: 4, SEQ ID NO: 5, or SEQ ID NO: 11 of U.S. Patent Publication 2016/0256846). In embodiments, the support includes about $10^2$-$10^{15}$ immobilized first oligonucleotide moieties per $mm^2$. In embodiments, the support includes about $10^2$-$10^{15}$ immobilized second oligonucleotide moieties per $mm^2$. In embodiments, the support includes about $10^8$-$10^{12}$ immobilized first oligonucleotide moieties per $mm^2$. In embodiments, the support includes about $10^8$-$10^{12}$ immobilized second oligonucleotide moieties per $mm^2$.

In embodiments, each site includes a plurality of P7 or P5 nucleic acid sequences or complementary sequences thereof (i.e., P5' or P7'). The P5 and P7 adapter sequences are described in U.S. Patent Publication No. 2011/0059865 A1, which is incorporated herein by reference in its entirety. The terms P5 and P7 may be used when referring to amplification primers, e.g., universal primers. The terms P5' (P5 prime) and P7' (P7 prime) refer to the complement of P5 and P7, respectively. In embodiments, each particle includes a first plurality of a platform primer sequence and a second plurality of a differing platform primer sequence. In embodiments, the platform primer sequence is used during amplification reactions (e.g., solid phase amplification). In embodiments, each particle includes oligonucleotide moieties capable of annealing to an adapter of a library nucleic acid molecule. The term "library" merely refers to a collection or plurality of template nucleic acid molecules which share common sequences at their 5' ends (e.g., the first end) and common sequences at their 3' ends (e.g., the second end). The term "adapter" as used herein refers to any linear oligonucleotide that can be ligated to a nucleic acid molecule, thereby generating nucleic acid products that can be sequenced on a sequencing platform (e.g., an Illumina or Singular Genomics' G4™ sequencing platform). In embodiments, adapters include two reverse complementary oligonucleotides forming a double-stranded structure. In embodiments, an adapter includes two oligonucleotides that are complementary at one portion and mismatched at another portion, forming a Y-shaped or fork-shaped adapter that is double stranded at the complementary portion and has two overhangs at the mismatched portion. Since Y-shaped adapters have a complementary, double-stranded region, they can be considered a special form of double-stranded adapters. When this disclosure contrasts Y-shaped adapters and double stranded adapters, the term "double-stranded adapter" or "blunt-ended" is used to refer to an adapter having two strands that are fully complementary, substantially (e.g., more than 90% or 95%) complementary, or partially complementary. In embodiments, adapters include sequences that bind to sequencing primers. In embodiments, adapters include sequences that bind to immobilized oligonucleotides (e.g., P7 and P5 sequences) or reverse complements thereof. In embodiments, the adapter is substantially non-complementary to the 3' end or the 5' end of any target polynucleotide present in the sample. In embodiments, the adapter can include a sequence that is substantially identical, or substantially complementary, to at least a portion of a primer, for example a universal primer. In embodiments, the adapter can include an index sequence (also referred to as barcode or tag) to assist with downstream error correction, identification or sequencing. In embodiments, each of the particles include at least two populations of substantially the same oligonucleotide moieties. In embodiments, the solid support includes a plurality of immobilized oligonucleotides. In embodiments, the solid support includes a plurality of oligonucleotides immobilized to a polymer. In embodiments, the solid support includes a plurality of particles. In embodiments, the solid support includes a first plurality of immobilized oligonucleotides. In embodiments, the solid support includes a first and a second plurality of immobilized oligonucleotides, wherein the immobilized oligonucleotides of each plurality are different (e.g., S1 or S2).

In embodiments, the plurality of oligonucleotides is present at a density of about 100 oligonucleotides per $\mu m^2$ to about 1,000,000 oligonucleotides per $\mu m^2$. In embodiments, the plurality of oligonucleotides is present at a density of about 100 oligonucleotides per $\mu m^2$ to about 1,000 oligonucleotides per $\mu m^2$. In embodiments, the plurality of oligonucleotides is present at a density of about 100 oligonucleotides per $\mu m^2$ to about 10,000 oligonucleotides per $\mu m^2$. In embodiments, the plurality of oligonucleotides is present at a density of about 100 oligonucleotides per $\mu m^2$ to about 100,000 oligonucleotides per $\mu m^2$. In embodiments, the plurality of oligonucleotides is present at a density of about 100 oligonucleotides per $\mu m^2$ to about 500,000 oligonucleotides per $\mu m^2$. In embodiments, the plurality of oligonucleotides is present at a density of about 100, 1,000, 10,000, 50,000, 100,000, 250,000, 500,000, 750,000, or 1,000,000 oligonucleotides per $\mu m^2$.

In embodiments, one or more immobilized oligonucleotides include blocking groups at their 3' ends that prevent polymerase extension. A blocking moiety prevents formation of a covalent bond between the 3' hydroxyl moiety of the nucleotide and the 5' phosphate of another nucleotide. In embodiments, the 3' modification is a 3'-phosphate modification, including a 3' phosphate moiety, which is removed by a PNK enzyme or a phosphatase enzyme. Alternatively, abasic site cleavage with certain endonucleases (e.g., Endo IV) results in a 3'-OH at the cleavable site from the 3'-diesterase activity. As described in US2010/0167353, a number of blocking groups are known in the art that can be placed at or near the 3' end of the oligonucleotide (e.g., a primer) to prevent extension. A primer or other oligonucleotide may be modified at the 3'-terminal nucleotide to prevent or inhibit initiation of DNA synthesis by, for example, the addition of a 3' deoxyribonucleotide residue (e.g., cordycepin), a 2',3'-dideoxyribonucleotide residue, non-nucleotide linkages or alkane-diol modifications (as described in U.S. Pat. No. 5,554,516). Alkane diol modifications which can be used to inhibit or block primer extension have also been described by Wilk et al., (1990 Nucleic Acids Res. 18 (8):2065), and by Arnold et al. (U.S. Pat. No. 6,031,091). Additional examples of suitable blocking groups include 3' hydroxyl substitutions (e.g., 3'-phosphate, 3'-triphosphate or 3'-phosphate diesters with alcohols such as 3-hydroxypropyl), 2'3'-cyclic phosphate, 2' hydroxyl substitutions of a terminal RNA base (e.g., phosphate or sterically bulky groups such as triisopropyl silyl (TIPS) or tert-butyl dimethyl silyl (TBDMS)). 2'-alkyl silyl groups such as TIPS and TBDMS substituted at the 3'-end of an oligonucleotide are described in US 2007/0218490, which is incorporated herein by reference. Bulky substituents and/or reversible terminators can also be incorporated on the base of the 3'-terminal residue of the oligonucleotide to block primer extension. In certain embodiments, the oligonucleotide may include a cleavage domain that is located upstream (e.g., 5' to) of the blocking group used to inhibit primer extension. As examples, the cleavage domain may be an RNase H cleavage domain, or the cleavage domain may be an RNase H2 cleavage domain including a single RNA residue, or the oligonucleotide may include replacement of the RNA base with one or more alternative nucleosides. Additional illustrative cleavage domains are described in US2010/0167353.

In some embodiments, the oligonucleotide moiety is capable of hybridizing to a complementary sequence of a template nucleic acid. In embodiments, the oligonucleotide moiety includes DNA. In embodiments, the oligonucleotide moiety includes RNA. In embodiments, the oligonucleotide moiety is DNA. In embodiments, the oligonucleotide moiety is RNA. In embodiments, the oligonucleotide moiety includes a single-stranded DNA. In embodiments, the oligonucleotide moiety includes a single-stranded RNA. In embodiments, the oligonucleotide moiety is a single-stranded DNA. In embodiments, the oligonucleotide moiety is a single-stranded RNA. In embodiments, the oligonucleotide moiety is a nucleic acid sequence complementary to a target polynucleotide (e.g., complementary to a common adapter sequence of the target polynucleotide).

In embodiments, the immobilized primers are designed to have a particular melting temperature (Tm). The Tm is the temperature (under defined ionic strength, pH, and nucleic concentration) at which 50% of the probes complementary to the target hybridize to the target sequence at equilibrium (as the target sequences are present in excess, at Tm, 50% of the probes are occupied at equilibrium). In embodiments, the Tm of the immobilized primers have a Tm of about 55° C. to about 70° C. In embodiments, the Tm of the immobilized primers have a Tm of about 60° C. to about 70° C. In embodiments, the Tm of the immobilized primers have a Tm of about 60° C. to about 65° C.

In embodiments, the immobilized primers includes one or more phosphorothioate nucleotides. In embodiments, the immobilized primers includes a plurality of phosphorothioate nucleotides. In embodiments, about or at least about 20%, 30%, 40%, 50%, 60%, 70%, 80%, 90%, or about 100% of the nucleotides in the immobilized primers are phosphorothioate nucleotides. In embodiments, most of the nucleotides in the immobilized primers are phosphorothioate nucleotides. In embodiments, all of the nucleotides in the immobilized primers are phosphorothioate nucleotides. In embodiments, none of the nucleotides in the immobilized primers are phosphorothioate nucleotides. In embodiments, the 5' end of the immobilized primers includes one or more phosphorothioate nucleotides. In embodiments, the 5' end of the immobilized primers includes between one and five phosphorothioate nucleotides.

In embodiments, the first and second primer polynucleotides are each attached to the solid support (i.e., immobilized on the surface of a solid support). The polynucleotide molecules can be fixed to surface by a variety of techniques, including covalent attachment and non-covalent attachment. In embodiments, the polynucleotides are confined to an area of a discrete region (referred to as a cluster). The discrete regions may have defined locations in a regular array, which may correspond to a rectilinear pattern, circular pattern, hexagonal pattern, or the like. A regular array of such regions is advantageous for detection and data analysis of signals collected from the arrays during an analysis. These discrete regions are separated by interstitial regions. As used herein, the term "interstitial region" refers to an area in a substrate or on a surface that separates other areas of the substrate or surface. For example, an interstitial region can separate one concave feature of an array from another concave feature of the array. The two regions that are separated from each other can be discrete, lacking contact with each other. In another example, an interstitial region can separate a first portion of a feature from a second portion of a feature. In embodiments the interstitial region is continuous whereas the features are discrete, for example, as is the case for an array of wells in an otherwise continuous surface. The separation provided by an interstitial region can be partial or full separation. Interstitial regions will typically have a surface material that differs from the surface material of the features on the surface. For example, features of an array can have polynucleotides that exceeds the amount or concentration present at the interstitial regions. In some embodiments the polynucleotides and/or primers may not be present at the interstitial regions. In embodiments, at least two different primers are attached to the solid support (e.g., a forward and a reverse primer), which facilitates generating multiple amplification products from the first extension product or a complement thereof.

In embodiments, the solid support includes a plurality of immobilized primers. In embodiments, the solid support includes a plurality of non-extended immobilized primers.

In embodiments of the methods and compositions provided herein, the clusters (alternatively referred to herein as features) have a mean or median separation from one another of about 0.5-5 µm. In embodiments, the mean or median separation is about 0.1-10 microns, 0.25-5 microns, 0.5-2 microns, 1 micron, or a number or a range between any two of these values. In embodiments, the mean or median separation is about or at least about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0 µm or a number or a range between any two of these values. In embodiments, the mean or median separation is about 0.1-10 microns. In embodiments, the mean or median separation is about 0.25-5 microns. In embodiments, the mean or median separation is about 0.5-2 microns. In embodiments, the mean or median separation is about or at least about 0.1 µm. In embodiments, the mean or median separation is about or at least about 0.25 µm. In embodiments, the mean or median separation is about or at least about 0.5 µm. In embodiments, the mean or median separation is about or at least about 1.0 µm. In embodiments, the mean or median separation is about or at least about 2.0 µm. In embodiments, the mean or median separation is about or at least about 5.0 µm. In embodiments, the mean or median separation is about or at least about 10 µm. The mean or median separation may be measured center-to-center (i.e., the center of one cluster to the center of a second cluster). In embodiments of the methods provided herein, the amplicon clusters have a mean or median separation (measured center-to-center) from one another of about 0.5-5 µm. The mean or median separation may be measured edge-to-edge (i.e., the edge of one amplicon cluster to the edge of a second amplicon cluster). In embodiments of the methods provided herein, the amplicon clusters have a mean or median separation (measured edge-to-edge) from one another of about 0.2-5 µm. In embodiments, the features and/or the wells have a mean or median separation from one another of about 0.5-5 µm. In embodiments, the mean or median separation is about 0.1-10 microns, 0.25-5 microns, 0.5-2 microns, 1 micron, or a number or a range between any two of these values. In embodiments, the mean or median separation is about or at least about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0 µm, or a number or a range between any two of these values. In embodiments, the mean or median separation is about or at least about 0.1 µm. In embodiments, the mean or median separation is about or at least about 0.2 µm. In embodiments, the mean or median separation is about or at least about 0.3 µm. In embodiments, the mean or median separation is about or at least about 0.4 µm. In embodiments, the mean or median separation is about or at least about 0.5 µm. In embodiments, the mean or median separation is about or at least about 0.6 µm. In embodiments, the mean or median separation is about or at least about 0.7 µm. In embodiments, the mean or median separation is about or at least about 0.8 µm. In embodiments, the mean or median separation is about or at least about 0.9 µm. In embodiments, the mean or median separation is about or at least about 1.0 µm. In embodiments, the mean or median separation is about or at least about 1.1 µm. In embodiments, the mean or median separation is about or at least about 1.2 µm. In embodiments, the mean or median separation is about or at least about 1.3 µm. In embodiments, the mean or median separation is about or at least about 1.4 µm. In embodiments, the mean or median separation is about or at least about 1.5 µm. In embodiments, the mean or median separation is about or at least about 1.6 µm. In embodiments, the mean or median separation is about or at least about 1.7 µm. In embodiments, the mean or median separation is about or at least about 1.8 µm. In embodiments, the mean or median separation is about or at least about 1.9 µm. In embodiments, the mean or median separation is about or at least about 2.0 µm. In embodiments, the mean or median separation is about or at least about 2.1 µm. In embodiments, the mean or median separation is about or at least about 2.2 µm. In embodiments, the mean or median separation is about or at least about 2.3 µm. In embodiments, the mean or median separation is about or at least about 2.4 µm. In embodiments, the mean or median separation is about or at least about 2.5 µm. In embodiments, the mean or median separation is about or at least about 2.6 µm. In embodiments, the mean or median separation is about or at least about 2.7 µm. In embodiments, the mean or median separation is about or at least about 2.8 µm. In embodiments, the mean or median separation is about or at least about 2.9 µm. In embodiments, the mean or median separation is about or at least about 3.0 µm. In embodiments, the mean or median separation is about or at least about 3.1 µm. In embodiments, the mean or median separation is about or at least about 3.2 µm. In embodiments, the mean or median separation is about or at least about 3.3 µm. In embodiments, the mean or median separation is about or at least about 3.4 µm. In embodiments, the mean or median separation is about or at least about 3.5 µm. In embodiments, the mean or median separation is about or at least about 3.6 µm. In embodiments, the mean or median separation is about or at least about 3.7 µm. In embodiments, the mean or median separation is about or at least about 3.8 µm. In embodiments, the mean or median separation is about or at least about 3.9 µm. In embodiments, the mean or median separation is about or at least about 4.0 µm. In embodiments, the mean or median separation is about or at least about 4.1 µm. In embodiments, the mean or median separation is about or at least about 4.2 µm. In embodiments, the mean or median separation is about or at least about 4.3 µm. In embodiments, the mean or median separation is about or at least about 4.4 µm. In embodiments, the mean or median separation is about or at least about 4.5 µm. In embodiments, the mean or median separation is about or at least about 4.6 µm. In embodiments, the mean or median separation is about or at least about 4.7 µm. In embodiments, the mean or median separation is about or at least about 4.8 µm. In embodiments, the mean or median separation is about or at least about 4.9 µm. In embodiments, the mean or median separation is about or at least about 5.0 µm. The mean or median separation may be measured center-to-center (i.e., the center of one well to the center of a second well). In embodiments of the methods provided herein, the wells have a mean or median separation (measured center-to-center) from one another of about 0.5-5 µm. The mean or median separation may be measured edge-to-edge (i.e., the edge of well to the edge of a second well). In embodiments, the wells have a mean or median separation (measured edge-to-edge) from one another of about 0.2-1.5 µm. In embodiments, the wells have a mean or median separation (measured center-to-center) from one another of about 0.7-1.5 µm.

In embodiments of the methods provided herein, the amplicon clusters have a mean or median diameter of about 100-2000 nm, or about 200-1000 nm. In embodiments, the mean or median diameter is about 100-3000 nanometers, about 500-2500 nanometers, about 1000-2000 nanometers, or a number or a range between any two of these values. In embodiments, the mean or median diameter is about or at most about 100, 200, 300, 400, 500, 600, 700, 800, 900, 1,000, 1,100, 1,200, 1,300, 1,400, 1,500, 1,600, 1,700, 1,800, 1,900, 2000 nanometers or a number or a range between any two of these values. In embodiments, the mean or median diameter is about 100-3,000 nanometers. In embodiments, the mean or median diameter is about 100-2,000 nanometers. In embodiments, the mean or median diameter is about 500-2500 nanometers. In embodiments, the mean or median diameter is about 200-1000 nanometers. In embodiments, the mean or median diameter is about 1,000-2,000 nanometers. In embodiments, the mean or median diameter is about or at most about 100 nanometers. In embodiments, the mean or median diameter is about or at most about 200 nanometers. In embodiments, the mean or median diameter is about or at most about 500 nanometers. In embodiments, the mean or median diameter is about or at most about 1,000 nanometers. In embodiments, the mean or median diameter is about or at most about 2,000 nanometers. In embodiments, the mean or median diameter is about or at most about 2,500 nanometers. In embodiments, the mean or median diameter is about or at most about 3,000 nanometers.

In embodiments, the template polynucleotide includes genomic DNA, complementary DNA (cDNA), cell-free DNA (cfDNA), messenger RNA (mRNA), transfer RNA (tRNA), ribosomal RNA (rRNA), cell-free RNA (cfRNA), or noncoding RNA (ncRNA). In embodiments, the template polynucleotide includes double-stranded DNA. In embodiments, the method of forming the template polynucleotide includes ligating a hairpin adapter to an end of a linear polynucleotide. In embodiments, the method of forming the template polynucleotide includes ligating hairpin adapters to both ends of the linear polynucleotide. In embodiments, the method of forming the template polynucleotide includes ligating a Y-shaped adapter to an end of a linear polynucleotide. In embodiments, the method of forming the template polynucleotide includes ligating a Y-shaped adapter to both ends of a linear polynucleotide.

In embodiments, the template polynucleotide is about 100 to 1000 nucleotides in length. In embodiments, the template polynucleotide is about 350 nucleotides in length. In embodiments, the template polynucleotide is about 10, 20, 50, 100, 150, 200, 300, or 500 nucleotides in length. The template polynucleotide molecules can vary length, such as about 100-300 nucleotides long, about 300-500 nucleotides long, or about 500-1000 nucleotides long. In embodiments, the template polynucleotide molecular is about 100-1000 nucleotides, about 150-950 nucleotides, about 200-900 nucleotides, about 250-850 nucleotides, about 300-800 nucleotides, about 350-750 nucleotides, about 400-700 nucleotides, or about 450-650 nucleotides. In embodiments, the template polynucleotide molecule is about 150 nucleotides. In embodiments, the template polynucleotide is about 100-1000 nucleotides long. In embodiments, the template polynucleotide is about 100-300 nucleotides long. In embodiments, the template polynucleotide is about 300-500 nucleotides long. In embodiments, the template polynucleotide is about 500-1000 nucleotides long. In embodiments, the template polynucleotide molecule is about 100 nucleotides. In embodiments, the template polynucleotide molecule is about 300 nucleotides. In embodiments, the template polynucleotide molecule is about 500 nucleotides. In embodiments, the template polynucleotide molecule is about 1000 nucleotides.

In embodiments the template polynucleotide (e.g., genomic template DNA) is first treated to form single-stranded linear fragments (e.g., ranging in length from about 50 to about 600 nucleotides). Treatment typically entails fragmentation, such as by chemical fragmentation, enzymatic fragmentation, or mechanical fragmentation, followed by denaturation to produce single-stranded DNA fragments. In embodiments, the template polynucleotide includes an adapter. The adaptor may have other functional elements including tagging sequences (i.e., a barcode), attachment sequences, palindromic sequences, restriction sites, sequencing primer binding sites, functionalization sequences, and the like. Barcodes can be of any of a variety of lengths. In embodiments, the primer includes a barcode that is 10-50, 20-30, or 4-12 nucleotides in length. In embodiments, the adapter includes a primer binding sequence that is complementary to at least a portion of a primer (e.g., a sequencing primer). Primer binding sites can be of any suitable length. In embodiments, a primer binding site is about or at least about 10, 15, 20, 25, 30, or more nucleotides in length. In embodiments, a primer binding site is 10-50, 15-30, or 20-25 nucleotides in length.

In embodiments, the template polynucleotide (and the resulting amplification products) includes known adaptor sequences on the 5' and 3' ends. In embodiments, the template polynucleotide includes known adaptor sequences on the 5' and 3' ends. In embodiments, the double-stranded amplification products include known adaptor sequences on the 5' and 3' ends.

In an aspect is provided a method of amplifying a template polynucleotide including: i) contacting a solid support with an annealing solution at a first temperature, wherein the solid support includes a plurality of immobilized primers wherein one or more of the immobilized primers is annealed to a template polynucleotide; ii) contacting the solid support with an extension solution; iii) contacting the solid support with a chemical denaturant at a second temperature, wherein the second temperature is higher than the first temperature; iv) repeating steps i) to iii) to amplify the template polynucleotide. Thus, in embodiments, amplifying includes a plurality of cycles of strand denaturation, primer hybridization, and primer extension.

In an aspect is provided a method of amplifying a template polynucleotide including: i) contacting a solid support with an annealing solution at a first temperature, wherein the solid support includes a plurality of immobilized primers wherein one or more of the immobilized primers is annealed to a template polynucleotide; ii) contacting the solid support with an extension solution; iii) contacting the solid support with a chemical denaturant at a second temperature, wherein the second temperature is 12° C. to 18° C. higher than the first temperature; iv) repeating steps i) to iii) to amplify the template polynucleotide.

In embodiments, prior to contacting the solid support with an extension solution, the method includes contacting the solid support with oxygen. In embodiments, prior to contacting the solid support with a chemical denaturant, the method includes contacting the solid support with oxygen. In embodiments, prior to contacting the solid support with an annealing solution, the method includes contacting the solid support with oxygen.

In embodiments, contacting the solid support with an extension solution occurs at the first temperature and remains in contact with the solid support as the temperature is increased to the second temperature. In embodiments, contacting the solid support with a chemical denaturant occurs at the second temperature and remains in contact with the solid support as the temperature is decreased to the first temperature.

In embodiments, the method further includes removing one or more immobilized primers. In embodiments, following extension of the immobilized primers, the method further includes removing one or more non-extended immobilized primers (i.e., immobilized primers that do not contain an extension of the template polynucleotide or complement template polynucleotide), which may be referred to as unused primers. In embodiments, following amplification of a template polynucleotide, the method includes removing immobilized primers that do not contain a first or second strand (i.e., removing the unused primers). Methods of removing immobilized primers can include digestion using an enzyme with exonuclease activity (e.g., an exonuclease). In embodiments, removing the immobilized primers includes contacting one or more immobilized primers with an exonuclease. In embodiments, removing the one or mores immobilized primers is performed using an enzyme with 3'-5' exonuclease activity (e.g., exonuclease I, exonuclease III, exonuclease V, phi29). In embodiments, the enzyme with 3'-5' exonuclease activity is phi29 polymerase, or a mutant thereof. Removing unused primers may serve to increase the free volume and allow for greater accessibility of the invasion primer. Removal of unused primers may also prevent opportunities for the newly released first strand to rehybridize to an available surface primer, producing a priming site off the available surface primer, thereby facilitating the "reblocking" of the released first strand. In embodiments, the exonuclease is a DNA polymerase, lambda exonuclease, Exo I, Exo III, T5, Exo V, or Exo VII In embodiments, the method further includes detecting the amplification products (e.g., the immobilized template polynucleotide and immobilized complementary template polynucleotide). In embodiments, the method further includes sequencing the amplification products. In embodiments, the sequencing includes sequencing-by-synthesis, sequencing by ligation, or pyrosequencing. In embodiments, sequencing includes generating a sequencing read. In embodiments, generating a sequencing read includes executing a plurality of sequencing cycles, each cycle including extending the sequencing primer by incorporating a nucleotide or nucleotide analogue using a polymerase and detecting a characteristic signature indicating that the nucleotide or nucleotide analogue has been incorporated (e.g., detecting the fluorophore of an incorporated modified nucleotide).

In embodiments, the method includes sequencing the first and/or the second strand of a double-stranded amplification product by extending a sequencing primer hybridized thereto. A variety of sequencing methodologies can be used such as sequencing-by-synthesis (SBS), pyrosequencing, sequencing by ligation (SBL), or sequencing by hybridization (SBH). Pyrosequencing detects the release of inorganic pyrophosphate (PPi) as particular nucleotides are incorporated into a nascent nucleic acid strand (Ronaghi, et al., Analytical Biochemistry 242(1), 84-9 (1996); Ronaghi, Genome Res. 11(1), 3-11 (2001); Ronaghi et al. Science 281(5375), 363 (1998); U.S. Pat. Nos. 6,210,891; 6,258,568; and 6,274,320, each of which is incorporated herein by reference in its entirety). In pyrosequencing, released PPi can be detected by being converted to adenosine triphosphate (ATP) by ATP sulfurylase, and the level of ATP generated can be detected via light produced by luciferase. In this manner, the sequencing reaction can be monitored via a luminescence detection system. In both SBL and SBH methods, target nucleic acids, and amplicons thereof, that are present at features of an array are subjected to repeated cycles of oligonucleotide delivery and detection. SBL methods, include those described in Shendure et al. Science 309:1728-1732 (2005); U.S. Pat. Nos. 5,599,675; and 5,750, 341, each of which is incorporated herein by reference in its entirety; and the SBH methodologies are as described in Bains et al., Journal of Theoretical Biology 135(3), 303-7 (1988); Drmanac et al., Nature Biotechnology 16, 54-58 (1998); Fodor et al., Science 251(4995), 767-773 (1995); and WO 1989/10977, each of which is incorporated herein by reference in its entirety.

In SBS, extension of a nucleic acid primer along a nucleic acid template is monitored to determine the sequence of nucleotides in the template. The underlying chemical process can be catalyzed by a polymerase, wherein fluorescently labeled nucleotides are added to a primer (thereby extending the primer) in a template dependent fashion such that detection of the order and type of nucleotides added to the primer can be used to determine the sequence of the template. A plurality of different nucleic acid fragments that have been attached at different locations of an array can be subjected to an SBS technique under conditions where events occurring for different templates can be distinguished due to their location in the array. In embodiments, the sequencing step includes annealing and extending a sequencing primer to incorporate a detectable label that indicates the identity of a nucleotide in the target polynucleotide, detecting the detectable label, and repeating the extending and detecting steps. In embodiments, the methods include sequencing one or more bases of a target nucleic acid by extending a sequencing primer hybridized to a target nucleic acid (e.g., an amplification product produced by the amplification methods described herein). In embodiments, the sequencing step may be accomplished by a sequencing-by-synthesis (SBS) process. In embodiments, sequencing includes a sequencing by synthesis process, where individual nucleotides are identified iteratively, as they are polymerized to form a growing complementary strand. In embodiments, nucleotides added to a growing complementary strand include both a label and a reversible chain terminator that prevents further extension, such that the nucleotide may be identified by the label before removing the terminator to add and identify a further nucleotide. Such reversible chain terminators include removable 3' blocking groups, for example as described in U.S. Pat. Nos. 10,738, 072, 7,541,444 and 7,057,026. Once such a modified nucleotide has been incorporated into the growing polynucleotide chain complementary to the region of the template being sequenced, there is no free 3'-OH group available to direct further sequence extension and therefore the polymerase cannot add further nucleotides. Once the identity of the base incorporated into the growing chain has been determined, the 3' block may be removed to allow addition of the next successive nucleotide. By ordering the products derived using these modified nucleotides it is possible to deduce the DNA sequence of the DNA template. Non-limiting examples of suitable labels are described in U.S. Pat. Nos. 8,178,360, 5,188,934 (4,7-dichlorofluorescein dyes); U.S. Pat. No. 5,366,860 (spectrally resolvable rhodamine dyes); U.S. Pat. No. 5,847,162 (4,7-dichlororhodamine dyes); U.S. Pat. No. 4,318,846 (ether-substituted fluorescein dyes); U.S. Pat. No. 5,800,996 (energy transfer dyes); U.S. Pat. No. 5,066,580 (xanthene dyes): U.S. Pat. No. 5,688,648 (energy transfer dyes); and the like.

Sequencing includes, for example, detecting a sequence of signals. Examples of sequencing include, but are not limited to, sequencing by synthesis (SBS) processes in which reversibly terminated nucleotides carrying fluorescent dyes are incorporated into a growing strand, complementary to the target strand being sequenced. In embodiments, the nucleotides are labeled with up to four unique fluorescent dyes. In embodiments, the nucleotides are labeled with at least two unique fluorescent dyes. In embodiments, the readout is accomplished by epifluorescence imaging. A variety of sequencing chemistries are available, non-limiting examples of which are described herein.

In embodiments, generating a first sequencing read or a second sequencing read includes sequencing-by-binding (see, e.g., U.S. Pat. Pubs. US2017/0022553 and US2019/0048404, each of which is incorporated herein by reference in its entirety). As used herein, "sequencing-by-binding" refers to a sequencing technique wherein specific binding of a polymerase and cognate nucleotide to a primed template nucleic acid molecule (e.g., blocked primed template nucleic acid molecule) is used for identifying the next correct nucleotide to be incorporated into the primer strand of the primed template nucleic acid molecule. The specific binding interaction need not result in chemical incorporation of the nucleotide into the primer. In some embodiments, the specific binding interaction can precede chemical incorporation of the nucleotide into the primer strand or can precede chemical incorporation of an analogous, next correct nucleotide into the primer. Thus, detection of the next correct nucleotide can take place without incorporation of the next correct nucleotide. As used herein, the "next correct nucleotide" (sometimes referred to as the "cognate" nucleotide) is the nucleotide having a base complementary to the base of the next template nucleotide. The next correct nucleotide will hybridize at the 3'-end of a primer to complement the next template nucleotide. The next correct nucleotide can be, but need not necessarily be, capable of being incorporated at the 3' end of the primer. For example, the next correct nucleotide can be a member of a ternary complex that will complete an incorporation reaction or, alternatively, the next correct nucleotide can be a member of a stabilized ternary complex that does not catalyze an incorporation reaction. A nucleotide having a base that is not complementary to the next template base is referred to as an "incorrect" (or "non-cognate") nucleotide.

Flow cells provide a convenient format for housing an array of clusters produced by the methods described herein, in particular when subjected to an SBS or other detection technique that involves repeated delivery of reagents in cycles. For example, to initiate a first SBS cycle, one or more labeled nucleotides and a DNA polymerase in a buffer, can be flowed into/through a flow cell that houses an array of clusters. The clusters of an array where primer extension causes a labeled nucleotide to be incorporated can then be detected. Optionally, the nucleotides can further include a reversible termination moiety that temporarily halts further primer extension once a nucleotide has been added to a primer. For example, a nucleotide analog having a reversible terminator moiety can be added to a primer such that subsequent extension cannot occur until a deblocking agent (e.g., a reducing agent) is delivered to remove the moiety. Thus, for embodiments that use reversible termination, a deblocking reagent (e.g., a reducing agent) can be delivered to the flow cell (before, during, or after detection occurs). Washes can be carried out between the various delivery steps as needed. The cycle can then be repeated N times to extend the primer by N nucleotides, thereby detecting a sequence of length N. Example SBS procedures, fluidic systems and detection platforms that can be readily adapted for use with an array produced by the methods of the present disclosure are described, for example, in Bentley et al., Nature 456: 53-59 (2008), US Patent Publication 2018/0274024, WO 2017/205336, US Patent Publication 2018/0258472, each of which are incorporated herein in their entirety for all purposes.

Use of the sequencing method outlined above is a non-limiting example, as essentially any sequencing methodology which relies on successive incorporation of nucleotides into a polynucleotide chain can be used. Suitable alternative techniques include, for example, pyrosequencing methods, FISSEQ (fluorescent in situ sequencing), MPSS (massively parallel signature sequencing), or sequencing by ligation-based methods.

In embodiments, generating a sequencing read includes determining the identity of the nucleotides in the template polynucleotide (or complement thereof). In embodiments, a sequencing read, e.g., a first sequencing read or a second sequencing read, includes determining the identity of a portion (e.g., 1, 2, 5, 10, 20, 50 nucleotides) of the total template polynucleotide. In embodiments the first sequencing read determines the identity of 5-10 nucleotides and the second sequencing read determines the identity of more than 5-10 nucleotides (e.g., 11 to 200 nucleotides). In embodiments the first sequencing read determines the identity of more than 5-10 nucleotides (e.g., 11 to 200 nucleotides) and the second sequencing read determines the identity of 5-10 nucleotides.

In embodiments, the sequencing method relies on the use of modified nucleotides that can act as reversible reaction terminators. Once the modified nucleotide has been incorporated into the growing polynucleotide chain complementary to the region of the template being sequenced there is no free 3'-OH group available to direct further sequence extension and therefore the polymerase cannot add further nucleotides. Once the identity of the base incorporated into the growing chain has been determined, the 3' reversible terminator may be removed to allow addition of the next successive nucleotide. These such reactions can be done in a single experiment if each of the modified nucleotides has attached a different label, known to correspond to the particular base, to facilitate discrimination between the bases added at each incorporation step. Alternatively, a separate reaction may be carried out containing each of the modified nucleotides separately.

The modified nucleotides may carry a label (e.g., a fluorescent label) to facilitate their detection. Each nucleotide type may carry a different fluorescent label. However, the detectable label need not be a fluorescent label. Any label can be used which allows the detection of an incorporated nucleotide. One method for detecting fluorescently labeled nucleotides includes using laser light of a wavelength specific for the labeled nucleotides, or the use of other suitable sources of illumination. The fluorescence from the label on the nucleotide may be detected (e.g., by a CCD camera or other suitable detection means).

In embodiments, the methods of sequencing a nucleic acid include extending a complementary polynucleotide (e.g., a primer) that is hybridized to the nucleic acid by incorporating a first nucleotide. In embodiments, the method includes a buffer exchange or wash step. In embodiments, the methods of sequencing a nucleic acid include a sequencing solution. The sequencing solution includes (a) an adenine nucleotide, or analog thereof; (b) (i) a thymine nucleotide, or analog thereof, or (ii) a uracil nucleotide, or analog thereof; (c) a cytosine nucleotide, or analog thereof and (d) a guanine nucleotide, or analog thereof.

In embodiments, the amplification primer and the sequencing primer includes an oligonucleotide, either natural or synthetic, that is capable, upon forming a duplex with a polynucleotide template, of acting as a point of initiation of nucleic acid synthesis and being extended from its 3' end along the template so that an extended duplex is formed. The sequence of nucleotides added during the extension process is determined by the sequence of the template polynucleotide. Primers (e.g., amplification primer or sequencing primer) include nucleotides ranging from 17 to 30 nucleotides. In embodiments, the primer is at least 17 nucleotides, or alternatively, at least 18 nucleotides, or alternatively, at least 19 nucleotides, or alternatively, at least 20 nucleotides, or alternatively, at least 21 nucleotides, or alternatively, at least 22 nucleotides, or alternatively, at least 23 nucleotides, or alternatively, at least 24 nucleotides, or alternatively, at least 25 nucleotides, or alternatively, at least 26 nucleotides, or alternatively, at least 27 nucleotides, or alternatively, at least 28 nucleotides, or alternatively, at least 29 nucleotides, or alternatively, at least 30 nucleotides, or alternatively at least 50 nucleotides, or alternatively at least 75 nucleotides or alternatively at least 100 nucleotides.

III. Compositions, Devices, & Kits

In an aspect is provided an annealing solution (alternatively referred to herein as a hybridization buffer or hybridization solution). In embodiments, the annealing solution includes an aqueous solution which may contain buffers (e.g., saline-sodium citrate (SSC), tris(hydroxymethyl) aminomethane or "Tris"), aqueous salts (e.g., KCl or $(NH_4)_2SO_4$)), chelating agents (e.g., EDTA), detergents, surfactants, crowding agents, or stabilizers (e.g., PEG, Tween-20, BSA). In embodiments, the annealing solution includes Tris and is maintained at a pH from about 8.0 to about 9.0. In embodiments, the annealing solution includes Tris, Tris-HCl, Tricine, Bicine, Bis-Tris propane, HEPES, MES, MOPS, MOPSO, BES, TES, CAPS, TAPS, TAPSO, ACES, PIPES, ethanolamine (2-amino methanol; MEA), a citrate compound, and/or a citrate mixture. In embodiments, the annealing solution includes EDTA (ethylenediaminetetraacetic acid), EGTA (ethylene glycol tetraacetic acid), HEDTA (hydroxyethylethylenediaminetriacetic acid), DPTA (diethylene triamine pentaacetic acid), NTA (N,N-bis (carboxymethyl)glycine), citrate anhydrous, sodium citrate, calcium citrate, ammonium citrate, ammonium bicitrate, citric acid, potassium citrate, or magnesium citrate. In some embodiments, the extension solution includes a chelating agent at a concentration of about 0.01-50 mM, or about 0.1-20 mM, or about 0.2-10 mM.

In an aspect is provided an extension solution. In embodiments, the extension solution includes an aqueous solution which may contain buffers (e.g., saline-sodium citrate (SSC), tris(hydroxymethyl)aminomethane or "Tris"), aqueous salts (e.g., KCl or $(Mg)_2SO_4$)), nucleotides, polymerases, detergents, chelators (e.g., EDTA), surfactants, crowding agents, or stabilizers (e.g., PEG, Tween-20, BSA). In embodiments, the extension solution includes Tris, Tris-HCl, Tricine, Bicine, Bis-Tris propane, HEPES, MES, MOPS, MOPSO, BES, TES, CAPS, TAPS, TAPSO, ACES, PIPES, ethanolamine (2-amino methanol; MEA), a citrate compound, and/or a citrate mixture. In embodiments, the extension solution includes EDTA (ethylenediaminetetraacetic acid), EGTA (ethylene glycol tetraacetic acid), HEDTA (hydroxyethylethylenediaminetriacetic acid), DPTA (diethylene triamine pentaacetic acid), NTA (N,N-bis (carboxymethyl)glycine), citrate anhydrous, sodium citrate, calcium citrate, ammonium citrate, ammonium bicitrate, citric acid, potassium citrate, or magnesium citrate. In some embodiments, the extension solution includes a chelating agent at a concentration of about 0.01-50 mM, or about 0.1-20 mM, or about 0.2-10 mM.

In an aspect is provided a chemical denaturant (e.g., a chemical denaturant as described herein). In embodiments, the chemical denaturant is formamide. In embodiments, the chemical denaturant is NaOH. In embodiments, the method includes contacting the polynucleotide with 100% formamide at a temperature of about 65° C. for about 1-3 minutes, and washing with a reagent comprising about 50 mM NaCl or equivalent ionic strength and having a pH of about 6.5-8.5.

In embodiments, the annealing solution includes a buffered solution including salts (e.g., NaCl or KCl), a surfactant (e.g., Triton X-100 or Tween), and, optionally, a chelator. In embodiments, the annealing solution has a pH of about 7.5, 8.0, 8.2, 8.4, 8.6, 8.8, or 9.0. In embodiments, the annealing solution includes NaCl or KCl, Tris (e.g., pH 8.0), Triton X-100, and a chelator (e.g., EDTA). In embodiments, the annealing solution includes NaCl, Tris (e.g., pH 8.5), Triton X-100, and a chelator (e.g., EDTA). In embodiments, the annealing solution includes NaCl, Tris (e.g., pH 8.8), Triton X-100, and a chelator (e.g., EDTA). In embodiments, the annealing solution includes NaCl or KCl, Tris (e.g., pH 8.0), Tween-20, and a chelator (e.g., EDTA). In embodiments, the annealing solution includes NaCl, Tris (e.g., pH 8.5), Tween-20, and a chelator (e.g., EDTA). In embodiments, the annealing solution includes NaCl, Tris (e.g., pH 8.8), Tween-20, and a chelator (e.g., EDTA). In embodiments, the annealing solution includes 3 M NaCl, 0.1 M Tris-HCl (pH 6.8), 0.1 M $NaPO_4$ buffer (pH 6.8), and 50 mM EDTA. In embodiments, the annealing solution includes formamide. In embodiments, the annealing solution includes dextran sulfate. In embodiments, the annealing solution includes 140 mM HEPES, pH 8,0, containing 1% SDS, 1.7 M NaCl, 7×Denhardt's solution, 0.2 mM EDTA, and 3% PEG. In embodiments, the annealing solution includes acetonitrile at 25-50% by volume, formamide at 5-10% by volume; 2-(N-morpholino)ethanesulfonic acid (MES); and polyethylene glycol (PEG) at 5-35%. In some embodiments, the annealing solution further includes betaine.

In embodiments, extending is performed in the presence of an extension solution. In embodiments, the extension solution includes a buffered solution including salts (e.g., NaCl or KCl), a surfactant (e.g., Triton X-100 or Tween-20), and a chelator. In embodiments, the extension solution includes nucleotides and a polymerase (e.g., a polymerase as described herein). In embodiments, the polymerase is a strand-displacing polymerase as described herein. In embodiments, the extension solution includes about 0.5, about 1, about 2, about 3, about 4, about 5, about 6, about 7, about 8, about 9, about 10, about 11, about 12, about 13, about 14, or about 15 mM $Mg^{2+}$. In embodiments, the extension solution includes a dNTP mixture including dATP, dCTP, dGTP and dTTP (for DNA amplification) or dATP, dCTP, dGTP and dUTP (for RNA amplification). In embodiments, the extension solution has a pH of about 7.5, 8.0, 8.2, 8.4, 8.6, 8.8, or 9.0. In embodiments, the extension solution includes Tris-HCl (e.g., pH 8.0), salt (e.g, NaCl or KCl), MgSO4, a surfactant (e.g., Tween-20 or Triton X-100), dNTPs, BstLF, betaine (e.g., between about 0 to about 3.5M betaine), and/or DMSO (e.g., between about 0% to about 12% DMSO). In embodiments, the extension solution includes bicine (e.g., pH 8.5), salt (e.g., NaCl or KCl), MgSO4, a surfactant (e.g., Tween-20 or Triton X-100), dNTPs, BstLF, (e.g., between about 0 to about 3.5M betaine), and/or DMSO (e.g., between about 0% to about 12% DMSO).

In embodiments, the annealing solution and/or the extension solution includes a buffer such as, phosphate buffered saline (PBS), succinate, citrate, histidine, acetate, Tris, TAPS, MOPS, PIPES, HEPES, MES, and the like. The choice of appropriate buffer will generally be dependent on the target pH of the annealing solution and/or the extension solution. In general, the desired pH of the buffer solution will range from about pH 4 to about pH 8.4. In some embodiments, the buffer pH may be at least 4.0, at least 4.5, at least 5.0, at least 5.5, at least 6.0, at least 6.2, at least 6.4, at least 6.6, at least 6.8, at least 7.0, at least 7.2, at least 7.4, at least 7.6, at least 7.8, at least 8.0, at least 8.2, or at least 8.4. In some embodiments, the buffer pH may be at most 8.4, at most 8.2, at most 8.0, at most 7.8, at most 7.6, at most 7.4, at most 7.2, at most 7.0, at most 6.8, at most 6.6, at most 6.4, at most 6.2, at most 6.0, at most 5.5, at most 5.0, at most 4.5, or at most 4.0. Any of the lower and upper values described in this paragraph may be combined to form a range included within the present disclosure, for example, in some instances, the desired pH may range from about 6.4 to about 7.2. Those of skill in the art will recognize that the buffer pH may have any value within this range, for example, about 7.25.

Suitable detergents for use in the annealing solution and/or the extension solution include, but are not limited to, zwitterionic detergents (e.g., 1-Dodecanoyl-sn-glycero-3-phosphocholine, 3-(4-tert-Butyl-1-pyridinio)-1-propanesulfonate, 3-(N,N-Dimethylmyristylammonio)propanesulfonate, 3-(N,NDimethylmyristylammonio) propanesulfonate, ASB-C80, C7BzO, CHAPS, CHAPS hydrate, CHAPSO, DDMAB, Dimethylethylammoniumpropane sulfonate, N,N-Dimethyldodecylamine Noxide, N-Dodecyl-N,N-dimethyl-3-ammonio-1-propanesulfonate, or N-Dodecyl-N,N-dimethyl-3-ammonio-1-propanesulfonate) and anionic, cationic, and non-ionic detergents. Examples of nonionic detergents include poly(oxyethylene) ethers and related polymers (e.g. Brij®, TWEEN®, TWEEN®-20, TRITON®, TRITON X-100 and IGEPAL® CA-630), bile salts, and glycosidic detergents. In embodiments, the annealing solution and/or the extension solution include antioxidants and reducing agents, carbohydrates, BSA, polyethylene glycol, dextran sulfate, betaine, other additives.

In embodiments, the detergent is Triton X-100, Tween 20, Tween 80 or Nonidet P-40. In some embodiments, the detergent includes a zwitterionic detergent such as CHAPS (3-[(3-cholamidopropyl)dimethylammonio]-1-propanesulfonate) or N-Dodecyl-N,N-dimethyl-3-amonio-1-propanesulfate (DetX). In embodiments, the detergent comprises LDS (lithium dodecyl sulfate), sodium taurodeoxycholate, sodium taurocholate, sodium glycocholate, sodium deoxycholate or sodium cholate. In embodiments, the detergent is included at a concentration of about 0.01-0.05%, or about 0.05-0.1%, or about 0.1-0.15%, or about 0.15-0.2%, or about 0.2-0.25%.

In an aspect is provided a wash solution. In embodiments, the wash solution is at a pH from pH 7.5 to pH 9.0. In embodiments, the wash solution includes a chelator. In embodiments, the wash solution includes a surfactant. In embodiments, the wash includes Tris-HCl, pH 8.5, containing SDS, EDTA, and NaCl. The wash solution can include SSC (e.g., at any concentration of about 1-5×) and a detergent (e.g., Tween-20 or Triton X-100).

In embodiments, the wash solution includes Tris, Tris-HCl, Tricine, Bicine, Bis-Tris propane, HEPES, MES, MOPS, MOPSO, BES, TES, CAPS, TAPS, TAPSO, ACES, PIPES, ethanolamine (2-amino methanol; MEA), a citrate compound, a citrate mixture, NaOH and/or KOH. In embodiments, the pH buffering agent can be present in the wash solution at a concentration of about 1-100 mM, or about 10-50 mM, or about 10-25 mM. In embodiments, the pH of solutions described here in can be adjusted to a pH of about 4-9, or a pH of about 5-9, or a pH of about 5-8.

In embodiments, the metal chelating agent (i.e., a chelator) in the wash solution includes EDTA (ethylenediaminetetraacetic acid), EGTA (ethylene glycol tetraacetic acid), HEDTA (hydroxyethylethylenediaminetriacetic acid), DPTA (diethylene triamine pentaacetic acid), NTA (N,N-bis (carboxymethyl)glycine), citrate anhydrous, sodium citrate, calcium citrate, ammonium citrate, ammonium bicitrate, citric acid, potassium citrate, or magnesium citrate. In some embodiments, the wash solution includes a chelating agent at a concentration of about 0.01-50 mM, or about 0.1-20 mM, or about 0.2-10 mM.

In some embodiments, the salt in the wash solution includes NaCl, KCl, NH2SO4 or potassium glutamate. In some embodiments, the detergent includes an ionic detergent such as SDS (sodium dodecyl sulfate). The wash solution can include a monovalent salt at a concentration of about 25-500 mM, or about 50-250 mM, or about 100-200 mM. In embodiments, the detergent in the wash solution includes a non-ionic detergent such as Triton X-100, Tween 20, Tween 80 or Nonidet P-40. In embodiments, the detergent includes a zwitterionic detergent such as CHAPS (3-[(3-cholamidopropyl)dimethylammonio]-1-propanesulfonate) or N-Dodecyl-N,N-dimethyl-3-amonio-1-propanesulfate (DetX). In some embodiments, the detergent comprises LDS (lithium dodecyl sulfate), sodium taurodeoxycholate, sodium taurocholate, sodium glycocholate, sodium deoxycholate or sodium cholate. In some embodiments, the detergent is included in the wash solution at a concentration of about 0.01-0.05%, or about 0.05-0.1%, or about 0.1-0.15%, or about 0.15-0.2%, or about 0.2-0.25%. In embodiments, the wash solution includes SSC (e.g., at any concentration of about 1-5×) and a detergent (e.g., Tween-20 or Triton X-100).

In an aspect is provided a kit containing the component necessary to perform the methods as described herein, including embodiments. Generally, the kit includes one or more containers providing a composition, and one or more additional reagents (e.g., a buffer suitable for polynucleotide extension). The kit may also include a template nucleic acid (DNA and/or RNA), one or more primer polynucleotides, nucleotides (including, e.g., deoxyribonucleotides, ribonucleotides, labeled nucleotides, and/or modified nucleotides), buffers, salts, and/or labels (e.g., fluorophores). In embodiments, the kit further includes instructions. In embodiments the kit includes one or more enclosures (e.g., boxes, bottles, or cartridges) containing the relevant reaction reagents and/or supporting materials.

Adapters and/or primers may be supplied in the kits ready for use, as concentrates-requiring dilution before use, or in a lyophilized or dried form requiring reconstitution prior to use. If required, the kits may further include a supply of a suitable diluent for dilution or reconstitution of the primers and/or adapters. Optionally, the kits may further include supplies of reagents, buffers, enzymes, and dNTPs for use in carrying out nucleic acid amplification and/or sequencing. Further components which may optionally be supplied in the kit include sequencing primers suitable for sequencing templates prepared using the methods described herein.

In an aspect is provided a kit, including the solid support as described herein. Generally, the kit includes one or more containers providing a composition and one or more additional reagents (e.g., a buffer suitable for polynucleotide extension). The kit may also include a template nucleic acid (DNA and/or RNA), one or more primer polynucleotides, nucleoside triphosphates (including, e.g., deoxyribonucleotides, ribonucleotides, particles, labeled nucleotides, and/or modified nucleotides), buffers, salts, and/or labels (e.g., fluorophores). In embodiments, the kit includes an array with particles already loaded into the wells. In embodiments, the particles are in a container. In embodiments, the particles are in aqueous suspension or as a powder within the container. The container may be a storage device or other readily usable vessel capable of storing and protecting the particles. The kit may also include a flow cell. In embodiments, kit includes the solid support and a flow cell carrier (e.g., a flow cell carrier as described in US 2021/0190668, which is incorporated herein by reference for all purposes).

In embodiments, the kit includes a sequencing polymerase, and/or one or more amplification polymerases. In embodiments, the sequencing polymerase is capable of incorporating modified nucleotides. In embodiments, the polymerase is a DNA polymerase. In embodiments, the DNA polymerase is a Pol I DNA polymerase, Pol II DNA polymerase, Pol III DNA polymerase, Pol IV DNA polymerase, Pol V DNA polymerase, Pol β DNA polymerase, Pol μ DNA polymerase, Pol ζ DNA polymerase, Pol σ DNA polymerase, Pol α DNA polymerase, Pol δ DNA polymerase, Pol ε DNA polymerase, Pol η DNA polymerase, Pol ι DNA polymerase, Pol κ DNA polymerase, Pol ζ DNA polymerase, Pol γ DNA polymerase, Pol θ DNA polymerase, Pol υ DNA polymerase, or a thermophilic nucleic acid polymerase (e.g., Terminator γ, 9° N polymerase (exo-), Terminator II, Terminator III, or Terminator IX). In embodiments, the DNA polymerase is a thermophilic nucleic acid polymerase. In embodiments, the DNA polymerase is a modified archaeal DNA polymerase. In embodiments, the polymerase is a reverse transcriptase. In embodiments, the polymerase is a mutant $P.$ $abyssi$ polymerase (e.g., such as a mutant $P.$ $abyssi$ polymerase described in WO 2018/148723 or WO 2020/056044, each of which are incorporated herein by reference for all purposes). In embodiments, the kit includes a strand-displacing polymerase. In embodiments, the kit includes a strand-displacing polymerase, such as a phi29 polymerase, Bst polymerase (e.g., Bst Lf), phi29 mutant polymerase or a thermostable phi29 mutant polymerase. In embodiments, the kit further includes instructions for use thereof. In embodiments, kits described herein include a polymerase. In embodiments, the polymerase is a DNA polymerase. In embodiments, the DNA polymerase is a thermophilic nucleic acid polymerase. In embodiments, the DNA polymerase is a modified archaeal DNA polymerase. In embodiments, the kit includes a sequencing solution. In embodiments, the sequencing solution include labeled nucleotides including differently labeled nucleotides, wherein the label (or lack thereof) identifies the type of nucleotide. For example, each adenine nucleotide, or analog thereof; a thymine nucleotide; a cytosine nucleotide, or analog thereof; and a guanine nucleotide, or analog thereof may be labeled with a different fluorescent label. In embodiments, the kit includes a modified terminal deoxynucleotidyl transferase (TdT) enzyme.

In embodiments, the kit includes a buffered solution. Typically, the buffered solutions contemplated herein are made from a weak acid and its conjugate base or a weak base and its conjugate acid. For example, sodium acetate and acetic acid are buffer agents that can be used to form an acetate buffer. Other examples of buffer agents that can be used to make buffered solutions include, but are not limited to, Tris, bicine, tricine, HEPES, TES, MOPS, MOPSO and PIPES. Additionally, other buffer agents that can be used in enzyme reactions, hybridization reactions, and detection reactions are known in the art. In embodiments, the buffered solution can include Tris. With respect to the embodiments described herein, the pH of the buffered solution can be modulated to permit any of the described reactions. In some embodiments, the buffered solution can have a pH greater than pH 7.0, greater than pH 7.5, greater than pH 8.0, greater than pH 8.5, greater than pH 9.0, greater than pH 9.5, greater than pH 10, greater than pH 10.5, greater than pH 11.0, or greater than pH 11.5. In other embodiments, the buffered solution can have a pH ranging, for example, from about pH 6 to about pH 9, from about pH 8 to about pH 10, or from about pH 7 to about pH 9. In embodiments, the buffered solution can include one or more divalent cations. Examples of divalent cations can include, but are not limited to, $Mg^{2+}$, $Mn^{2+}$, $Zn^{2+}$, and $Ca^{2+}$. In embodiments, the buffered solution can contain one or more divalent cations at a concentration sufficient to permit hybridization of a nucleic acid. In embodiments, the kit includes an annealing solution, an extension solution, and a chemical denaturant.

In an aspect is provided a microfluidic device, wherein the microfluidic device is capable of performing any of the methods described herein, including embodiments. The microfluidic device is applicable for amplifying, processing, and/or detecting samples of analytes of interest in a flow cell. Within this application the fluidic system is made in reference to nucleic acid sequencing (i.e., a genomic instrument) which allows for the sequencing of nucleic acid molecules. However, the techniques disclosed herein may be applied to any system making use of reaction vessels, such as flow cells, for detection of analytes of interest, and into which solutions are introduced during preparation, reaction, detection, or any other process on or within the reaction vessel. The term "microfluidic device" means an integrated system of one or more chambers, ports, and channels that are interconnected and in fluid communication and designed for carrying out an analytical reaction or process, either alone or in cooperation with an appliance or instrument that provides support functions, such as sample introduction, fluid and/or reagent driving means, temperature control, detection systems, data collection and/or integration systems, for the purpose of determining the nucleic acid sequence of a template polynucleotide. In embodiments, the device includes a light source that illuminates a sample, an objective lens, and a sensor array (e.g., complementary metal-oxide-semiconductor (CMOS) array or a charge-coupled device (CCD) array). Nucleic acid sequencing devices may further include valves, pumps, and specialized functional coatings on interior walls. For example, the microfluidic device is a nucleic acid sequencing device provided by Singular Genomics™ such as the G4™ sequencing platform, Illumina™, Inc. (e.g. HiSeq™, MiSeq™, NextSeq™, or NovaSeq™ systems), Life Technologies™ (e.g. ABI PRISM™, or SOLiD™ systems), Pacific Biosciences (e.g. systems using SMRT™ Technology such as the Sequel™ or RS II™ systems), or Qiagen (e.g. Genereader™ system). Nucleic acid sequencing devices may further include fluidic reservoirs (e.g., bottles), valves, pressure sources, pumps, sensors, control systems, valves, pumps, and specialized functional coatings on interior walls. In embodiments, the device includes a plurality of a sequencing reagent reservoirs and a plurality of clustering reagent reservoirs. In embodiments, the clustering reagent reservoir includes amplification reagents (e.g., an aqueous buffer containing enzymes, salts, and nucleotides, denaturants, crowding agents, etc.) In embodiments, the reservoirs include sequencing reagents (such as an aqueous buffer containing enzymes, salts, and nucleotides); a wash solution (an aqueous buffer); a cleave solution (an aqueous buffer containing a cleaving agent, such as a reducing agent); or a cleaning solution (a dilute bleach solution, dilute NaOH solution, dilute HCl solution, dilute antibacterial solution, or water). The fluid of each of the reservoirs can vary. The fluid can be, for example, an aqueous solution which may contain buffers (e.g., saline-sodium citrate (SSC), ascorbic acid, tris(hydroxymethyl)aminomethane or "Tris"), aqueous salts (e.g., KCl or $(NH_4)_2SO_4$)), nucleotides, polymerases, cleaving agent (e.g., tri-n-butyl-phosphine, triphenyl phosphine and its sulfonated versions (i.e., tris(3-sulfophenyl)-phosphine, TPPTS), and tri(carboxyethyl)phosphine (TCEP) and its salts, cleaving agent scavenger compounds (e.g., 2'-Dithiobisethanamine or 11-Azido-3,6,9-trioxaundecane-1-amine), chelating agents (e.g., EDTA), detergents, surfactants, crowding agents, or stabilizers (e.g., PEG, Tween, BSA). Non-limited examples of reservoirs include cartridges, pouches, vials, containers, and eppendorf tubes. In embodiments, the device is configured to perform fluorescent imaging. In embodiments, the device includes one or more light sources (e.g., one or more lasers). In embodiments, the illuminator or light source is a radiation source (i.e., an origin or generator of propagated electromagnetic energy) providing incident light to the sample. A radiation source can include an illumination source producing electromagnetic radiation in the ultraviolet (UV) range (about 200 to 390 nm), visible (VIS) range (about 390 to 770 nm), or infrared (IR) range (about 0.77 to 25 microns), or other range of the electromagnetic spectrum. In embodiments, the illuminator or light source is a lamp such as an arc lamp or quartz halogen lamp. In embodiments, the illuminator or light source is a coherent light source. In embodiments, the light source is a laser, LED (light emitting diode), a mercury or tungsten lamp, or a super-continuous diode. In embodiments, the light source provides excitation beams having a wavelength between 200 nm to 1500 nm. In embodiments, the laser provides excitation beams having a wavelength of 405 nm, 470 nm, 488 nm, 514 nm, 520 nm, 532 nm, 561 nm, 633 nm, 639 nm, 640 nm, 800 nm, 808 nm, 912 nm, 1024 nm, or 1500 nm. In embodiments, the illuminator or light source is a light-emitting diode (LED). The LED can be, for example, an Organic Light Emitting Diode (OLED), a Thin Film Electroluminescent Device (TFELD), or a Quantum dot based inorganic organic LED. The LED can include a phosphorescent OLED (PHOLED). In embodiments, the nucleic acid sequencing device includes an imaging system (e.g., an imaging system as described herein). The imaging system capable of exciting one or more of the identifiable labels (e.g., a fluorescent label) linked to a nucleotide and thereafter obtain image data for the identifiable labels. The image data (e.g., detection data) may be analyzed by another component within the device. The imaging system may include a system described herein and may include a fluorescence spectrophotometer including an objective lens and/or a solid-state imaging device. The solid-state imaging device may include a charge coupled device (CCD) and/or a complementary metal oxide semiconductor (CMOS). The system may also include circuitry and processors, including systems using microcontrollers, reduced instruction set computers (RISC), application specific integrated circuits (ASICs), field programmable gate array (FPGAs), logic circuits, and any other circuit or processor capable of executing functions described herein. The set of instructions may be in the form of a software program. As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. In embodiments, the device includes a thermal control assembly useful to control the temperature of the reagents.

EXAMPLES

Example 1. Thermally Assisted c-bPCR (t-bPCR)

Current SBS platforms require clonal amplification of the initial template library molecules to create clusters (i.e., polonies), each containing 100s to 10,000s of forward and reverse copies of an initial template library molecule. Cluster generation is useful for increasing the signal-to-noise ratio because typical systems are not sensitive enough to detect the extension of one base at the individual DNA template molecule level. Amplification methods employed in commercial sequencing devices typically amplify a template molecule using surface immobilized primers to produce a plurality of double-stranded nucleic acid molecules, wherein at least one strand of each double-stranded nucleic acid molecule is attached to the solid support at its 5' ends. A common method of doing solid-phase amplification involves bridge amplification methodologies (referred to as bridge PCR) as exemplified by the disclosures of U.S. Pat. Nos. 5,641,658; 7,115,400; and U.S. Patent Publ. No. 2008/0009420, each of which is incorporated herein by reference in its entirety. Bridge PCR (bPCR) involves repeated polymerase chain reaction cycles, cycling between denaturation, annealing, and extension conditions and enables controlled, spatially-localized, amplification, to generate amplification products (e.g., amplicons) immobilized on a solid support in order to form arrays comprised of colonies (or "clusters") of immobilized nucleic acid molecules. Each cluster or colony on such an array is formed from a plurality of identical immobilized polynucleotide strands and a plurality of identical immobilized complementary polynucleotide strands. The products of solid-phase amplification reactions are referred to as "bridged" structures when formed by annealed pairs of immobilized polynucleotide strands and immobilized complementary strands, both strands being immobilized on the solid support at the 5' end, preferably via a covalent attachment.

Cycling between denaturation, annealing, and extension conditions may include thermal changes (e.g., increasing the temperature to denature double-stranded DNA and decreasing the temperature to anneal a primer). See FIG. 1A for an illustration of the standard thermal PCR. Alternatively, amplification may include maintaining the same temperature (i.e., isothermal) and introducing a chemical denaturant to denature double-stranded DNA and removing the denaturant to anneal a primer. For example, during chemical-bridge PCR (c-bPCR), additional chemical denaturants (e.g., formamide or NaOH) may be included in the reaction mixture, in which the DNA strands are denatured. This is followed by removing the denaturant and reintroducing an extension solution (e.g., a polymerase in buffer) under suitable conditions that allow primer annealing and extension.

Conventional PCR relies on highly specific and rapid thermal cycling, commonly varying temperature by as much as 40° C. Such an amplification methodology requires expensive instrumentation in order to rapidly heat and (particularly) cool the PCR reaction mixture, in addition to accurately maintaining solution temperatures and temperature uniformity during incubation steps. Isothermal nucleic acid amplification procedures, while eliminating the need for complex thermal cycling instrumentation, often lead to more non-specific amplification compared to PCR, which leads to artifacts and consumption of reaction components in a non-productive way, making the amplicons harder to reliably use in next-generation sequencing applications.

In a PCR thermal cycling process, a thermal cycler needs to possess good temperature control to maintain temperature uniformity within the sample; for example, typical sample heating (and/or cooling) rates include at least 2° C. per second. Temperature control is typically achieved by a feedback loop system, while temperature uniformity is achieved by highly thermally conductive but bulky materials such as copper. A high heating rate is accomplished by the implementation of a proportional integrated derivative (PID) control method limited by maximum dissipated power and heat capacitance. A high cooling rate is rather difficult to achieve, and bulky systems require forced cooling by either a thermoelectric element (Wilding P et al. Clin. Chem., 1994, 40, 1815-1817) (often called a Peltier element) or by other means, such as water (Findlay J B et al. Clin. Chem., 1993, 39, 9, 1927-1933). These PCR machines are complicated and power-hungry devices. As the systems are bulky, their thermal time constants are in minutes rather than seconds which result in long transition times and unwanted by-products of the PCR.

Thermal bPCR has challenges similar to those facing conventional PCR. Generating and maintaining uniform heating to 90° C. or greater degrees is challenging in a microfluidic device. Additionally, thermal cycling, for example from 95° C. to 60-65° C., requires the amplicons to go through an intermediate temperature range (e.g., 70° C.-80° C.) in which the template strands can reanneal or partially reanneal, while being too hot for the primer to anneal to the template. This is particularly a problem for solid-phase DNA amplification, because the template strands are anchored and localized spatially, which prevents them from being able to diffuse away from each other during thermal cycling. Cooling the temperature fast enough to give the primers an opportunity to prime the template is therefore challenging. Further, sustaining large thermal changes (e.g., 30° C.-40° C.) on a solid phase while minimizing the amount of time spent on temperature ramping is also difficult.

In contrast, chemical bPCR has challenges, for example, amplification inefficiency, i.e., it is difficult to obtain a high fraction of templates that can be denatured and subsequently primed by a solid-phase amplification primer. This again is due to the nature of solid-phase amplification, since the template strands cannot diffuse away from each other, it becomes more favorable for them to reanneal as opposed to being primed by the shorter solid-phase primers.

Figure 1B:
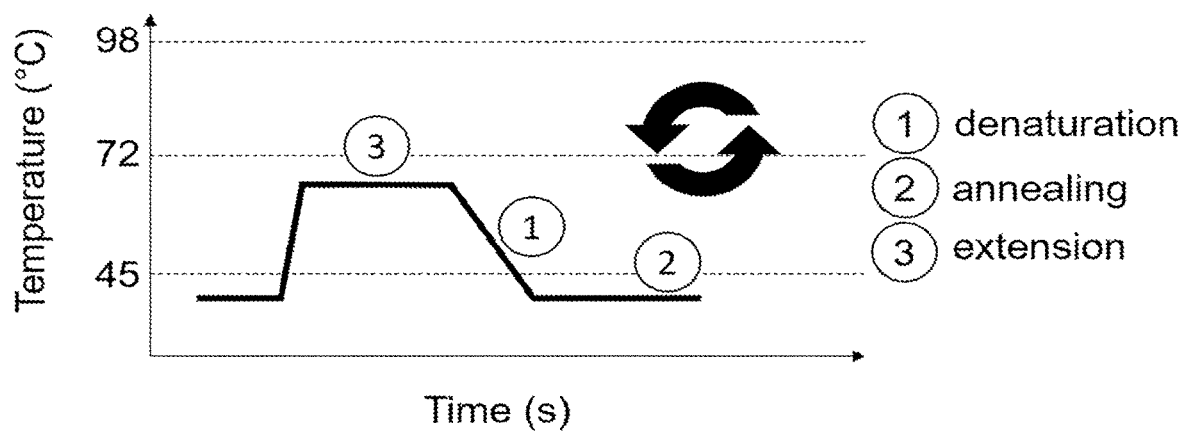

The methods described herein represent a modified version of PCR that combines both thermal cycling and chemical denaturants to facilitate optimal strand denaturation and annealing, while avoiding the challenges found with traditional thermal bPCR and chemical bPCR. As depicted in FIG. 1B, and in contrast to the traditional thermal cycling depicted in FIG. 1A, denaturation occurs at a lower temperature than extension, but at a higher temperature than annealing. For example, a substrate containing a template polynucleotide and an immobilized primer hybridized thereto is allowed to contact an extension solution at an increased temperature (e.g., 60-65° C.). The upper temperature may be tuned for optimum performance of the extension enzyme. In embodiments, the first extension cycle is subjected to different conditions than subsequent amplification cycles. For example, the initial (i.e., first) cycle of extension includes contacting the primed templates with an extension solution at a first temperature (e.g., 40° C.), followed by increasing the temperature while still in contact with the extension solution to a second temperature (e.g., 58-60° C.) that is optimal for polymerase activity. Following extension, a denaturant solution is introduced at a lower temperature. In some embodiments, the denaturant solution is introduced at a temperature above the extension temperature. If the denaturant is introduced at a higher temperature, it is then advantageous to lower the temperature before re-introducing the hybridization buffer. Suitable denaturing solutions are well known in the art (see, e.g., Sambrook, Joseph. Molecular Cloning: A Laboratory Manual. Cold Spring Harbor, N.Y.: Cold Spring Harbor Laboratory Press, 2001), such as strong alkalis (e.g., a basic chemical compound that is able to deprotonate very weak acids in an acid base reaction), strong acids, chaotropic agents. For example, NaOH, urea, or guanidine-containing compounds form new hydrogen bonds with the bases of nucleic acids, thereby disrupting hydrogen bonds that lead to Watson-Crick base pairing.

In embodiments, the denaturant is a buffered solution including betaine, dimethyl sulfoxide (DMSO), ethylene glycol, formamide, glycerol, guanidine thiocyanate, 4-methylmorpholine 4-oxide (NMO), or a mixture thereof. In embodiments, the denaturant is a buffered solution including about 0% to about 50% dimethyl sulfoxide (DMSO); about 30% to about 100% ethylene glycol; about 0% to about 20% formamide; or about 0 to about 3M betaine, or a mixture thereof. In an embodiment, the concentration of formamide is 100%. Following the denaturing step, a hybridization buffer is introduced, also at a lower temperature (e.g., 40° C.) relative to extension, to anneal the polynucleotide strands to the primers, completing a first extension cycle. Additional extension cycles may be repeated to generate additional amplicons.

In embodiments, the method includes performing optional washing steps in between each step of the amplification method. For example, a hybridization buffer without polymerase enzyme with or without dNTP's is introduced and allowed to contact the substrate before being removed and replaced with an extension solution (e.g., a solution that includes necessary components for extension to proceed). In embodiments, the method includes introducing air in between each step of the extension method. In embodiments, a volume of air is introduced, referred to as an air slug, in between each step of the amplification method. An air slug may assist in a fast transition between two otherwise disparate solutions, and reduce gradient effects (i.e., wherein some of the templates contact a different concentration of a solution).

In some embodiments, the extension solution includes an SSB protein (e.g., T4 gp32 protein, T7 gene 2.5 SSB protein, or phi29 SSB protein, *Thermococcus kodakarensis* (KOD) SSB, *Thermus thermophilus* (TTH) SSB, *Sulfolobus solfataricus* (SSO) SSB, or Extreme Thermostable Single-Stranded DNA Binding Protein (ET-SSB)), a strand-displacing polymerase (e.g., Bst large fragment (Bst LF) polymerase, Bst 3.0 polymerase, Bst 2.0 polymerase, Bsu polymerase, SD polymerase, Vent exo-polymerase, Phi29 polymerase, or a mutant thereof), and one or more crowding agents (poly(ethylene glycol) (PEG), polyvinylpyrrolidone (PVP), bovine serum albumin (BSA), dextran, Ficoll (e.g., Ficoll 70 or Ficoll 400), glycerol, or a combination thereof). In some embodiments, the polymerase is Bst LF polymerase, SD polymerase, or Vent Exo-polymerase. In embodiments, the crowding agent is poly(ethylene glycol) (e.g., PEG 200, PEG 600, PEG 800, PEG 2,050, PEG 4,600, PEG 6,000, PEG 8,000, PEG 10,000, PEG 20,000, or PEG 35,000), dextran sulfate, bovine pancreatic trypsin inhibitor (BPTI), ribonuclease A, lysozyme, β-lactoglobulin, hemoglobin, bovine serum albumin (BSA), or poly(sodium 4-styrene sulfonate) (PSS). In embodiments, the crowding agent is used at a concentration of between about 1% to about 30%. In embodiments, the crowding agent is used at a concentration of between about 5% to about 25%.

In some embodiments, denaturation (i.e., partial or complete denaturation) is achieved by exposure to chemicals such as urea or formamide, with concentrations suitably adjusted, or using high or low pH (e.g., pH between 4-6 or 8-9). In embodiments, the denaturant is a strong base. The strength of a base is indicated by its $pK_b$ value, compounds with a $pK_b$ value of less than about 1 are referred to as a strong base. In embodiments, the strong base is a sodium hydroxide (NaOH) solution used at a concentration of from 0.05M to 0.25M (e.g., a 0.1M NaOH solution).

In embodiments, the methods described herein are designed to work in a specific temperature range, including an upper temperature and a lower temperature. The upper temperature, for example, is below the Tm of the primers and below the maximum temperature that the polymerase can tolerate. For example, the upper temperature may be 55° C., 60° C., 65° C., or 70° C., depending on the specific temperature required for optimal extension by the polymerase. The lower temperature is selected to promote hybridization of the surface primers to the template and/or amplicon polynucleotide strands. For example, the lower temperature may be 35° C., 40° C., or 45° C. when cooling in the denaturant. Selecting a temperature that is sufficiently below the Tm of the surface primers promotes hybridization to the template and/or amplicon. Decreasing the setpoint of the lower temperature may improve hybridization of the surface primers but may also increase the amount of time required to cycle down from the upper temperature to the lower temperature. While 40° C. may be sufficient to promote hybridization of majority of the surface primers, going below 40° C., for example to 35° C., may encourage more complete hybridization of surface primer, although it may also increase the cycling time. The lower temperature requirements may also change depending on the length of the primers, for example, longer primers, with a higher Tm, may not require as low of a temperature for full hybridization compared to shorter primers.

Figure 2:
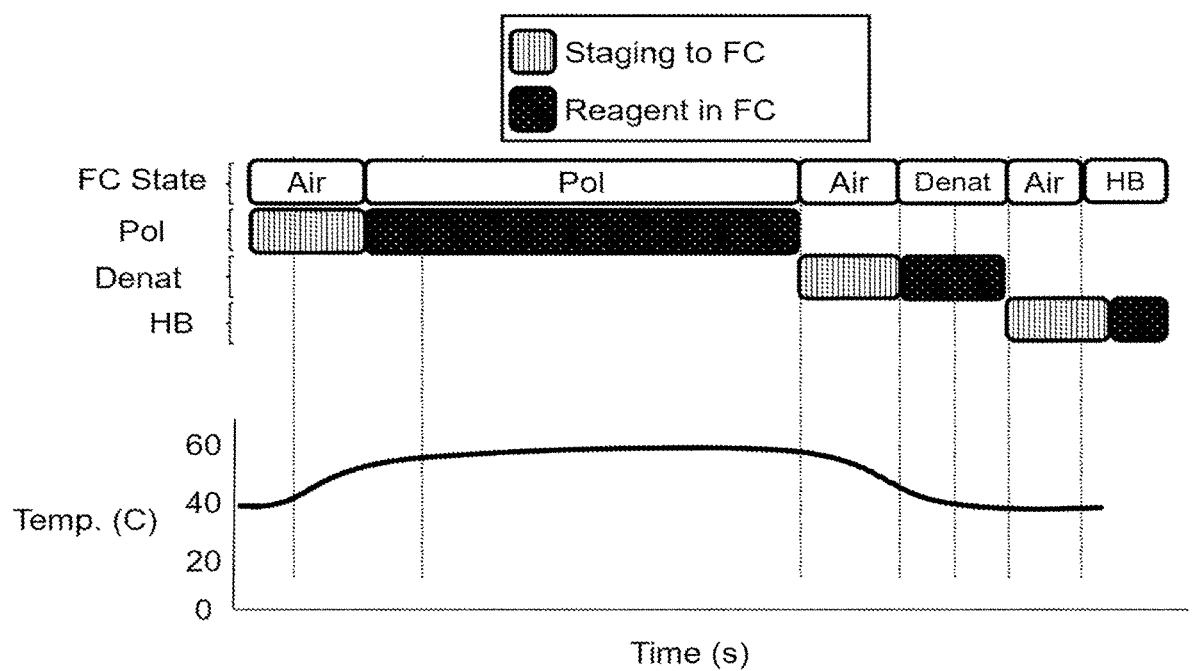
FIG. 2 illustrates an embodiment of the method described herein. In this embodiment, the substrate containing a template polynucleotide and an immobilized primer hybridized thereto is within a flow cell (FC). The flow cell is within a microfluidic device that is capable of loading the reagent for entry into the FC (i.e., staging) and distributing reagents at different temperatures and pressures.

Shown in FIG. 2 is an embodiment of the method described herein. In this embodiment, the substrate containing a template polynucleotide and an immobilized primer hybridized thereto is within a flow cell (FC). The flow cell is within a microfluidic device that is capable of loading the reagent for entry into the FC (i.e., staging) and distributing reagents at different temperatures and pressures. FIG. 2 shows the condition of the flow cell (FC State), polymerase (Pol.), denaturant solution (Denat) and hybridization buffer (HB), above the corresponding temperature profile over time. Each solution (Pol, Denat, or HB) is either staging (i.e., preloading) or flowing through the flow cell. It should be noted that HB refers to a hybridization buffer, which is interchangeable with an annealing solution as described herein. In an embodiment, each thermally assisted c-bPCR cycle begins with an air segment entering the flow cell as the temperature is increased to the upper temperature setpoint. As the temperature reaches the upper setpoint (e.g., about 58° C.), a polymerase extension solution is flowed into the flow cell. In other embodiments, the polymerase extension temperature is introduced at the lower temperature and gradually increased (i.e., contacting with an extension solution while there is thermal transition). The flow cell is then cooled as an air segment is applied and denaturant solution is introduced into the FC. The temperature is brought to the lower setpoint (e.g., about 40° C.) during denaturation. Optionally, following introduction of the denaturant solution, the temperature can remain elevated briefly (e.g., at about 58° C. for about 5-15 seconds) to achieve more effective denaturation before cooling down in the denaturant. Following the cooling step, an air segment is applied to the flow cell, followed by hybridization buffer (HB). Following the hybridization step, the cycle is then repeated.

As show in FIG. 2, air gaps (alternatively referred to as air slugs) are present in between the different reagent steps. Introducing air gaps in between reagent steps saves on reagent volume, and additionally allows for sharp reagent transitions. In the absence of an air pocket, there may be a transition phase between the reagent being removed and the reagent being added resulting in a gradient effect, which can in turn lower the efficiency with which the extension primers can hybridize to the amplicons. The air slugs purge the fluidic reagents from the reaction vessel.

As described in herein, the denaturant is introduced and allowed to contact the templates at a lower temperature than during extension. In some embodiments, the denaturant solution is introduced at a temperature above the extension temperature. If the denaturant is introduced at a higher temperature, it is then advantageous to lower the temperature before re-introducing the hybridization buffer. In embodiments, the denaturant solution is introduced while the reaction vessel is cooling from an upper extension temperature to a lower annealing temperature. The cooling rate while the substrate is in contact with a denaturant (e.g., formamide) may be tailored for each application, and denaturation occurs over a range of rates. We discovered that incubating in denaturant while reducing the temperature is advantageous to efficient extension. We also found that the lower temperature setpoint must be low enough at the point in time when the transition from denaturant to hybridization buffer occurs, such that optimal primer hybridization efficiency is reached.

Figure 3A:
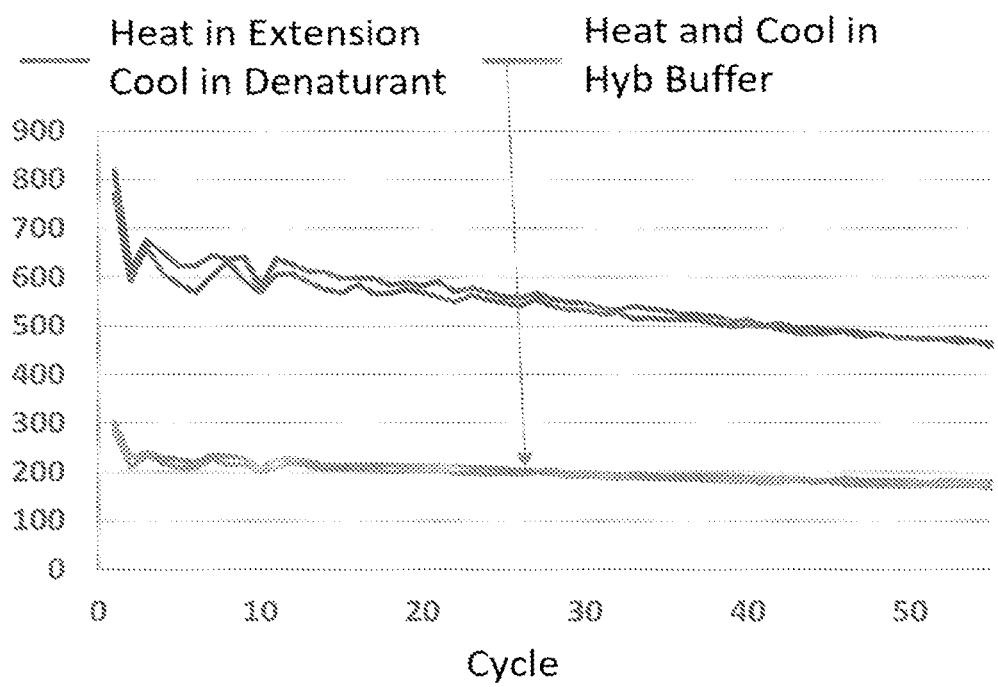
FIGS. 3A-3B. Sequencing results generated by sequencing the amplification products generated according to the methods described herein.
Figure 3B:
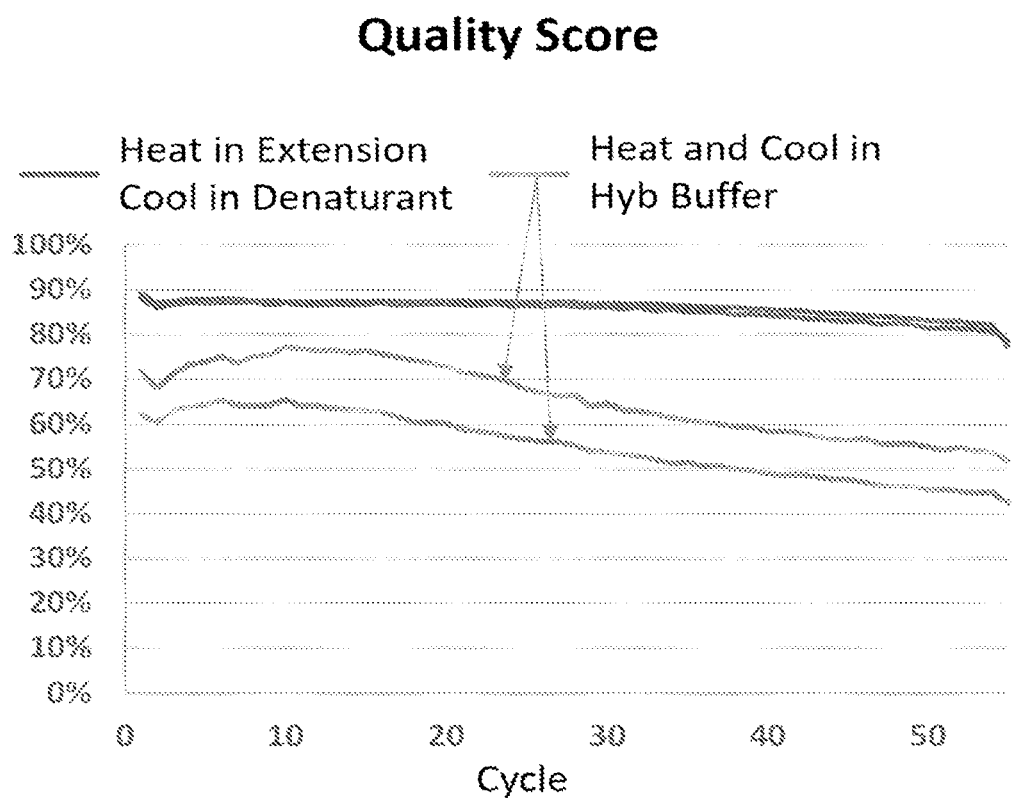

We tested whether there was an effect on sequencing quality if the temperature cool-down transitions were done in the presence of either a c-bPCR reagent (e.g., denaturant solution including formamide) or wash buffer (e.g., a hybridization buffer); see FIGS. 3A-3B which reports on the called base signal and the quality score for a 55-cycle sequencing experiment. In the first condition, condition 1, the extension reagent was first pre-warmed to 42° C. and then applied to the sample, followed by an increase (i.e., ramp up) to 58° C. After about 45 sec of extension (at 58° C.), a denaturant (e.g., formamide) was flowed in and incubated with the sample for about 45 sec while the temperature was reduced to 42° C. Upon reaching 42° C., the denaturant was exchanged with hybridization buffer, completing the first cycle, and followed by the next iteration. In the second condition, condition 2, the temperature was increased to 58° C. while the sample was in hybridization buffer. Subsequently, the extension reagent was introduced and incubated for 45 sec at 58° C. The denaturant was then applied and incubated with the sample for 45 sec (still at 58° C.). Hybridization buffer was then introduced into the flow cell, followed by a decrease in temperature to 42° C. while in the hybridization buffer. This completed the first cycle, and then the temperature is then increased to 58° C. prior to beginning the next iteration. It was found that when the denaturant was exchanged for hybridization buffer (e.g., wash buffer) at the elevated temperature and then cooled in the hybridization buffer, i.e., condition 2, there was a dramatic reduction in base signal/quality. In contrast, and importantly, allowing the lanes of the flow cell filled with denaturant cool to about 42° C. before exchanging with hybridization buffer showed a significant improvement and retention in signal/quality (see, FIG. 3A and FIG. 3B). These results suggest that keeping amplicons denatured past the point that would be expected for extension (lowering to 42° C., rather than maintaining the temperature at 58° C.) seems significant for shifting the equilibrium towards amplicons priming off available surface primers rather than non-productively rehybridizing to their complementary strands.

In embodiments of the invention, thermal cycling involves temperature oscillation or cycling between two temperatures with a ΔT greater than 0° C., but no more than 20° C., no more than 15° C., or a ΔT greater than 0° C. and less than 10° C. Upon reaching the high temperature, the temperature is maintained for a first period of time ($t_{extension}$) to sufficiently extend complementary polynucleotide strands. Similarly, upon reaching the low temperature, the temperature is maintained during a second period of time ($t_{anneal}$) to hybridize the immobilized primers to the template or amplicon.

In embodiments, the method includes a polymerase. In embodiments, the includes amplifying with a polymerase that operates (i.e., is capable of extension) at a temperature in the 55° C.-70° C. range.

Further optimization of the thermal setpoints is conceived herein. For example, increasing the polymerase extension temperature could reduce the frequency of non-specific extension products. Reducing the annealing temperature could increase frequency of repriming by the immobilized primers. Additionally, decreasing the difference in temperature ΔT between the upper and lower temperatures ($T_{extension}$ and $T_{anneal}$, respectively) may increase overall cycle time since less time would be spent heating/cooling each cycle.

Example 2. Modulating Temperature While Incubation in Alternating Reagents

As depicted in FIGS. 4-7, experiments altering the temperature at which point a particular reagent is allowed to contact and/or incubate in the reaction vessel were performed. Without wishing to be bound by any theory, minimizing hybridization competition between the amplicon and the complementary strand and the immobilized primer is important for maximizing efficiency. The results suggest that at the extension temperature, about 58° C. to about 62° C., that the stability of the newly formed amplicon hybridized to the immobilized primer is unstable due to the Tm of the primer, relative to the nearby complementary amplicons. The nearby complementary amplicons may preferentially reanneal to each other before extension of the immobilized primer can occur. Introducing the extension mix at the lower temperature, e.g., about 42° C., this enables the polymerase to begin extending the immobilized primer, albeit at reduced efficiency, while the bond between the amplicon and the immobilized primer is more stable. As the immobilized primer is extended, the thermodynamic stability increases by the time the optimal extension temperature is achieved.

TABLE 1

Amplification reaction conditions for the amplification protocols described in FIGS. 4-7. A first temperature ($T_1$), the first temperature transition ($T_1 \rightarrow T_2$), the second temperature ($T_2$), the second temperature transition, and the first temperature for the next cycle ($T_1'$) and the particular reaction occurring at that temperature are provided in the table. Anneal and hybridize are used interchangeably.

| Condition | $T_1$ | $T_1 \rightarrow T_2$ | $T_2$ | $T_2 \rightarrow T_1$ | $T_1'$ |
|---|---|---|---|---|---|
| A | Anneal | Extend | Extend and Denature | Denature | Anneal and extend |
| B | Anneal | Anneal | Extend and Denature | Anneal | Anneal |
| C | Anneal | Extend | Extend and Denature | Anneal | Anneal and extend |
| D | Anneal | Anneal | Extend and Denature | Denature | Anneal |

Figure 4:
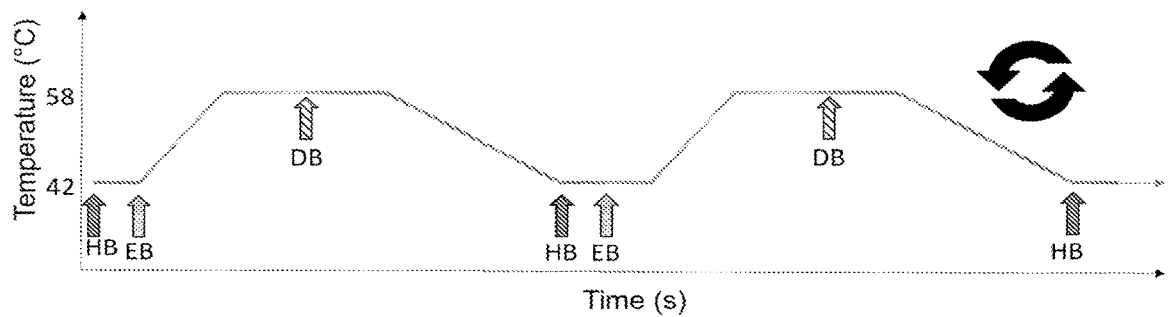
FIG. 4. Presented in FIG. 4 is an embodiment for the amplification methods described herein. The reagents are abbreviated such that hybridization buffer is referred to as HB, extension buffer is referred to as EB, and denaturant buffer is referred to as DB and the arrow indicates the point at which the reagent is introduced. Not explicitly shown are air gaps as described and explicitly depicted in FIG. 2, however optionally between each reagent change (i.e., changing from EB to DB) there is a volume of air introduced.

An illustration of the amplification cycles that include active heating and active cooling amplification is presented in FIG. 4 (Condition A). Note, active in this context refers to changing the temperature (e.g., increasing or decreasing the temperature) while in the presence of an extension buffer and/or denaturation buffer. The reagents are abbreviated such that hybridization buffer is referred to as HB, extension buffer is referred to as EB, and denaturant buffer is referred to as DB and the arrow indicates the point at which the reagent is introduced. Not explicitly shown are air gaps as described and explicitly depicted in FIG. 2, however optionally between each reagent change (i.e., changing from EB to DB) there is a volume of air introduced (e.g., an air gap). FIG. 4 describes incubating a solid support containing immobilized primers and a template polynucleotide in a reaction vessel at about 42° C. in hybridization buffer (HB) before introducing the extension buffer (EB). Upon introduction of the EB the temperature is increased to about 58° C. and maintained for a period of time. While at about 58° C., a denaturant (DB) is brought into the reaction vessel and maintained for a period of time followed by reducing the temperature to about 42° C. Upon reaching the temperature setpoint a hybridization buffer (HB) is introduced into the reaction vessel, and the cycle is repeated.

Figure 5:
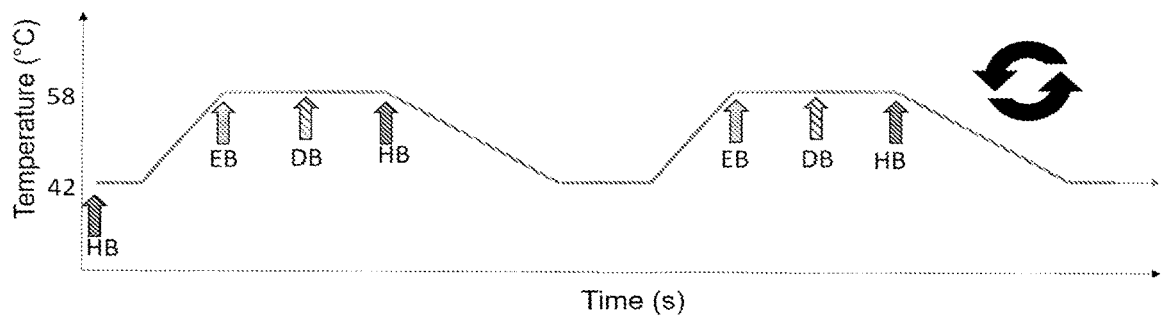
FIG. 5. Presented in FIG. 5 is an embodiment for the amplification methods described herein. The reagents are abbreviated such that hybridization buffer is referred to as HB, extension buffer is referred to as EB, and denaturant buffer is referred to as DB and the arrow indicates the point at which the reagent is introduced. Not explicitly shown are air gaps as described and explicitly depicted in FIG. 2, however optionally between each reagent change (i.e., changing from EB to DB) there is a volume of air introduced.

An illustration of the amplification cycles that include non-active heating and non-active cooling amplification is presented in FIG. 5 (condition B). Note, active in this context refers to changing the temperature (e.g., increasing or decreasing the temperature) while in the presence of an extension buffer and/or denaturation buffer. For this protocol, temperature changes only occur in the presence of a hybridization buffer. The reagents are abbreviated such that hybridization buffer is referred to as HB, extension buffer is referred to as EB, and denaturant buffer is referred to as DB and the arrow indicates the point at which the reagent is introduced. Not explicitly shown are air gaps as described and explicitly depicted in FIG. 2, however optionally between each reagent change (i.e., changing from EB to DB) there is a volume of air introduced (e.g., an air gap). FIG. 5 describes incubating a solid support containing immobilized primers and a template polynucleotide in a reaction vessel at about 42° C. in hybridization buffer (HB) for a period of time, before increasing the temperature to about 58° C. Once the upper temperature (i.e., about 58° C.) is achieved, an extension buffer (EB) is introduced and the reaction vessel is maintained at a constant temperature for a period of time before introducing a denaturant (DB). Following incubation in the DB, the HB is introduced and the temperature is reduced to about 42° C., and the cycle is repeated.

Figure 6:
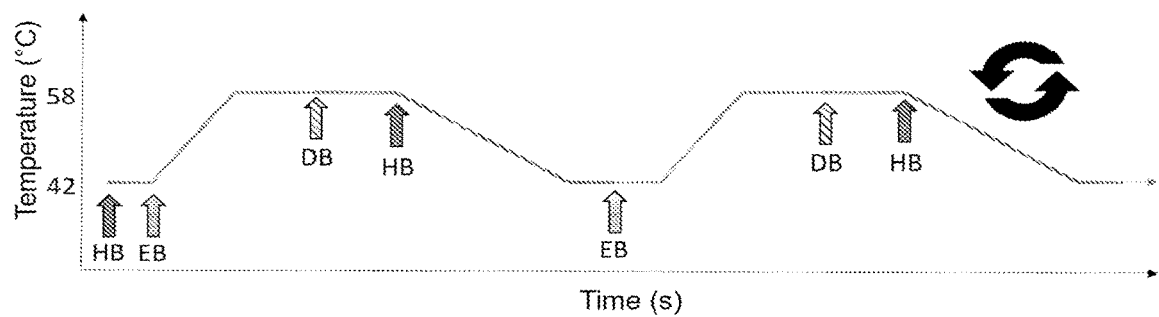
FIG. 6. Presented in FIG. 6 is an embodiment for the amplification methods described herein. The reagents are abbreviated such that hybridization buffer is referred to as HB, extension buffer is referred to as EB, and denaturant buffer is referred to as DB and the arrow indicates the point at which the reagent is introduced. Not explicitly shown are air gaps as described and explicitly depicted in FIG. 2, however optionally between each reagent change (i.e., changing from EB to DB) there is a volume of air introduced.

An illustration of the amplification cycles that include active heating and non-active cooling amplification is presented in FIG. 6 (Condition C). Note, active in this context refers to changing the temperature (e.g., increasing or decreasing the temperature) while in the presence of an extension buffer and/or denaturation buffer. For this protocol, the active heating is present, i.e., the temperature increases in the presence of an extension buffer only. The reagents are abbreviated such that hybridization buffer is referred to as HB, extension buffer is referred to as EB, and denaturant buffer is referred to as DB and the arrow indicates the point at which the reagent is introduced. Not explicitly shown are air gaps as described and explicitly depicted in FIG. 2, however optionally between each reagent change (i.e., changing from EB to DB) there is a volume of air introduced (e.g., an air gap). FIG. 6 describes incubating a solid support containing immobilized primers and a template polynucleotide in a reaction vessel at about 42° C. in hybridization buffer (HB) before introducing the extension buffer (EB). Upon introduction of the EB the temperature is increased to about 58° C. and maintained for a period of time. While at about 58° C., a denaturant (DB) is brought into the reaction vessel and maintained for a period of time. Following incubation in the DB, the HB is introduced and the temperature is reduced to about 42° C., and the cycle is repeated.

Figure 7:
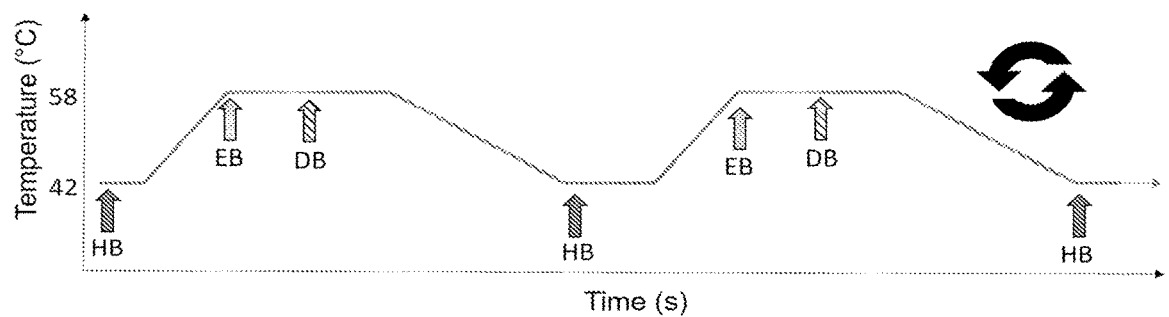
FIG. 7. Presented in FIG. 7 is an embodiment for the amplification methods described herein. The reagents are abbreviated such that hybridization buffer is referred to as HB, extension buffer is referred to as EB, and denaturant buffer is referred to as DB and the arrow indicates the point at which the reagent is introduced. Not explicitly shown are air gaps as described and explicitly depicted in FIG. 2, however optionally between each reagent change (i.e., changing from EB to DB) there is a volume of air introduced.
Figure 8A:
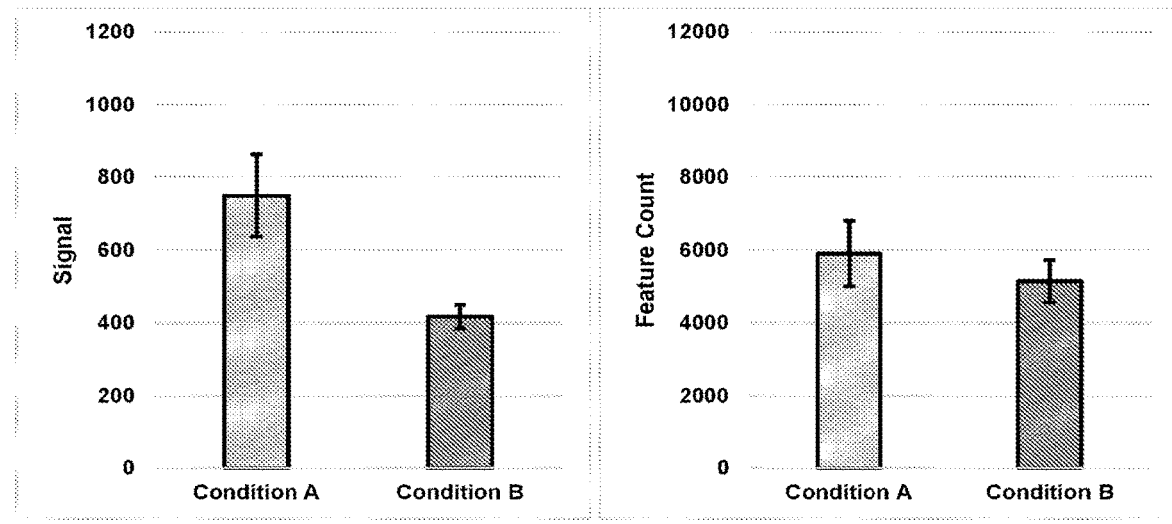
FIGS. 8A-8C. The reported cluster metrics for clusters of amplification products generated according to the Conditions A-D described herein (see, for example, Table 1).
Figure 8B:
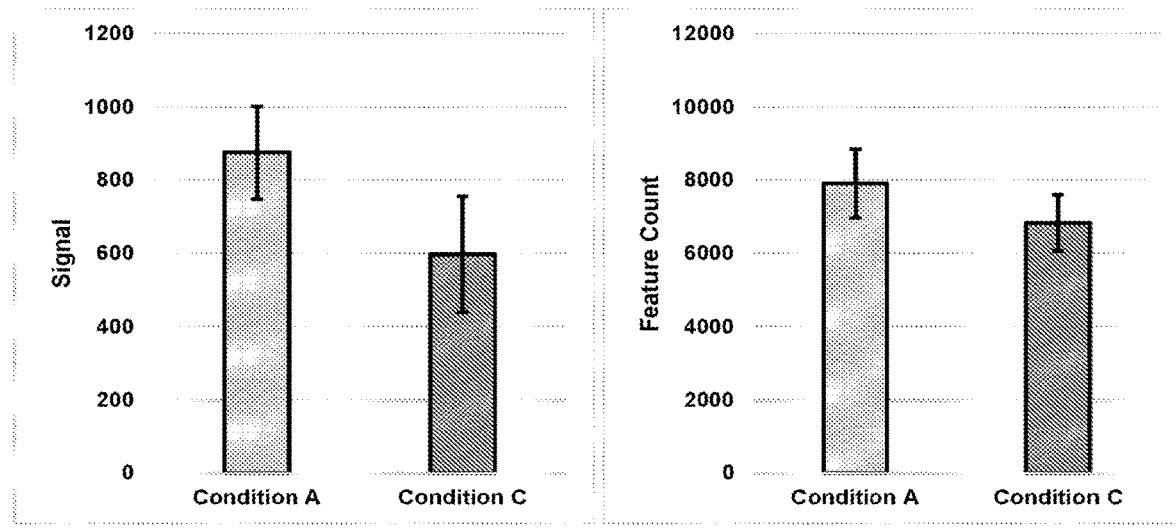
Figure 8C:
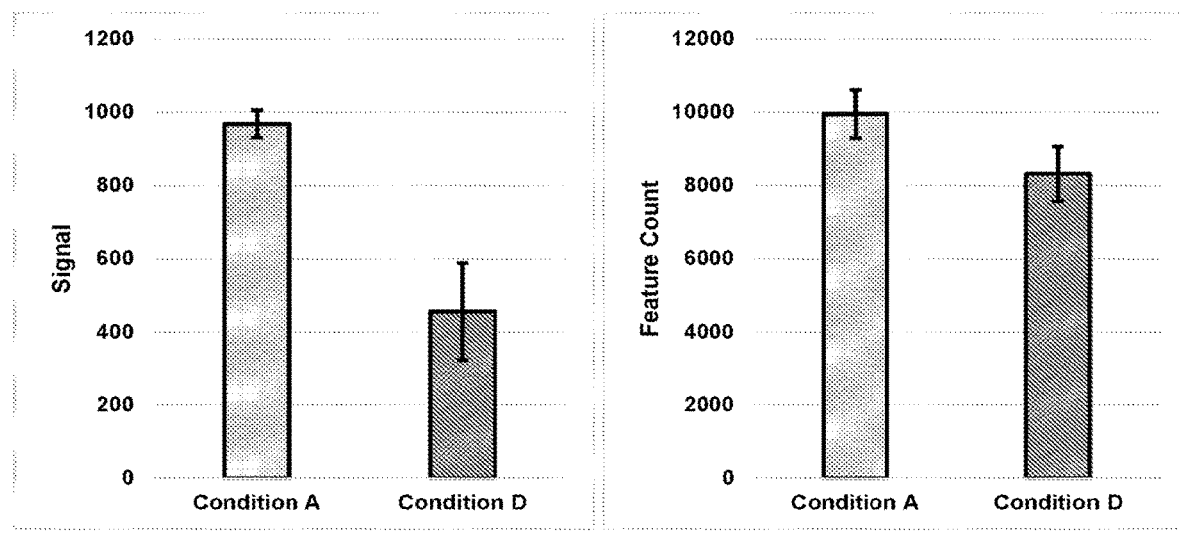

An illustration of the amplification cycles that include non-active heating and active cooling amplification is presented in FIG. 7 (Condition D). Note, active in this context refers to changing the temperature (e.g., increasing or decreasing the temperature) while in the presence of an extension buffer and/or denaturation buffer. For this protocol, active cooling is present in the presence of a denaturant. The reagents are abbreviated such that hybridization buffer is referred to as HB, extension buffer is referred to as EB, and denaturant buffer is referred to as DB and the arrow indicates the point at which the reagent is introduced. Not explicitly shown are air gaps as described and explicitly depicted in FIG. 2, however optionally between each reagent change (i.e., changing from EB to DB) there is a volume of air introduced (e.g., an air gap). FIG. 7 describes incubating a solid support containing immobilized primers and a template polynucleotide in a reaction vessel at about 42° C. in hybridization buffer (HB) for a period of time, before increasing the temperature to about 58° C. Once the upper temperature (i.e., about 58° C.) is achieved, an extension buffer (EB) is introduced and the reaction vessel is maintained at a constant temperature for a period of time before introducing a denaturant (DB). Following incubation in the DB, the temperature is reduced to about 42° C. Once the lower temperature is achieved, a HB is introduced into the reaction vessel and the cycle is repeated.

Following amplification the clusters can proceed to any necessary post-processing steps such as blocking of free 3' ends, removal of select amplicons, or hybridization of a sequencing primer. To minimize variability, amplification protocols were performed on the same four lane flow cell, with each condition occupying two channels. The clusters for each condition described above (i.e., Condition A, B, C, and D) were quantified by introducing a nucleic acid probe (e.g., SYBR® Gold stain available from Thermo Fisher, Catalog #S11494 or a FAM (6-fluorescein amidite) labeled oligonucleotide) in the presence of a buffer, and allowed to incubate with the amplicons for 10 minutes. After a wash to remove any unbound probes, the substrate containing the stained amplicons was imaged and subjected to post-processing analysis to determine cluster size and brightness. In order for the probe to bind to each cluster, there needs to be an accessible complementary sequence, thus the total signal and feature count indicate the quantity of amplicons present on the solid support.

P-EMBODIMENTS

The present disclosure provides the following illustrative embodiments.

Embodiment P1. A method of generating a complement template polynucleotide comprising: (a) annealing a template polynucleotide to a first immobilized primer on a solid support at a first temperature, wherein the first immobilized primer is complementary to a sequence of the template polynucleotide; (b) extending the first primer with a polymerase to generate a complement template polynucleotide; (c) contacting the complement template polynucleotide and the template polynucleotide with a chemical denaturant at a second temperature thereby separating the complement template polynucleotide from the template polynucleotide; (d) removing the denaturant and annealing a complement template polynucleotide to a second immobilized primer on said solid support at the first temperature, wherein the second immobilized primer is complementary to a sequence of the complement template polynucleotide and wherein the second temperature is higher than the first temperature; and (e) extending the second immobilized primer with the polymerase to generate a template polynucleotide.

Embodiment P2. The method of Embodiment P1, wherein extending the first primer occurs at the first temperature.

Embodiment P3. The method of Embodiment P1, wherein extending the first primer occurs at the second temperature.

Embodiment P4. The method of any one of Embodiment P1 to Embodiment P3, wherein extending the first primer occurs at a temperature between the first temperature and the second temperature.

Embodiment P5. The method of any one of Embodiment P1 to Embodiment P4, further comprising contacting the complement template polynucleotide and the template polynucleotide with a denaturant at a temperature between the second temperature and the first temperature.

Embodiment P6. The method of any one of Embodiment P1 to Embodiment P5, wherein the decrease from the second temperature to the first temperature occurs at a controlled rate.

Embodiment P7. The method of any one of Embodiment P1 to Embodiment P6, wherein the increase from the first temperature to the second temperature occurs at a controlled rate.

Embodiment P8. The method of any one of Embodiment P1 to Embodiment P7, wherein the first temperature ranges from about 25° C. to about 45° C.

Embodiment P9. The method of any one of Embodiment P1 to Embodiment P7, wherein the first temperature ranges from about 40° C. to about 45° C.

Embodiment P10. The method of any one of Embodiment P1 to Embodiment P9, wherein the second temperature ranges from about 45° C. to about 70° C.

Embodiment P11. The method of any one of Embodiment P1 to Embodiment P9, wherein the second temperature ranges from about 55° C. to about 62° C.

Embodiment P12. The method of any one of Embodiment P1 to Embodiment P11, further comprising prior to step a) contacting the solid support with a sample comprising a template polynucleotide.

Embodiment P13. The method of any one of Embodiment P1 to Embodiment P12, further comprising repeating steps (a) to (e), thereby amplifying the template polynucleotide.

Embodiment P14. The method of any one of Embodiment P1 to Embodiment P13, wherein said annealing is performed in the presence of an annealing solution.

Embodiment P15. The method of any one of Embodiment P1 to Embodiment P14, wherein said extending is performed in the presence of an extension solution.

Embodiment P16. The method of any one of Embodiment P1 to Embodiment P15, wherein the chemical denaturant comprises formamide, ethylene glycol, or sodium hydroxide.

Embodiment P17. The method of Embodiment P16, wherein the chemical denaturant comprises formamide.

Embodiment P18. The method of Embodiment P16, wherein the chemical denaturant is pure formamide.

Embodiment P19. The method of any one of Embodiment P1 to Embodiment P18, further comprising applying oxygen to the solid support prior to removing the denaturant.

Embodiment P20. The method of any one of Embodiment P1 to Embodiment P18, further comprising applying air to the solid support prior to removing the denaturant.

Embodiment P21. The method of any one of Embodiment P1 to Embodiment P20, wherein removing the denaturant comprises application of a wash solution.

Embodiment P22. The method of Embodiment P21, wherein said wash solution is at a pH from pH 8 to pH 9.

Embodiment P23. The method of any one of Embodiment P1 to Embodiment P22, wherein the solid support comprises a plurality of immobilized primers.

Embodiment P24. The method of any one of Embodiment P1 to Embodiment P22, wherein the solid support comprises a plurality of non-extended immobilized primers.

Embodiment P25. A method of amplifying a template polynucleotide comprising: i) contacting a solid support with an annealing solution at a first temperature, wherein the solid support comprises a plurality of immobilized primers wherein one or more of the immobilized primers is annealed to a template polynucleotide; ii) contacting the solid support with an extension solution; iii) contacting the solid support with a chemical denaturant at a second temperature, wherein the second temperature is higher than the first temperature; iv) repeating steps i) to iii) to amplify the template polynucleotide.

Embodiment P26. The method of Embodiment P25, wherein prior to contacting the solid support with an extension solution, the method comprises contacting the solid support with oxygen.

Embodiment P27. The method of Embodiment P25 or Embodiment P26, wherein prior to contacting the solid support with a chemical denaturant, the method comprises contacting the solid support with oxygen.

Embodiment P28. The method of any one of Embodiment P23 to Embodiment P25, wherein contacting the solid support with an extension solution occurs at the first temperature and remains in contact with the solid support as the temperature is increased to the second temperature.

Embodiment P29. The method of any one of Embodiment P23 to Embodiment P26, wherein contacting the solid support with a chemical denaturant occurs at the second temperature and remains in contact with the solid support as the temperature is decreased to the first temperature.

Embodiment P30. The method of any one of Embodiment P25 to Embodiment P29, further comprising removing one or more immobilized primers.

Embodiment P31. The method of Embodiment P30, wherein removing the immobilized primers comprises contacting one or more immobilized primers with an exonuclease.

Embodiment P32. The method of Embodiment P31, wherein the exonuclease is a phi29 polymerase, or a mutant thereof.

Embodiment P33. A microfluidic device capable of performing any one of the Embodiment P1 to Embodiment P32.

ADDITIONAL EMBODIMENTS

The present disclosure provides the following additional illustrative embodiments.

Embodiment 1. A method of generating a complement template polynucleotide comprising: (a) annealing a template polynucleotide to a first immobilized primer on a solid support at a first temperature, wherein the first immobilized primer is complementary to a sequence of the template polynucleotide, wherein the first temperature is about 25° C. to about 45° C.; (b) extending the first primer with a polymerase to generate a complement template polynucleotide; (c) contacting the complement template polynucleotide and the template polynucleotide with a chemical denaturant at a second temperature thereby separating the complement template polynucleotide from the template polynucleotide, wherein the second temperature is greater than the first temperature by 12° C. to 18° C.; (d) removing the denaturant and annealing a complement template polynucleotide to a second immobilized primer on said solid support at the first temperature, wherein the second immobilized primer is complementary to a sequence of the complement template polynucleotide; and (e) extending the second immobilized primer with the polymerase to generate a template polynucleotide.

Embodiment 2. The method of Embodiment 1, wherein extending the first primer occurs at the first temperature.

Embodiment 3. The method of Embodiment 1, wherein extending the first primer occurs at the second temperature.

Embodiment 4. The method of Embodiment 1, wherein extending the first primer occurs at a temperature between the first temperature and the second temperature.

Embodiment 5. The method of any one of Embodiments 1 to 4, further comprising contacting the complement template polynucleotide and the template polynucleotide with a denaturant at a temperature between the second temperature and the first temperature.

Embodiment 6. The method of any one of Embodiments 1 to 5, wherein the decrease from the second temperature to the first temperature occurs at a controlled rate.

Embodiment 7. The method of any one of Embodiments 1 to 6, wherein the increase from the first temperature to the second temperature occurs at a controlled rate.

Embodiment 8. The method of any one of Embodiments 1 to 7, wherein the first temperature is about 40° C. to about 45° C.

Embodiment 9. The method of any one of Embodiments 1 to 8, wherein the second temperature is about 55° C. to about 62° C.

Embodiment 10. The method of any one of Embodiments 1 to 9, further comprising prior to step (a) contacting the solid support with a sample comprising a template polynucleotide.

Embodiment 11. The method of any one of Embodiments 1 to 10, further comprising repeating steps (a) to (e), thereby amplifying the template polynucleotide.

Embodiment 12. The method of any one of Embodiments 1 to 11, wherein said annealing is performed in the presence of an annealing solution.

Embodiment 13. The method of any one of Embodiments 1 to 12, wherein said extending is performed in the presence of an extension solution.

Embodiment 14. The method of any one of Embodiments 1 to 13, wherein the chemical denaturant comprises formamide, ethylene glycol, or sodium hydroxide.

Embodiment 15. The method of any one of Embodiments 1 to 14, wherein the chemical denaturant comprises formamide.

Embodiment 16. The method of any one of Embodiments 1 to 15, wherein the chemical denaturant is 100% formamide.

Embodiment 17. The method of any one of Embodiments 1 to 16, further comprising applying oxygen to the solid support prior to removing the denaturant.

Embodiment 18. The method of any one of Embodiments 1 to 17, further comprising applying air to the solid support prior to removing the denaturant.

Embodiment 19. The method of any one of Embodiments 1 to 18, wherein removing the denaturant comprises application of a wash solution.

Embodiment 20. The method of Embodiment 19, wherein said wash solution is at a pH from pH 7.5 to pH 9.

Embodiment 21. The method of any one of Embodiments 1 to 20, wherein the solid support comprises a plurality of immobilized primers.

Embodiment 22. The method of any one of Embodiments 1 to 21, wherein the solid support comprises a plurality of non-extended immobilized primers.

Embodiment 23. A method of amplifying a template polynucleotide comprising: i) contacting a solid support with an annealing solution at a first temperature, wherein the solid support comprises a plurality of immobilized primers wherein one or more of the immobilized primers is annealed to a template polynucleotide; ii) contacting the solid support with an extension solution; iii) contacting the solid support with a chemical denaturant at a second temperature, wherein the second temperature is 12° C. to 18° C. higher than the first temperature; iv) repeating steps i) to iii) to amplify the template polynucleotide.

Embodiment 24. The method of Embodiment 23, wherein prior to contacting the solid support with an extension solution, the method comprises contacting the solid support with oxygen.

Embodiment 25. The method of Embodiment 23 or 24, wherein prior to contacting the solid support with a chemical denaturant, the method comprises contacting the solid support with oxygen.

Embodiment 26. The method of any one of Embodiments 23 to 25, wherein contacting the solid support with an extension solution occurs at the first temperature and remains in contact with the solid support as the temperature is increased to the second temperature.

Embodiment 27. The method of any one of Embodiments 23 to 26, wherein contacting the solid support with a chemical denaturant occurs at the second temperature and remains in contact with the solid support as the temperature is decreased to the first temperature.

Embodiment 28. The method of any one of Embodiments 23 to 27, further comprising removing one or more immobilized primers.

Embodiment 29. The method of Embodiment 28, wherein removing the immobilized primers comprises contacting one or more immobilized primers with an exonuclease.

Embodiment 30. The method of Embodiment 29, wherein the exonuclease is a phi29 polymerase, or a mutant thereof.

Embodiment 31. The method of any one of Embodiments 23 to 30, wherein the first temperature is between 35° C. and 45° C.

Embodiment 32. The method of any one of Embodiments 23 to 31, wherein the second temperature is between 55° C. and 65° C.

Embodiments 33. The method of any one of Embodiments 23 to 32, wherein the first temperature is about 40° C., 41° C., 42° C., or 43° C.

Embodiment 34. The method of any one of Embodiments 23 to 33, wherein the second temperature is about 58° C., 59° C., 60° C., 61° C., or about 62° C.

Embodiment 35. A microfluidic device capable of performing the method of any one of Embodiments 1 to 34.

Embodiment 36. The method of Embodiment 29, wherein the exonuclease is a DNA polymerase, lambda exonuclease, Exo I, Exo III, T5, Exo V, or Exo VII.

What is claimed is:

1. A method of amplifying a template polynucleotide, said method comprising:
   (a) annealing a template polynucleotide to a first immobilized primer on a solid support at a first temperature, wherein the first immobilized primer is complementary to a sequence of the template polynucleotide, wherein the first temperature is about 25° C. to about 45° C.;
   (b) contacting the solid support with an extension solution and extending the first immobilized primer with a polymerase to generate a complement template polynucleotide, wherein contacting the solid support with an extension solution occurs at the first temperature and remains in contact with the solid support as the temperature is increased to a second temperature;
   (c) contacting the solid support with a chemical denaturant and separating the complement template polynucleotide from the template polynucleotide, wherein:
      i) contacting the solid support with a chemical denaturant occurs at the second temperature and remains in contact with the solid support as the temperature is decreased to the first temperature, and
      ii) the second temperature is greater than the first temperature by 12° C. to 18° C.;

(d) removing the chemical denaturant and annealing the complement template polynucleotide to a second immobilized primer on said solid support at the first temperature, wherein the second immobilized primer is complementary to a sequence of the complement template polynucleotide, and;

(e) contacting the solid support with the extension solution and extending the second immobilized primer with the polymerase to generate an amplification product.

2. The method of claim 1, further comprising extending the first immobilized primer at the first temperature.

3. The method of claim 1, further comprising extending the first immobilized primer at the second temperature.

4. The method of claim 1, wherein step (c) comprises decreasing the second temperature to the first temperature occurs at a controlled rate.

5. The method of claim 1, wherein step (b) comprises increasing the first temperature to the second temperature at a controlled rate.

6. The method of claim 1, wherein the first temperature is about 40° C. to about 45° C.

7. The method of claim 1, wherein the second temperature is about 55° C. to about 62° C.

8. The method of claim 1, further comprising prior to step (a) contacting the solid support with a sample comprising a template polynucleotide.

9. The method of claim 1, further comprising repeating steps (a) to (e), thereby amplifying the template polynucleotide.

10. The method of claim 1, wherein the chemical denaturant comprises formamide, ethylene glycol, or sodium hydroxide.

11. The method of claim 1, wherein removing the chemical denaturant comprises application of a wash solution.

12. The method of claim 1, wherein the first temperature is about 40° C. and the second temperature is about 58° C.

13. The method of claim 1, in step (b), the solid support remains in contact with the extension solution for 45 seconds at the second temperature, where the second temperature is 58° C.

14. The method of claim 1, in step (c), the solid support remains in contact with the chemical denaturant for 45 seconds as the temperature reduces to the first temperature, where the first temperature is 42° C.

15. The method of claim 1, in step (c), the solid support remains in contact with the chemical denaturant for 5-15 seconds at the second temperature prior to decreasing to the first temperature.

16. A method of amplifying a template polynucleotide, said method comprising:
(a) annealing a template polynucleotide to a first immobilized primer on a solid support at a first temperature, wherein the first immobilized primer is complementary to a sequence of the template polynucleotide, wherein the first temperature is about 35° C. to about 45° C.;
(b) contacting the solid support with an extension solution and extending the first immobilized primer to generate a complement template polynucleotide, wherein contacting the solid support with an extension solution occurs at the first temperature and remains in contact with the solid support as the temperature is increased to a second temperature;
(c) contacting the solid support with a chemical denaturant and separating the complement template polynucleotide from the template polynucleotide, wherein:
i) contacting the solid support with a chemical denaturant occurs at the second temperature and remains in contact with the solid support as the temperature is decreased to the first temperature, and
ii) the second temperature is 12° C. to 18° C. greater than the first temperature;
(d) removing the chemical denaturant and annealing a complement template polynucleotide to a second immobilized primer on said solid support at the first temperature, wherein the second immobilized primer is complementary to a sequence of the complement template polynucleotide;
(e) contacting the solid support with the extension solution and extending the second immobilized primer with the polymerase to generate an amplification product.

17. The method of claim 16, wherein the first temperature and the second temperature differ by about 15° C.

18. The method of claim 16, wherein the first temperature is about 40° C. to about 45° C.

19. The method of claim 16, wherein the second temperature is about 55° C. to about 62° C.

20. The method of claim 16, in step (b), the solid support remains in contact with the extension solution for 45 seconds at the second temperature, wherein the second temperature is 58° C.

21. The method of claim 16, in step (c), the solid support remains in contact with the chemical denaturant for 45 seconds as the temperature reduces to the first temperature, where the first temperature is 42° C.

22. The method of claim 16, in step (c), the solid support remains in contact with the chemical denaturant for 5-15 seconds at the second temperature prior to decreasing to the first temperature.

\* \* \* \* \*